(12) United States Patent
Cai

(10) Patent No.: US 11,797,721 B2
(45) Date of Patent: Oct. 24, 2023

(54) COMPUTER-AIDED WAREHOUSE SPACE PLANNING

(71) Applicant: INDUSTRIAL ARTIFICIAL INTELLIGENCE INC., Palo Alto, CA (US)

(72) Inventor: Lingrui Cai, Ann Arbor, MI (US)

(73) Assignee: INDUSTRIAL ARTIFICIAL INTELLIGENCE INC., Palo Alto, CA (US)

(*) Notice: Subject to any disclaimer, the term of this patent is extended or adjusted under 35 U.S.C. 154(b) by 374 days.

(21) Appl. No.: 16/821,519

(22) Filed: Mar. 17, 2020

(65) Prior Publication Data

US 2021/0294930 A1 Sep. 23, 2021

(51) Int. Cl.
*G06F 30/13* (2020.01)
*G06F 30/12* (2020.01)
*G06N 5/04* (2023.01)
*G06F 30/27* (2020.01)
*G06F 111/02* (2020.01)
*G06N 20/00* (2019.01)

(52) U.S. Cl.
CPC .............. *G06F 30/13* (2020.01); *G06F 30/12* (2020.01); *G06F 30/27* (2020.01); *G06N 5/04* (2013.01);
(Continued)

(58) Field of Classification Search
CPC .......... G06F 30/13; G06F 30/12; G06F 30/00; G06F 30/27; G06F 2111/02; G06N 5/04;
(Continued)

(56) References Cited

U.S. PATENT DOCUMENTS 9,111,251 B1 8/2015 Brazeau
10,026,218 B1* 7/2018 Mertens .............. H04N 13/332
2007/0142961 A1 6/2007 Bhasin et al.

FOREIGN PATENT DOCUMENTS

CN 109299205 A 2/2019
CN 109472527 A 3/2019
(Continued)

OTHER PUBLICATIONS

Brito, A.E.S.C., "Configurating Simulation Models using CAD Techniques: A New Approach to Warehouse Design", Centre for Logistics and Transportation School of Management, Oct. 1992. (Year: 1992).*

(Continued)

*Primary Examiner* — Cedric Johnson
(74) *Attorney, Agent, or Firm* — Morgan, Lewis & Bockius LLP

(57) ABSTRACT

A computer system obtains a computer-aided design (CAD) file of the warehouse, and the CAD file describes a floor plan of the warehouse with a plurality of patterns in a plurality of layers. A storage space and a plurality of guard objects are identified on the floor plan of the warehouse. The computer system further obtains inventory information of a plurality of product packages to be stored in the warehouse. Based on the inventory information, a plurality of storage types is identified, and a storage area is determined for a subset of product packages associated with each storage type. In accordance with the storage area needed for each storage type, the storage space is divided into a plurality of storage regions for the plurality of product packages, and each storage region is uniquely associated with a respective one of the storage types.

20 Claims, 31 Drawing Sheets

(52) U.S. Cl.
CPC .......... *G06F 2111/02* (2020.01); *G06N 20/00* (2019.01)

(58) Field of Classification Search
CPC ...... G06N 20/00; G06N 3/0454; G06N 5/003; G06N 20/10; G06N 20/20; G06Q 10/087
USPC .......................................................... 703/1
See application file for complete search history.

(56) References Cited

FOREIGN PATENT DOCUMENTS

| | | |
|---|---|---|
| CN | 109948960 A | 6/2019 |
| CN | 110796344 A | 2/2020 |
| CN | 110826953 A | 2/2020 |
| JP | 2004227229 A | 8/2004 |

OTHER PUBLICATIONS

Zhang, Haifeng et al., "Layout Design for Intelligent Warehouse by Evolution with Fitness Approximation", Nov. 27, 2019, Digital Object Identifier, IEEE Access. (Year: 2019).*

Shucheng Technology Co. Ltd., International Search Report and Written Opinion, PCT/CN2020/079673, dated Dec. 16, 2020, 10 pgs.

* cited by examiner

| Display On | Layers | User Annotation | |
|---|---|---|---|
| ■ | Fire Hydrant 518 | | ▼ |
| ■ | Equipment Space Wall 516B | | ▼ |
| ■ | Separation Wall 516A | Walls | ▼ |
| ☐ | Gutter 514 | | ▼ |
| ■ | Structure Columns 512 | Pillars | ▼ |
| ☐ | Structure Column Base 510 | | ▼ |
| ■ | Diagonal Beam 508 | | ▼ |
| ■ | Door 506 | | ▼ |
| ■ | Stairs 504 | | ▼ |
| ■ | Docks 502 | | ▼ |
| ☐ | Text 520 | | ▼ |

Figure 5B

|         | Group 1 | Group 2 | Group 3 | ... | Group N |
|---------|---------|---------|---------|-----|---------|
| Layer 1 | 1       | 0       | 0       | ... | 1       |
| Layer 2 | 0       | 1       | 0       | ... | 1       |
| Layer 3 | 1       | 1       | 0       | ... | 0       |
| Layer 4 | 0       | 1       | 1       | ... | 1       |
| Layer 5 | 1       | 1       | 0       | ... | 1       |
| Layer 6 | 0       | 0       | 0       | ... | 1       |
| ...     | ...     | ...     | ...     | ... | ...     |
| Layer M | 1       | 0       | 1       | ... | 0       |

Figure 7A

| | 1 | 1 | 0 | 1 | 1 | 1 | ... | 0 |
|---|---|---|---|---|---|---|---|---|
| 750 → | | | | | | | | |
| | ⋮ | ⋮ | ⋮ | ⋮ | ⋮ | ⋮ | ⋮ | ⋮ |
| | 0 | 0 | 0 | 1 | 0 | 0 | ... | 1 |
| | 0 | 1 | 1 | 1 | 0 | | ... | 0 |
| | 1 | 0 | 1 | 0 | 1 | 0 | ... | 1 |

Figure 7B

COMPUTER-AIDED WAREHOUSE SPACE PLANNING

TECHNICAL FIELD

This application relates generally to warehouse space planning, including but not limited to computer-aided methods and systems for optimizing usage of a storage space of a warehouse by dividing the storage space into multiple storage regions that store a plurality of predetermined product packages based on floor plan information, inventory information and/or resource information.

BACKGROUND

Electronic commerce (e-commerce) involves activities of electronically buying or selling of products on online services or over the Internet. Such activities rely on companies' capabilities of managing product storage, transportation and delivery efficiently. Particularly, the products need to be stored in a warehouse in an efficient manner, such that a large number of products can be accommodated concurrently in a limited storage space of the warehouse while each product is placed at a location allowing the products to enter and exit the warehouse promptly if needed. An e-commerce company oftentimes has to hire professional warehouse planning consultants to optimize usage of a storage space within a warehouse in view of the company's product storage need. These professional consultants normally provide highly customized warehouse planning solutions based on their long term experience, resorting to limited or no assistance from specialized software, which can delay usage of the warehouse by a few days to a few weeks. It would be beneficial to have a more efficient warehouse space planning mechanism than the current practice.

SUMMARY

This application is directed to a computer-implemented method that optimizes usage of a storage space of a warehouse for storing a plurality of product packages based on floor plan information, inventory information and/or resource information. Optionally, a warehouse space planning tool is installed locally on a computer system to implement this method. Optionally, the warehouse space planning tool is installed remotely at a server system, allowing client devices to access the warehouse space planning tool via a browser based user interface or a dedicated warehouse planning application. In some situations, the warehouse space planning tool is applied during the course of looking for a new warehouse, and can be configured to estimate a storage area, storage types, and operation cost based on a user's storage needs. Alternatively, in some situations, the warehouse space planning tool is applied to redesign a layout of an existing warehouse to accommodate the user's new storage needs efficiently. The warehouse space planning tool is configured to receive a computer-aided design (CAD) file of the warehouse as an input and automatically create different regions in the existing warehouse to store different product packages, thereby allowing a large number of products to be accommodated concurrently in a limited storage space of the warehouse and each product to enter and exit the warehouse promptly if needed.

In one aspect of the application, a method is implemented at a computer system (e.g., a remote server or a local computer device) to plan warehouse space. The computer system has one or more processors and memory storing instructions for execution by the one or more processors. The method includes obtaining a computer-aided design (CAD) file of a warehouse, and the CAD file describing a floor plan of the warehouse with a plurality of patterns (e.g., lines and shapes) in a plurality of layers. The method further includes automatically and without user intervention, in accordance with a plurality of classification rules, classifying the plurality of layers and the plurality of patterns in the CAD file into a plurality of physical structures that are arranged in the warehouse, and identifying a first set of guard objects among the plurality of physical structures on the floor plan of the warehouse. The method further includes receiving an input to identify a second set of guard objects, customizing the floor plan of the warehouse to identify one or more storage spaces that are compatible with the first set of guard objects and the second set of guard objects, and rendering a graphic representation of the customized floor plan of the warehouse. The graphic representation includes the one or more storage spaces, the first set of guard objects, and the second set of guard objects on the floor plan.

In some embodiments, the above warehouse space planning process is an iterative process. In response to rendering the graphic representation, the computer system receives a user annotation on the CAD file. In accordance with the user annotation, classification of the plurality of layers and the plurality of patterns in the CAD file is updated according to the plurality of classification rules to identify a third set of guard objects on the floor plan of the warehouse. Customization of the floor plan of the warehouse is updated to render an updated graphic representation including one or more updated storage spaces and the third set of guard objects on the floor plan.

In some embodiments, artificial intelligence (AI) techniques are applied to classify the plurality of layers and the plurality of patterns in the CAD file. For example, the computer system may render each of the plurality of layers into a respective layout image and process the respective layout image using a predefined convolutional neural network to associate the respective layer with a respective type of physical structures. Alternatively, in some embodiments, the computer system extracts from each layer a respective layer feature vector having a predefined dimension. In accordance with a predetermined machine learning (ML) method, the respective layer is associated with a subset of the physical structures based on the respective layer feature vector.

In another aspect, a method is implemented at a computer system (e.g., a remote server or a local computer device) to arrange stock in a warehouse. The computer system has one or more processors and memory storing instructions for execution by the one or more processors. The method includes obtaining a floor plan of the warehouse, and the floor plan includes information of a storage space and a plurality of guard objects within the storage space. The method further includes obtaining inventory information of a plurality of product packages to be stored in the warehouse, and analyzing the floor plan of the warehouse to identify a plurality of static rules for placing the plurality of product packages in the storage space of the warehouse. The method further includes determining a plurality of storage types based on the inventory information of the plurality product packages. The method further includes for each of the plurality of storage types, identifying, within the storage space, a respective storage area within the storage space for a subset of the plurality of product packages that can be stored with the respective storage type in accordance with the plurality of static rules.

In yet another aspect, a computer-aided stock arranging method is implemented at a computer system (e.g., a remote server or a local computer device) having one or more processors and memory storing instructions for execution by the one or more processors. The stock arranging method includes obtaining a CAD file of a warehouse, and the CAD file describes a floor plan of the warehouse with a plurality of patterns in a plurality of layers. The stock arranging method further includes identifying a storage space and a plurality of guard objects on the floor plan of the warehouse and obtaining inventory information of a plurality of product packages to be stored in the warehouse. The stock arranging method further includes based on the inventory information, determining a plurality of storage types and a storage area for a subset of the plurality of product packages associated with each of the plurality of storage types. The stock arranging method further includes in accordance with the storage area needed for each of the plurality of storage types, dividing the storage space into a plurality of storage regions for the plurality of product packages, and each storage region is uniquely associated with a respective one of the plurality storage types. In some embodiments, the computer system obtains resource information of labor, tools and space used to store the plurality of product packages in the warehouse, and in accordance with dividing the storage space into the plurality of storage regions, determines an overall cost of storing the plurality product packages in the storage space based on the resource information. The overall cost satisfies a resource cost criterion.

In some embodiments, the plurality of storage regions are selected as the final storage regions based on one of a plurality of predefined storage templates, e.g., a first storage template. In accordance with each storage template, the computer system can divide the storage space to a respective plurality of storage regions, and selects the final storage regions from the respective plurality of storage regions corresponding to each storage template. Optionally, the first storage template provides a lowest resource cost associated with storage of the plurality of product packages in the warehouse. Optionally, the first storage template is selected by a user via a user interface.

A non-transitory computer-readable medium has instructions stored thereon, which when executed by one or more processors cause the processors to perform any of the above methods. A computer system includes one or more processors and memory having instructions stored thereon, which when executed by the one or more processors cause the processors to perform any of the above methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 5B is an exemplary list of layers in the CAD file in accordance with some embodiments.

FIG. 7A is a plurality of individual text-based feature vectors corresponding to individual layers in a floor plan of a warehouse provided by a CAD file in accordance with some embodiments.

FIG. 7B is an overall text-based feature vector associated with the floor plan of the warehouse in accordance with some embodiments.

Like reference numerals refer to corresponding parts throughout the several views of the drawings.

DESCRIPTION OF EMBODIMENTS

Figure 1:
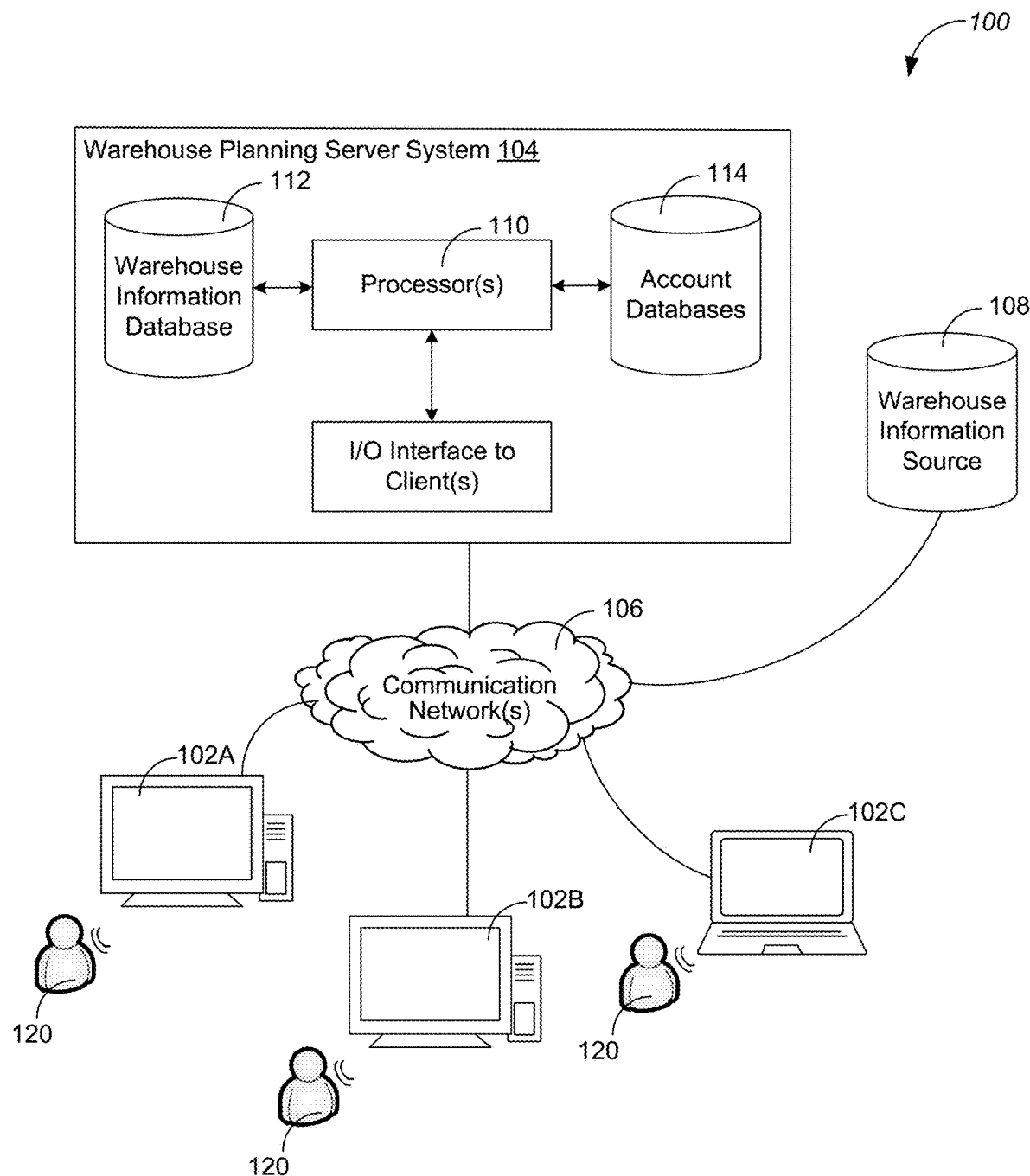
FIG. 1 is an exemplary network operating environment including one or more network-connected client devices and a server system interacting with each other via one or more communication networks in accordance with some embodiments.

In various embodiments of this application, a computer-implemented method is implemented via a warehouse space planning application to optimize usage of a storage space of a warehouse for storing a plurality of product packages based on floor plan information, inventory information and/or resource information. This warehouse space planning application covers one or more of the following functions: automatic warehouse layout design, storage cost quotation, user annotation of a CAD file, product data analysis, product-based project management, three-dimensional modeling of a warehouse space, business flow simulation, and warehouse database management. For example, the warehouse space planning application may automatically plan a storage space of a warehouse based on a specification of product packages to be stored in the warehouse and CAD information of the warehouse. In some situations, the CAD information is not available, and the warehouse space planning application predicts plausible floor plans and a storage area needed to store the quantity of product packages, e.g., by calculating shelf space, planning the storage space, creating regions in the storage space, and designing movement routes of the product packages within the warehouse. The storage space of the warehouse can therefore be planned by the warehouse space planning application to allow a large number of product packages to be accommodated and flow smoothly in a limited storage space. By these means, warehouse space planning involves little or no user intervention, and can be efficiently and promptly implemented by a computer system via the warehouse space planning application.

Specifically, the warehouse space planning application is implemented on a computer system that obtains floor plan information of a warehouse, e.g., a computer-aided design (CAD) file describing a floor plan of the warehouse with a plurality of patterns in a plurality of layers (e.g., wall, door, pillar, fire hydrant). The computer system automatically and without user intervention classifies the plurality of layers and the plurality of patterns in the CAD file into a plurality of physical structures that are arranged in the warehouse according to a plurality of classification rules, thereby identifying a first set of guard objects (e.g., inaccessible obstacle, dock, accessible area) among the plurality of physical structures on the floor plan of the warehouse. A user can enter an input (also called annotation) to amend errors in the automatic recognition process and to identify a second set of guard objects. The floor plan of the warehouse is customized to identify one or more storage spaces that are compatible with the first set of guard objects and the second set of guard objects. A graphic representation is rendered for the user at a client device to receive the input and display the original and customized floor plans of the warehouse. The graphic representation of the customized floor plan of the warehouse includes the one or more storage spaces, the first set of guard objects and the second set of guard objects. Further, in some embodiments, the computer system obtains inventory information (e.g., quantity, package type, package size) of a plurality of product packages to be stored in the warehouse, and determines a plurality of storage types (e.g., racking, shelving, shelving with mezzanines, stacking) and a storage area for a subset of the plurality of product packages associated with each of the plurality of storage types. In accordance with the storage area needed for each of the plurality of storage types, the storage space is divided into a plurality of storage regions for the plurality of product packages. Each storage region is uniquely associated with a respective one of the plurality storage types.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 is an exemplary operating environment 100 in which one or more network-connected client devices 102 and a server system 104 interact with each other via one or more communication networks 106 in accordance with some embodiments. The operating environment 100 corresponds to a virtual user domain created and hosted by the server system 104, and the virtual user domain includes a plurality of user accounts. For each user account, a user 120 can log onto the respective user account and extract relevant warehouse information on a client device 102 via a web browser or a dedicated warehouse planning application. In some embodiments, the dedicated warehouse planning application is implemented entirely on the client device 102 to plan a storage space of a warehouse by storing and extracting floor plan information, inventory information and resource information locally. In some embodiments, the web browser or dedicated warehouse planning application of the client device 102 displays a graphical user interface (GUI) via which user instructions are received and communicated to the server system 104. The client device 102 thereby plans the storage space of the warehouse jointly with server system 104. In some embodiments, warehouse space planning is made based at least partially on the floor plan, inventory, and resource information, which is optionally stored at the server system 104 or received from a warehouse information source 108 distinct from the server system 104.

The server system 104 is physically remote from, but is communicatively coupled to the one or more client devices 102. In some embodiments, a client device 102 (e.g., 102A, 102B) includes a desktop computer. In some embodiments, a client device 102 (e.g., 102C) includes a mobile device, e.g., a mobile phone, a tablet computer and a laptop computer. Each client device 102 communicates with another client device 102 or the server system 104 using the one or more communication networks 106. The communication networks 106 used can be one or more networks having one or more type of topologies, including but not limited to the Internet, intranets, local area networks (LANs), cellular networks, Ethernet, telephone networks, Bluetooth personal area networks (PAN) and the like. In some embodiments, two or more client devices 102 in a sub-network are coupled via a wired connection, while at least some client devices 102 in the same sub-network are coupled via a local radio communication network (e.g., ZigBee, Z-Wave, Insteon, Bluetooth, Wi-Fi and other radio communication networks). In an example, a client device 102 establishes a connection to the one or more communication networks 106 either directly (e.g., using 3G/4G connectivity to a wireless carrier), or through a network interface 160 (e.g., a router, switch, gateway, hub, or an intelligent, dedicated whole-home control node), or through any combination thereof.

The server system 104 includes one or more processors 110 and memory storing instructions for execution by the one or more processors 110. The server system 104 is configured to obtain floor plan information of the warehouse (e.g., in a CAD file) and/or inventory information of a plurality of product packages to be stored in the warehouse. The server system 104 is configured to determine a plurality of storage types and a storage area for a subset of the plurality of product packages associated with each of the plurality of storage types, and divide the storage space into a plurality of storage regions for the plurality of product packages in accordance with the storage area needed for each of the plurality of storage types. In some embodiments, the server system 104 is configured to automatically and without user intervention, classify layers and patterns in the floor plan information of the warehouse and identify one or more guard objects associated with the floor plan information of the warehouse. In some embodiments, the server system 104 is configured to obtain resource information of labor, tools and space used to store the plurality of product packages in the warehouse and divide the storage space based on an overall cost estimated based on the resource information.

In some embodiments, the server system 104 includes a warehouse information database 112 to store the floor plan information of the warehouse and/or the inventory information of the product packages to be stored in the warehouse. The floor plan information and the inventory information is optionally provided by a client device 102 and stored into the warehouse information database 112 in association with a user account. That said, the server system 104 includes an account database 114 configured to store user account information (e.g., user credentials, user account settings).

In some embodiments, the server system 104 stores the resource information of labor, tools and space locally in the warehouse information database 112. The resource information may be identical for all user accounts or customized for different user accounts. Alternatively, in some embodiments, the server system 104 receives the resource information of labor, tools and space from a warehouse information source 108 external to the server system 104, and customizes the resource information for different user accounts as needed. Customized resource information is stored in the warehouse information database 112 in association with a corresponding user account.

Each client device 102 includes one or more processors and memory storing instructions for execution by the one or more processors. The instructions stored on the client device 102 enable implementation of the web browser and the warehouse space planning application. The web browser and the warehouse space planning application are linked to a user account in the virtual user domain of the operating environment 100. Specifically, the browser or space planning application enables a GUI to load the floor plan information of the warehouse (e.g., load the CAD file), receive user annotations on the floor plan information, display storage spaces and guard objects identified by the server system 104, load or receive the inventory information of the product packages to be stored in the warehouse, and present storage regions assigned to the product packages. In some embodiments, the browser or space planning application enables a GUI to present a plurality of predefined storage templates, allowing a user of the client device 102 to select a preferred storage template. The plurality of predefined storage templates is optionally stored in a warehouse information database 112 of a server system 104 or a warehouse information source 108.

It is noted that in some embodiments, a warehouse space planning method is implemented at a client device 102 (i.e., not jointly at the client device 102 and the server system 104). In addition to the above operations via the GUI, the client device 102 is configured to determine a plurality of storage types and a storage area for a subset of the plurality of product packages associated with each of the plurality of storage types, and divide the storage space into a plurality of storage regions for the plurality of product packages in accordance with the storage area needed for each of the plurality of storage types. In some embodiments, the client device 102 is configured to automatically and without user intervention, classify layers and patterns in the floor plan information of the warehouse and identify one or more guard objects associated with the floor plan information of the warehouse. In some embodiments, the client device 102 is configured to obtain resource information of labor, tools and space and divide the storage space based on an overall cost estimated based on the resource information.

Figure 2:
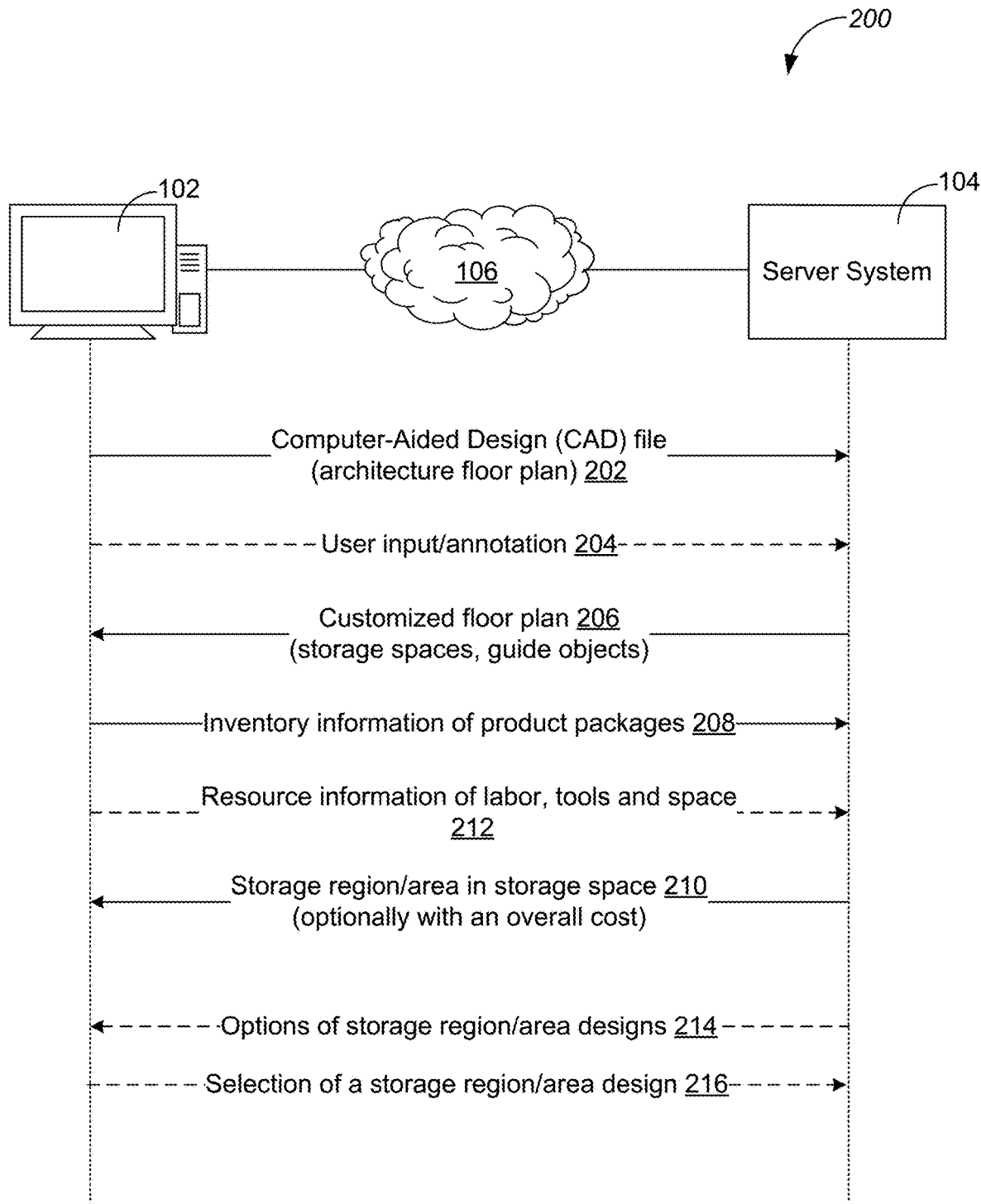
FIG. 2 is a data flow diagram illustrating data exchange between a client device and a server system during the course of planning a storage space of a warehouse in accordance with some embodiments.

FIG. 2 is a data flow diagram 200 illustrating that data is exchanged between a client device 102 and a server system 104 during the course of planning a storage space of a warehouse in accordance with some embodiments. The client device 102 and server system 104 are coupled to each other via the one or more communication networks 106, and the data is exchanged therebetween via the networks 106. Optionally, the data is provided and received by the client device 102 via a GUI enabled by a browser (i.e., a web browser or Internet browser). Optionally, the client device 102 is installed with a dedicated warehouse space planning application configured to enable a GUI to facilitate data exchange between the client device 102 and server system 104.

The client device 102 provides the server system 104 with floor plan information 202 of the warehouse whose storage space needs to be planned. In some embodiments, the floor plan information 202 includes a CAD file describing a floor plan of the warehouse with a plurality of patterns in a plurality of layers. For example, the CAD file has a DWG file format, and is created in AutoCAD Architecture, which is a version of AutoCAD with tools and functions suited to architectural work. The CAD file is optionally stored locally in the client device 102, and uploaded to the server system 104. Alternatively, the CAD file is stored in a cloud-based storage server (not shown in FIG. 2), and the floor plan information 202 includes an access path (e.g., a hyperlink) to the CAD file. The server system 104 obtains the CAD file from the cloud-based storage server according to the floor plan information 202 provided by the client device 102.

While the floor plan information 202 is provided to the server system 104, the client device 102 is also allowed to review the floor plan information 202 of the warehouse on its GUI provided via a browser or dedicated planning application. In some embodiments, a user of the client device 102 may provide an input (also called user annotation) 204 on the GUI to define a physical structure or guide object on the floor plan of the warehouse. Each guard object corresponds to one of a plurality of predefined object types that is involved in placement, storage or movement of packages in the warehouse, and the plurality of predefined object types includes one or more of: a wall defining the one or more storage spaces, a pillar, an obstacle, a user-reachable space, a user-inaccessible space, and one or more exits of the warehouse. In some embodiments, an object type related to the exits of the warehouse is specifically related to one of a dock entrance (DOCK_IN), a dock exit (DOCK_OUT), a dock pass way (DOCK_INOUT), a product exit (EXIT_PRODUCT), and a personnel exit (EXIT_PEOPLE). These exits may have different sizes, smaller exits for people and larger exits for products and equipment.

The server system 104 identifies a customized floor plan 206 from the floor plan information provided by the server system 104. The customized floor plan 206 is focused on storage-related features of the floor plan and neglects some architectural features. Specifically, the customized floor plan includes one or more storage spaces that can be used to store product packages and a plurality of guide objects that impacts placement, storage or movement of the product packages in the warehouse. The plurality of guide objects includes the one or more guide objects identified based on the user input 204 and a set of guide objects determined from the floor plan information by the server system 104 itself. For example, the server system 104 may automatically extract the set of guide objects from the layers of the CAD file, e.g., pillars from rectangular shapes in a pillar layer of the CAD file, storage spaces (i.e., rooms) from connected lines in a wall layer and a door layer, exits from the door layer and a stairway layer, and an obstacle from any geometrical patterns in a fire hydrant layer. Upon receiving the customized floor plan 206, the client device 102 displays it on its GUI, allowing the user to review and modify the storage spaces and guide objects identified in the customized floor plan 206.

The client device 102 also provides inventory information 208 of the product packages to be stored in the warehouse. The inventory information 208 includes one or more of a package type, a quantity, a package size, an expected weight, a maximal weight, an access frequency, and a storage type of each of the product packages. Optionally, the client device 102 displays an inventory form on its GUI to receive user inputs of the inventory information. Optionally, the client device 102 provides information of an existing inventory file to the server system 104, leaving the server system 104 to extract the inventory information 208 from the existing inventory file. In some embodiments, the information of the existing inventory file includes an access path (e.g., a hyperlink), and the server system 104 obtains the existing inventory file according to the access path. Upon obtaining the inventory information 208, the server system 104 divides each of the storage spaces into a plurality of storage regions or areas 210 to store the product packages according to their storage types as indicated by the inventory information 208.

In some embodiments, the client device 102 provides resource information 212 of labor, tools and space to the server system 104. Examples of the resource information 212 include, but are not limited to, wages of warehouse labor, number of employees needed to manage a unit storage space, types of tools needed to manage different storage types, prices of tools, space requirements related to different storage types, and construction, maintenance or rental costs of the storage space. The client device 102 may upload a resource file containing the resource information 212 or identify an access path (e.g., a hyperlink) to a location where the resource information 212 is offered. That said, in some embodiments, the client device 102 identifies the access path to the warehouse information source 108, and the server system 104 downloads the resource information 212 from the warehouse information source 108 accordingly. Alternatively, in some embodiments, the server system 104 stores the resource information 212 in its internal warehouse information database 112, and extracts the resource information 212 from the warehouse information database 112 if needed. Given the resource information 212, the server system 104 may estimate an overall cost of storing the product packages in the warehouse according to certain storage regions.

In some embodiments, a storage space of the warehouse can be divided into a plurality of storage regions according to a plurality of predefined storage templates 214. The client device 102 displays the predefined storage templates 214 on the GUI of the browser or space planning application, allowing the user to select one of the predefined storage templates 214. Upon receiving the user selection 216, the server system 104 divides the storage space into a particular set of storage regions according to the selected one of the predefined storage templates 214. In some embodiments, the server system 104 can adjust locations of the product packages in the particular set of storage regions to optimize the overall cost.

Figure 3:
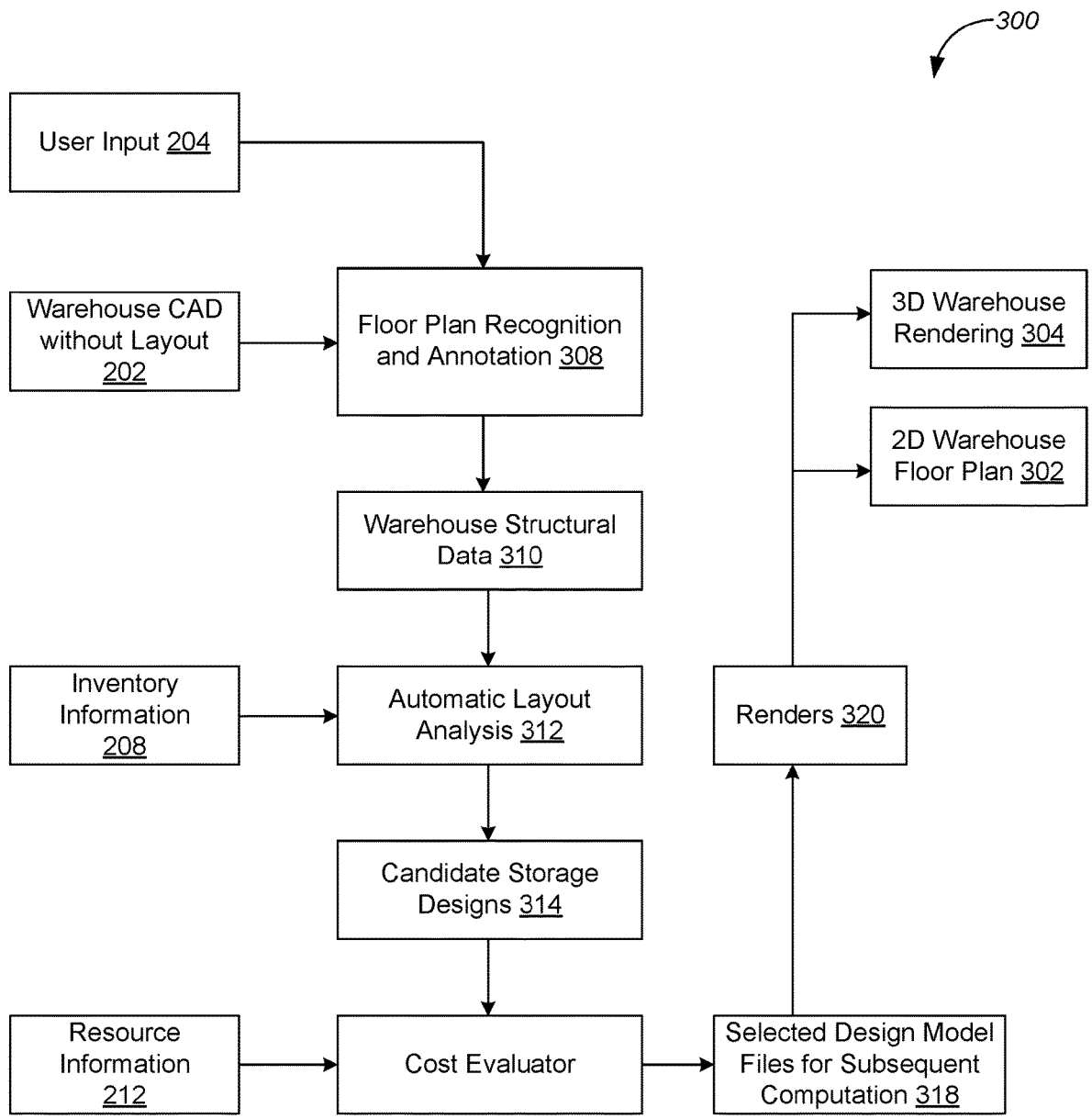
FIG. 3 is an exemplary flowchart of a warehouse space planning process in accordance with some embodiments.

FIG. 3 is an exemplary flowchart of a warehouse space planning process 300 in accordance with some embodiments. The warehouse space planning process 300 involves a plurality of inputs entered via a GUI enabled on the client device 102 and a plurality of outputs rendered at the GUI for a user of the client device 102. The plurality of inputs includes one or more of: floor plan information 202, user inputs or annotations 204, inventory information 208 of product packages to be stored in a warehouse, and resource information 212 of labor, tools, and space. The plurality of outputs rendered on the client device 102 includes a two-dimensional (2D) warehouse floor plan 302 and a three-dimensional (3D) warehouse rendering 304.

A sequence of operations 308-320 of the warehouse space planning process 300 is implemented in a computer system (e.g., the client device 102, server system 104) which executes a warehouse space planning application for this purpose. The warehouse space planning process 300 starts with a floor plan recognition and annotation operation 308 in which the computer system obtains the floor plan information 202, e.g., a CAD file describing a floor plan of the warehouse with a plurality of patterns in a plurality of layers, and a user input 204. The CAD file may be originally designed and prepared by a designer who is distinct from a user 120 involved in the warehouse space planning process 300. The CAD file optionally has a non-standard format of a heterogeneous nature. Physical structures are recognized from the CAD file. In some embodiments, the interactive user input 204 is entered to add one or more physical structures to, delete one or more physical structures from, or modify the physical structures recognized from the CAD file, thereby improving an accuracy of automatic floor plan recognition. These physical structures include guard objects that impact placement, storage or movement of the product packages in the warehouse. As a result, the floor plan recognition and annotation operation 308 provides warehouse structural data 310 including a plurality of physical structures each of which is recognized by the computer system or added, deleted or modified via the user input 204.

The warehouse structural data 310 is processed via an automatic layout analysis operation 312 to offer one or more candidate storage designs 314 of the storage space of the warehouse based on the inventory information 208 of the product packages to be stored in the storage space. The inventory information 208 includes one or more of a package type, a quantity, a package size, an expected weight, a maximal weight, an access frequency, and a storage type of each of the product packages. The computer system analyzes the floor plan (also called layout) of the warehouse to identify a plurality of static rules for placing the plurality of product packages in the storage space of the warehouse, and determines a plurality of storage types (e.g., racking, shelving, shelving with mezzanines, stacking) based on the inventory information of the plurality product packages. The plurality of static rules defines at least how each product package can be stored using at least one of the plurality of storage types, e.g., detergent bottles are stocked in carton boxes that can be stacked up to four tiers. For each of the plurality of storage types, a respective storage area is identified within the storage space of the warehouse for a subset of the plurality of product packages that can be stored with the respective storage type in compliance with the plurality of static rules. Each candidate storage design 314 corresponds to a plurality of storage regions that is divided from the storage space of the warehouse for the plurality of product packages.

In some embodiments, a plurality of candidate storage designs 314 are available to stock the plurality of product packages within the storage space of the warehouse. The resource information 212 of labor, tools and space is applied in a cost evaluator 306 to estimate an overall cost associated with each candidate storage design 314 and compare the candidate storage designs 314 based on their respective overall costs. For each product package to be stored in the warehouse, each operation of loading, unloading and transporting incurs a cost associated with labor, equipment and space involved in the respective operation. A candidate storage design 314 having a lower overall cost is more desirable. For example, product packages having a greater turnover rate (i.e., a higher access frequency) are stored closer to an exit or placed at a lower rack than product packages having a lower turnover rate. Product packages that are more difficult to transport are stored closer to an exit than product packages that are easier to transport. Otherwise, the product packages that have the greater turnover rate or are more difficult to transport may incur additional labor and equipment costs, causing the overall cost of a corresponding candidate storage design 314 to be less desirable.

One of the plurality of candidate storage designs 314 is selected based on the overall cost estimated using the resource information 212 of labor, tools and space. In some embodiments, the CAD file corresponding to the selected candidate storage design 314 is used (318) for subsequent operations including rendering a graphic representation of the selected candidate storage design 314. The graphic representation includes one or more storage spaces (e.g., storage rooms in the warehouse) and the physical structures recognized or annotated in the storage spaces of the warehouse. In some embodiments, the graphic representation include at least one of the 2D warehouse floor plan 302 and the 3D warehouse rendering 304, optionally with or without the plurality of product packages that are placed in the warehouse in accordance with the warehouse space planning process 300. Alternatively, in some embodiments, storage regions of the plurality of storage types are marked on the 2D warehouse floor plan 302 or the 3D warehouse rendering 304 without showing the plurality of product packages.

In some embodiments, the CAD file is not available at the time of implementing the warehouse space planning process 300, and the warehouse space planning process 300 is repurposed to determine a storage area needed to accommodate the plurality of product packages to be stored in the warehouse. The warehouse space planning process 300 starts with a presumed storage space having a predefined storage area that is relatively small. The storage area of the presumed storage space is gradually increased until the plurality of product packages is entirely accommodated by the storage area. The candidate storage designs 314 are applied for each increased storage area. In some embodiments, each of the candidate storage designs 314 corresponds to a respective storage area that can accommodate the plurality of product packages, and the warehouse space planning process 300 provides a statistical distribution or a range of the storage areas of the warehouse that can accommodate the plurality of product packages according to the candidate storage designs 314.

Figure 4:
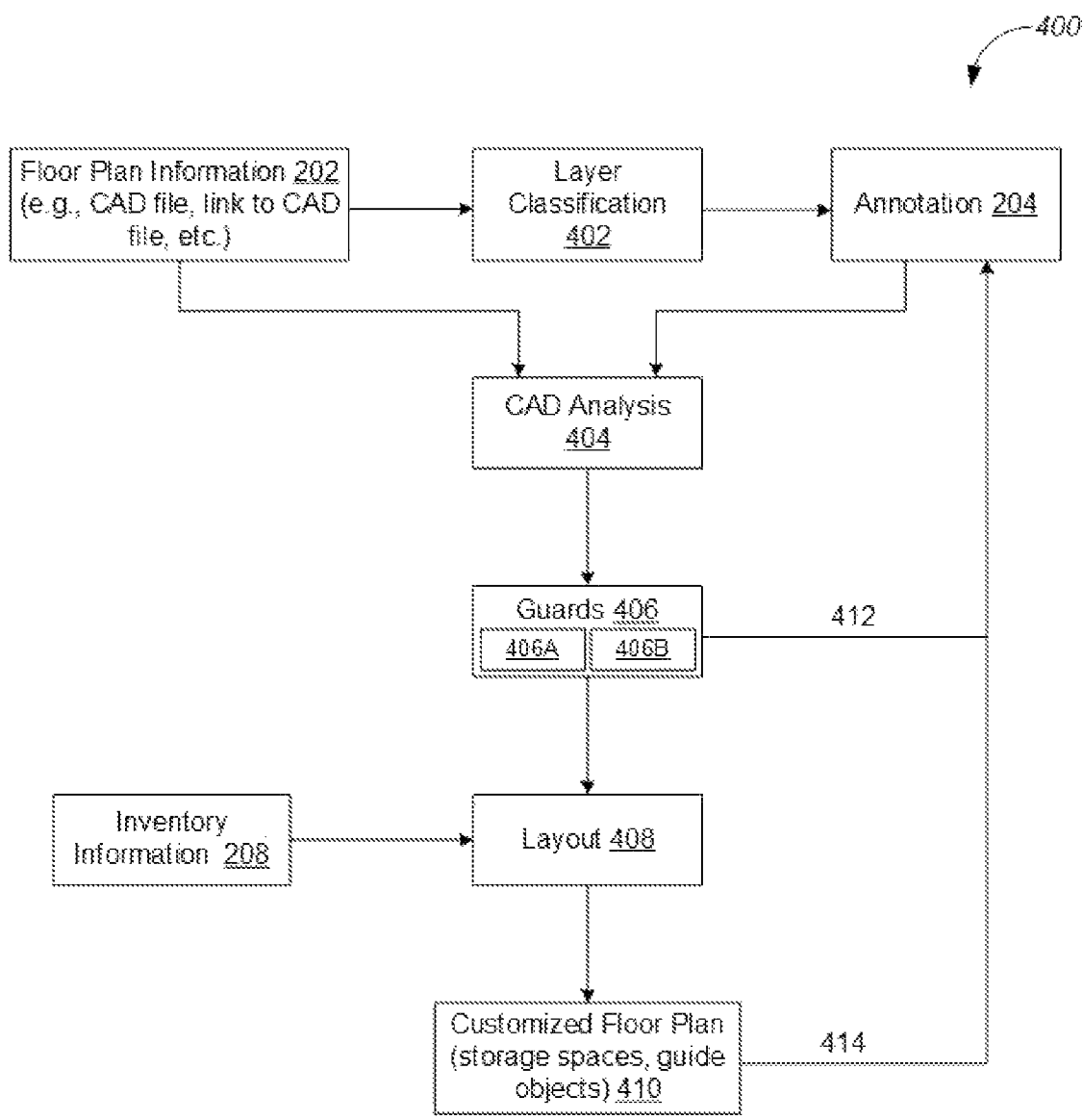
FIG. 4 is an exemplary flowchart of an iterative warehouse space planning process in accordance with some embodiments.

FIG. 4 is an exemplary flowchart of an iterative warehouse space planning process 400 in accordance with some embodiments. The warehouse space planning process 400 is implemented at a computer system having one or more processors and memory storing instructions for execution by the one or more processors. The computer system includes a client device 102, a server system 104 or both, and is configured to identify one or more storage spaces (e.g., one or more storage rooms) and a plurality of guard objects therein. Specifically, the computer device obtains floor plan information 202 of a warehouse, e.g., a CAD file describing a floor plan of the warehouse, a link to the CAD file. The CAD file describes the floor plan of the warehouse with a plurality of patterns in a plurality of layers. The plurality of layers includes one or more of a wall layer, a pillar layer, a door layer, and a fire hydrant layer. In accordance with a plurality of classification rules, the computer system automatically and without user intervention classifies (402) the plurality of layers and the plurality of patterns in the CAD file into a plurality of physical structures (e.g., door, wall, pillar, staircase, gutter) that are arranged in the warehouse. The computer system analyzes (404) the CAD file to identify a first set of guard objects 406A among the plurality of physical structures on the floor plan of the warehouse, and receives a user input 204 (also called user annotation 204) to identify a second set of guard objects 406B. Based on the floor plan 408 of the warehouse, the floor plan of the warehouse is then customized (410) to identify one or more storage spaces that are compatible with the first set of guard objects and the second set of guard objects. A graphic representation of the customized floor plan of the warehouse is presented to a user 120 of the client device 102 to show the one or more storage spaces, the first set of guard objects and the second set of guard objects on the floor plan.

In some embodiments, after the first and second sets of guard objects 406 are reviewed (412) by a user, the computer system receives a user annotation 204 on the CAD file, and in accordance with the user annotation 204, updates classification of the plurality of layers and the plurality of patterns in the CAD file according to the plurality of classification rules. As a result of updating the classification, a third set of guard objects is identified on the floor plan of the warehouse. The third set of guard objects identifies additional guard objects or modifies the first set of guard objects, the second set of guard objects or both. Customization of the floor plan of the warehouse 410 is also updated to render an updated graphic representation including one or more updated storage spaces and the third set of guard objects on the floor plan. The updated storage spaces are optionally identical to or distinct from the storage spaces originally determined from CAD file analysis 404.

In some embodiments, after the graphic representation of the customized floor plan of the warehouse is presented (414) to the user of the client device 102, the computer system receives a user annotation 204 on the CAD file, and in accordance with the user annotation 204, updates classification 402 of the plurality of layers in the CAD file and customization 410 of the floor plan of the warehouse is also updated to render another updated graphic representation including one or more updated storage spaces and a fourth set of guard objects on the floor plan. The updated storage spaces are optionally identical to or distinct from the storage spaces originally determined from CAD file analysis 404.

In some embodiments, the user annotation 204 associates a layer of the CAD file with a type of physical structures from which one or more guard objects are identified, and as a result, all patterns in the layer are associated with the one or more guard objects. In some embodiments, the user annotation 204 associates a pattern in a layer of the CAD file with a physical structure that is optionally identified as a guard object. In some embodiments, the user annotation 204 associates a layer of the CAD file or a pattern in a layer of the CAD file with a guard object directly. In some embodiments, the user annotation 204 selects a layer of the CAD file and adds a pattern in the selected layer as a guard object. More details on user annotations 204 are described below with reference to FIGS. 5A and 5B.

Figure 5A:
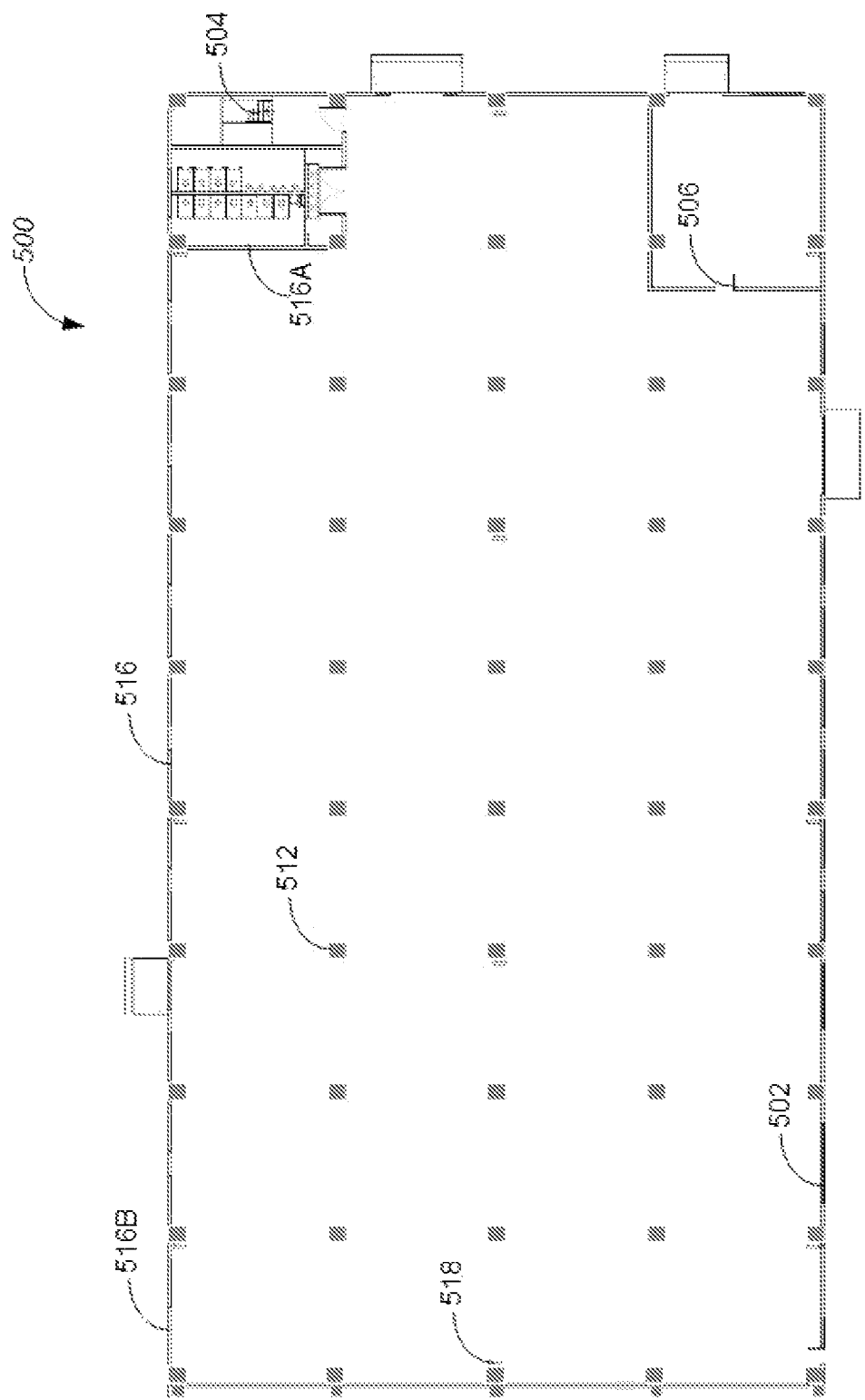
FIG. 5A is an exemplary diagram of a floor plan of a warehouse provided by a CAD file in accordance with some embodiments.

FIG. 5A is an exemplary diagram of a floor plan 500 of a warehouse provided by a CAD file in accordance with some embodiments, and FIG. 5B is an exemplary list of layers 550 in the CAD file in accordance with some embodiments. The CAD file is parsed by the computer system and presented to the user 120 on a display screen of the client device 102 associated with the user. In the CAD file, the floor plan 500 of the warehouse includes a plurality of patterns made of lines and/or shapes in a plurality of layers. Each layer is represented in a respective color on a GUI of a corresponding web browser or warehouse space planning application. The plurality of layers in the floor plan includes one or more structural layers associated with physical structures of the warehouse, and examples of these structural layers include, but are not limited to, a docks layer 502, a stairs layer 504, a door layer 506, a beam layer 508, a column base layer 510, a column layer 512, a gutter layer 514, one or more wall layers 516 (e.g., a separation wall layer 516A, an equipment space wall 516B), and a fire hydrant layer 518. In some embodiments, the plurality of layers in the floor plan further includes a subset of virtual layers (e.g., a text layer 520) that is used to facilitate warehouse design and space planning and is not associated with any physical structures of the warehouse.

In some embodiments, the list of layers 520 used in the CAD file is displayed with the floor plan 500 of the warehouse on the GUI of the browser or space planning application, allowing the user of the client device 102 to select a subset of the layers 520 (e.g., the layers 502-508, 512, 516 and 518) to be displayed on the GUI. Each layer is optionally associated with a respective selection affordance 526 to turn on or off display of the respective layer on the GUI of the client device 102.

The user can also enter a user input or annotation 204 to associate each individual layer with a respective object type (e.g., walls, columns) that is involved in placement, storage or movement of packages in the warehouse. In this example shown in FIG. 5B, a menu is associated with the separation wall layer 516A, and configured to pop out in response to a user selection of a menu affordance item 522. The user selects an object type of "walls," thereby annotating the separation wall layer as the object type of "wall." Any patterns depicted in the separation wall layer 516A is associated with an object type of "walls." When the layers of the floor plan 500 are classified, the patterns depicted in the separation wall layer 516A are regarded as walls based on the user selection or annotation of "walls" according to corresponding classification rules. Likewise, another menu is associated with the column layer 512, and configured to pop out in response to a user selection of a menu affordance item 524. The user selects an object type of "pillars," thereby annotating the column layer 512 as the object type of "pillars." Any patterns depicted in the column layer 512 is associated with an object type of "pillars." The patterns depicted in the column layer 512 are therefore classified as pillars based on the user selection or annotation of "pillars" according to corresponding classification rules. Further, in some instances, no menu is associated with a layer (e.g., the note layer 520), nor can a user annotation be entered for the layer.

In some embodiments, an individual pattern in one of the layers 502-518 is selected and annotated with a corresponding object type, independently of other patterns in the same and distinct layers of the layers 502-518. In some embodiments, the user of the client device 102 adds a pattern on one of the layers 502-518 and annotate the pattern with a corresponding object type.

In some embodiments, before the user annotates any of the layers 502-518 or any pattern therein, the plurality of layers 502-518 and the plurality of patterns in the floor plan are classified into a plurality of physical structure automatically and without user intervention, and a first set of guide objects are identified among the plurality of physical structures on the floor plan of the warehouse. The above described user input or annotation creates a second set of guide objects each of which is newly added or modified from one of the first set of guide objects. Each guard object in the first and second sets corresponds to a geometric shape (e.g., a rectangle, a polygon), and is a virtual and non-physical object considered in the context of warehouse space planning. Each guard object has a respective object type, e.g., obstacle, accessible, and dock. Optionally, a guard object (e.g., one of the first set of guard objects) is associated with one of the plurality of layers in the CAD file. Optionally, a guide object is created using an existing or new virtual layer that is not associated with any physical structures.

In some situations, AI techniques (e.g., machine learning) are applied to classify the plurality of layers and the plurality of patterns in the CAD file automatically. The GUI of the browser and space planning application is populated with automatic classification results including the first set of guard objects. The user of the client device 102 creates the second set of guide objects by adjusting the pre-populated classification results. More details on classifying layers with AI techniques are discussed below with reference to FIGS. 7A-7B and 8A-8D. For brevity, those details are not repeated here.

A guard object having an object type of "obstacle" is considered as an obstacle, and a corresponding area on the floor plan of the warehouse is not used for storage. No rack, shelf or stack is placed on the area corresponding to the guard object having the object type of "obstacle," nor is this area counted into any storage area used to store a subset of the product packages to be stored in the warehouse. A guard object having an object type of "accessible" corresponds to an accessible area on the floor plan of the warehouse that is reachable by a person. Optionally, the accessible area is not associated with any of the plurality of layers in the CAD file. Further, a guard object having an object type of "pillars" acts like an obstacle because a corresponding area on the floor plan of the warehouse is not used for storage. In some embodiments, the guard object having the object type of "pillars" is at least partially surrounded with racks and does not stand in an aisle between two racks.

In some embodiments, an entire layer is automatically classified to guard objects of the same object type. Alternatively, a layer might contain different physical structures and be automatically classified to guard objects of more than one object type. For example, a "door" layer corresponds to loading docks and exits for people. The computer system automatically classifies different shapes in the "door" layer to a first guard object having a first object type of "docks," a second guard object having a second object type of "exits," and a third guard object having a third object type of "merchandise doors." Further, in some situations, the user may add another guard object of the first object type of "docks" on the "door" layer.

Figure 6A:
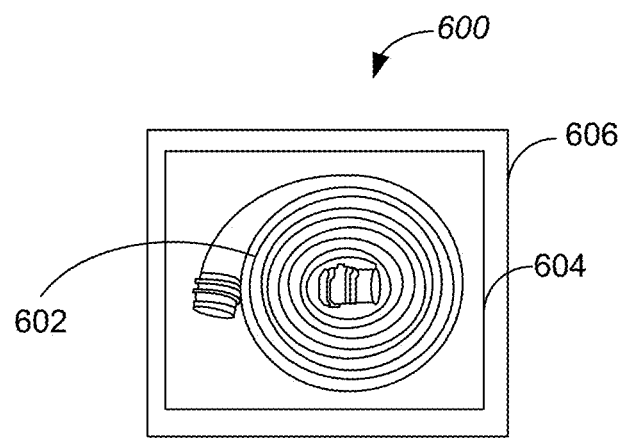
FIG. 6A is an exemplary diagram of one guard object identified with respect to a fire hydrant shown on the floor plan provided by the CAD file in accordance with some embodiments.

FIG. 6A is an exemplary diagram of one guard object 600 identified with respect to a fire hydrant 602 shown on the floor plan provided by the CAD file in accordance with some embodiments. In accordance with one of the classification rules, each fire hydrant 602 in the floor plan of the warehouse is automatically classified to and associated with two guard objects including a first guard object 604 having a first object type of "accessible" and a second guard object 606 having a second object type of "obstacles." Space within a predefined distance of the fire hydrant 602 is prohibited from being used for storing any product package, and the classification rule associated with the fire hydrant 602 reflects this requirement. Thus, the second guard object 606 is expanded from the fire hydrant 602 in compliance with the classification rule associated with the fire hydrant 602.

Figure 6B:
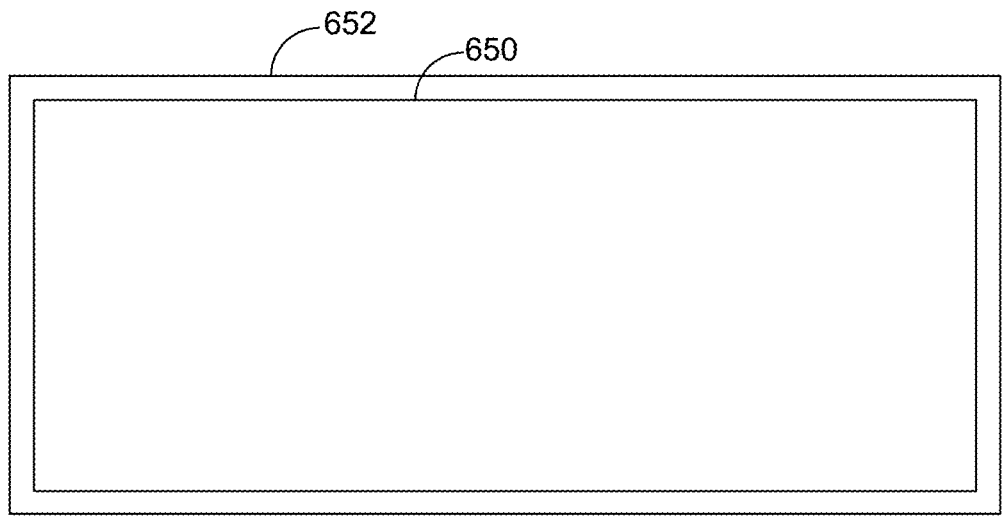
FIG. 6B is an exemplary diagram of a guard object that is automatically identified from a wall layer shown on the floor plan provided by the CAD file in accordance with some embodiments.

FIG. 6B is an exemplary diagram of a guard object 650 that is automatically identified from a wall layer 652 shown on the floor plan provided by the CAD file in accordance with some embodiments. A wall 652 in the CAD file is automatically classified to and associated with a guard object 650 having an object type of "wall." During the course of recognizing the guard object 650, the wall 652 is altered (e.g., reduced by a predefined size) to result in the guard object 650 according to a classification rule associate with the wall 652. This guard object ensures that no storage is placed within this given distance to the wall 652.

Machine learning can be involved in automatically classifying layers and patterns in the floor plan of the warehouse to different types of physical structures corresponding to a plurality of physical structures that are arranged in the warehouse. For example, in some embodiments, each of the plurality of layers is rendered into a respective layout image, and the respective layout image is processed using a predefined convolutional neural network to associate the respective layer with a respective type of physical structures, e.g., a layer is associated with a physical structure type of "walls." One or more patterns in the image of the respective layer are associated with the physical structure type of "walls," and identified as a subset the first set of guide objects, specifically as guide objects having a guide object type of "walls" based on the physical structure type of "walls."

Alternatively, in some embodiments, for each of the plurality of layers, a respective layer feature vector is extracted from the CAD file and has a predefined dimension. In accordance with a predetermined machine learning (ML) method, the respective layer is associated with a respective type of physical structures (e.g., "walls") corresponding to the plurality of physical structures based on the respective layer feature vector. In an example, for each layer, the respective layer feature vector is obtained by concatenating a first text-based feature vector and a second pattern-based feature vector. Optionally, the predetermined ML method is based on one or more of a Random Forest classifier, a Naive Bayes classifier, an Ensemble Modeling classifier, a Support Vector Machine (SVM) classifier and the like. Each of these classifiers is used to process the first text-based feature vector, the second pattern-based feature vector and/or the respective layer feature vector for the purposes of classifying the layers and shapes in the CAD file.

Figure 7B:
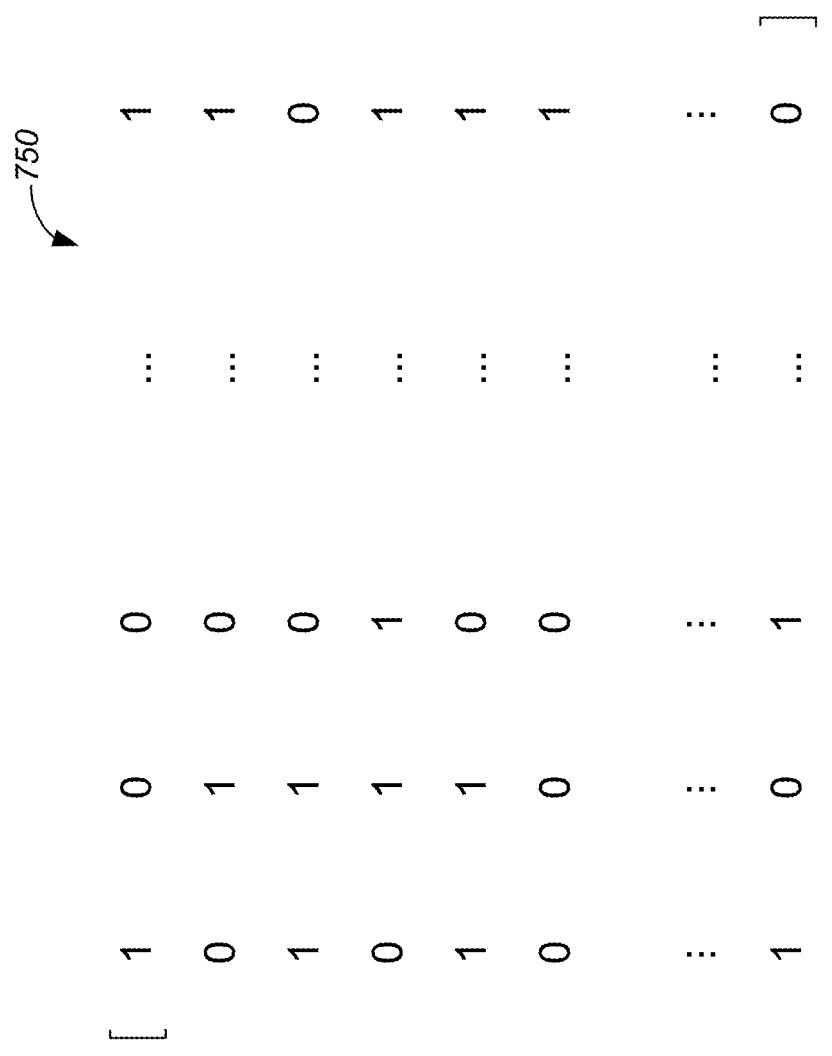

FIG. 7A is a plurality of individual text-based feature vectors 700 corresponding to individual layers in a floor plan of a warehouse provided by a CAD file in accordance with some embodiments, and FIG. 7B is an overall text-based feature vector 750 associated with the floor plan of the warehouse in accordance with some embodiments. The computer system keeps a dictionary of a number of groups of patterns, and each of the groups of patterns includes a list of predefined substantially synonymous patterns. Each of the plurality of layers in the CAD file corresponds to a respective individual text-based feature vector 700. If the dictionary has N groups of patterns, the individual text-based feature vector 700 corresponding to a layer in the CAD file has N dimensions, e.g., has N elements, and each element corresponds to a respective group of patterns. For each element in the respective N-dimensional text-based feature vector 700, if it is determined that one of the substantially synonymous patterns of the corresponding group is found in the respective layer, the respective element is set to 1. Otherwise, if it is determined that none of the substantially synonymous patterns of the corresponding group is found in the respective layer, the respective element is set to 0. In some embodiments, the respective N-dimensional text-based feature vectors 700 corresponding to at least a subset of the plurality of layers in the CAD file are combined to provide the overall text-based feature vector 750.

In some embodiments, for each layer in the CAD file, the individual text-based feature vector 700 is concatenated with a pattern-based feature vector of the respective layer (e.g., 840 in FIG. 8D) to result in a layer feature vector corresponding to the respective layer. Each of the plurality of layers can be associated with a respective type of physical structure or guard object based on the respective layer feature vector in accordance with a predetermined ML method. Alternatively, in some embodiments, a subset of layers are involved in classifying these layers to physical structures in the warehouse, e.g., an exit is determined based on both a wall layer and a door layer. The overall text-based feature vector 750 is concatenated with a pattern-based feature vector involving the subset of the plurality of layers to result in an overall layer feature vector corresponding to the subset. The subset of the plurality of layers is associated with a respective subset of a plurality of physical structures or guard objects based on the overall layer feature vector in accordance with a predetermined ML method. Examples of classifiers used in the predetermined ML method include, but are not limited to, a Random Forest classifier, a Naive Bayes classifier, an Ensemble Modeling classifier, and a SVM classifier.

Figures 8A, 8B:
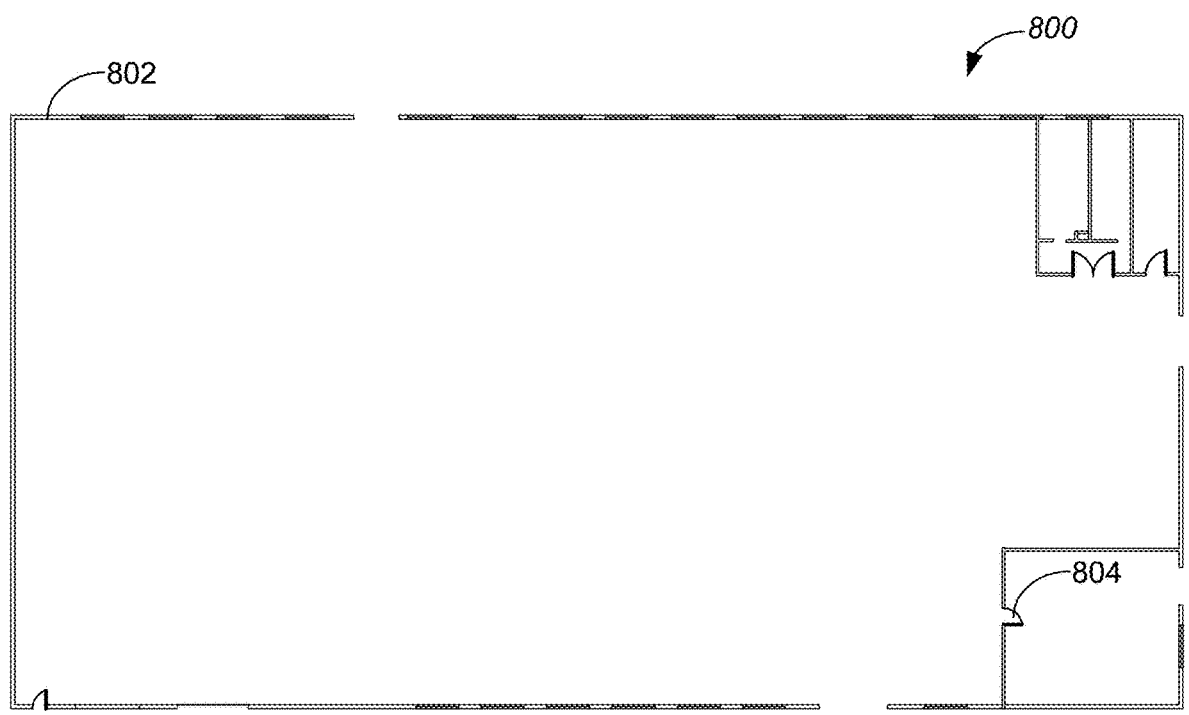
FIGS. 8A, 8B and 8C are three exemplary subsets of layers included in a floor plan of a warehouse provided by a CAD file in accordance with some embodiments.
Figure 8C:
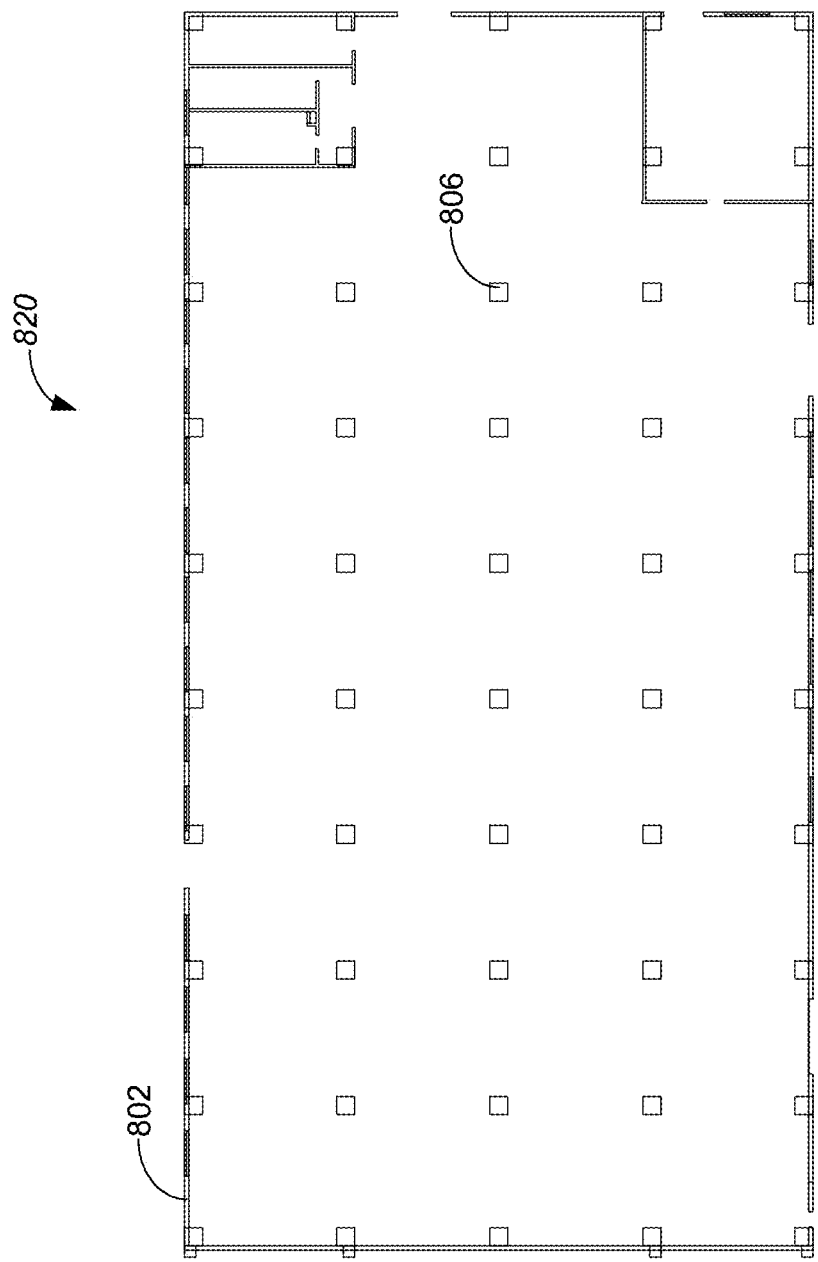

FIGS. 8A, 8B and 8C are three exemplary subsets of layers 800, 810 and 820 included in a floor plan of a warehouse provided by a CAD file in accordance with some embodiments, respectively. The subset of layers 800 includes a first layer 802 ("wall") and a second layer 804 ("door"), and the subset of layers 810 only includes the second layer 804 ("door"). The subset of layers 820 includes the first layer 802 ("wall") and a third layer 806 ("pillar"). For each of FIGS. 8A-8C, other layers distinct from the subset of layers 800, 810 or 820 are disabled from visualization on the GUI. Each of the plurality of layers in the floor plan includes a plurality of patterns, e.g., straight line, arc line, rectangle, ellipse, and polygon. In some embodiments, lines defining each of the storage spaces in the warehouse are identified according to patterns in the wall layer and door layer. In some embodiments, for each pattern in each layer, a respective number of occurrence is counted and applied to establish a pattern histogram for the respective layer. The histogram is used as a pattern distribution feature vector that captures distribution of different patterns in each layer or in the plurality of layers.

Figure 8D:
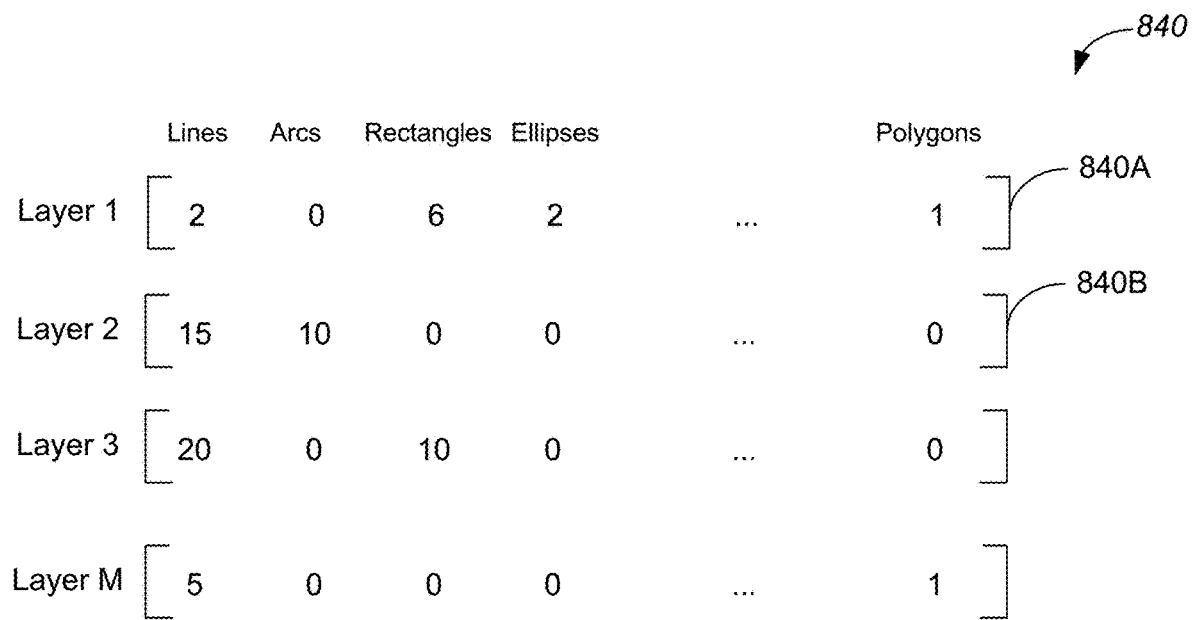
FIG. 8D is an exemplary set of individual pattern-based feature vectors derived from a histogram of layers in the CAD file in accordance with some embodiments.
Figure 8E:
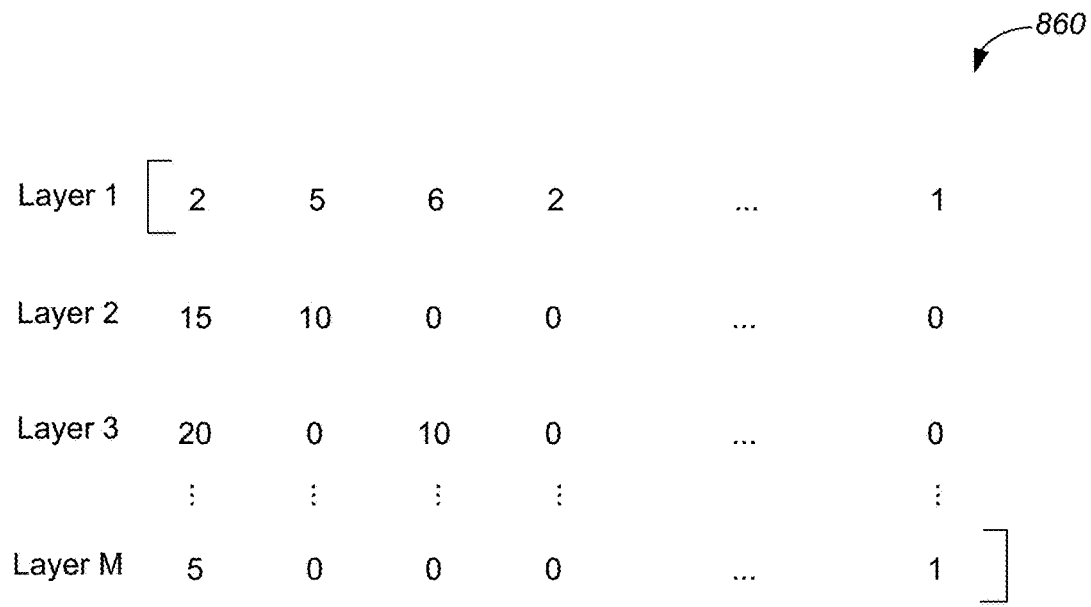
FIG. 8E is an exemplary overall pattern-based feature vector associated with a subset of layers in accordance with some embodiments.

FIG. 8D is an exemplary set of individual pattern-based feature vectors 840 derived from a histogram of layers in the CAD file in accordance with some embodiments, and FIG. 8E is an exemplary overall pattern-based feature vector 860 associated with a subset of layers in accordance with some embodiments. Each individual pattern-based feature vector 840 has a predetermined number of dimensions, and each dimension corresponds to a predetermined pattern (line or shape) according to its position in the respective pattern-based feature vector 840. For example, the first four numbers in each individual pattern-based feature vector 840 correspond to numbers of straight lines, arc lines, rectangles, and ellipses in a respective layer, and the last number corresponds to a number of polygons (which has more than 4 sides) in the respective layer. The individual pattern-based feature vector 840A includes 2 straight lines, no arc line, 6 rectangles, 2 ellipses and 1 polygon. In another example, the individual pattern-based feature vector 840B includes 10 arc lines, indicating that the corresponding layer has a layer type of "doors" and that patterns on the corresponding layer can be classified into physical structures of "doors." In some embodiments, the individual pattern-based feature vectors 840 corresponding to at least a subset of the plurality of layers in the CAD file are combined to provide the overall pattern-based feature vectors 860.

In some embodiments, an individual pattern-based feature vector 840 is concatenated with a text-based feature vector (e.g., 700 in FIG. 7) to result in a layer feature vector corresponding to each layer. Each of the plurality of layers can be associated with a respective type of physical structures or guard objects based on the respective layer feature vector in accordance with a predetermined ML method. Alternatively, in some embodiments, a subset of layers are involved in classifying these layers to physical structures in the warehouse, e.g., an exit is determined based on both a wall layer and a door layer. The overall pattern-based feature vector 860 is concatenated with a pattern-based feature vector involving the subset of the plurality of layers to result in an overall layer feature vector corresponding to the subset. The subset of the plurality of layers is associated with a respective subset of predefined physical structure types or guard object types based on the overall layer feature vector in accordance with a predetermined ML method. Examples of classifiers used in the predetermined ML method include, but are not limited to, a Random Forest classifier, a Naive Bayes classifier, an Ensemble Modeling classifier, and a SVM classifier.

Figure 9A:
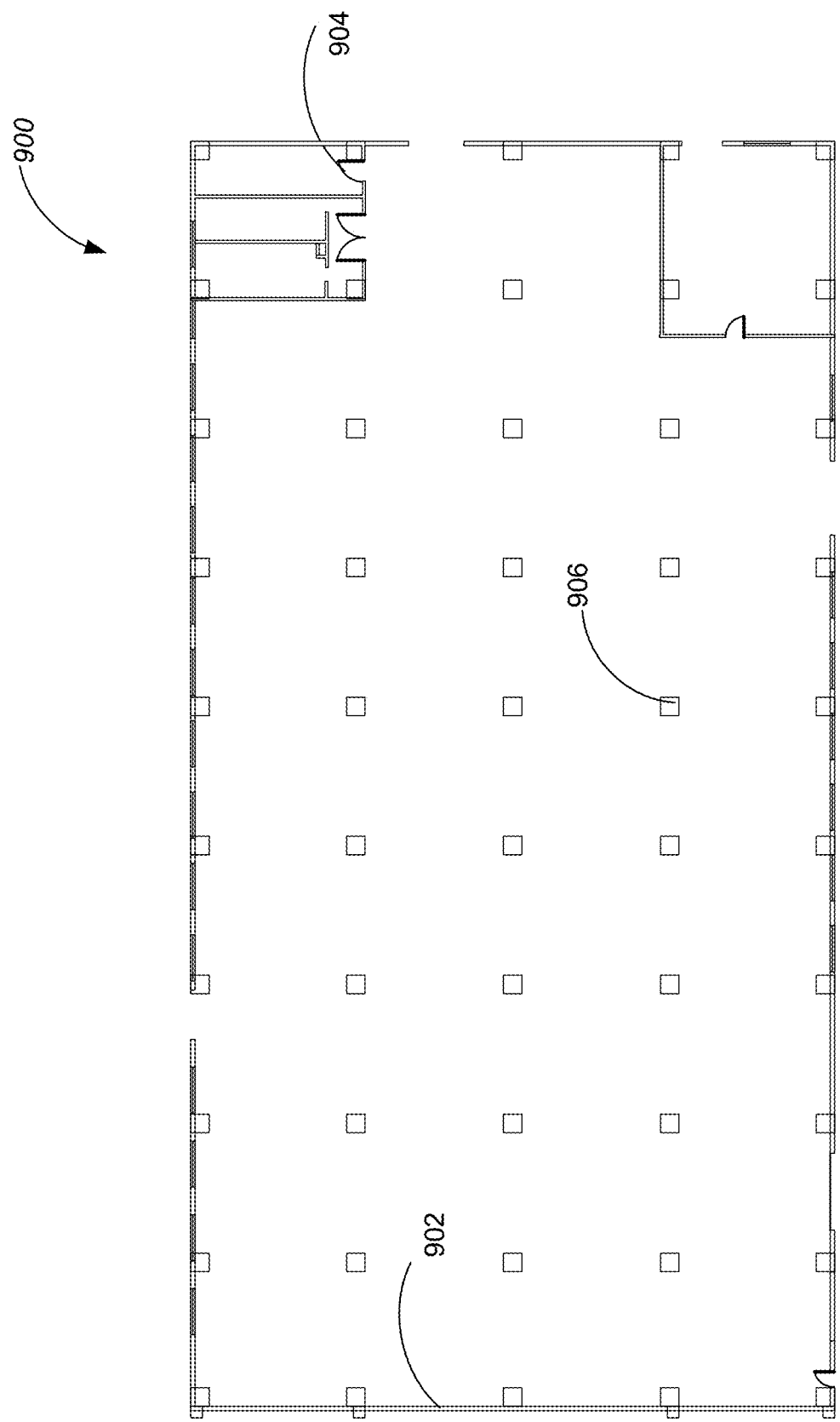
FIG. 9A is part of an exemplary floor plan of a warehouse illustrating a distribution of line lengths for three layers in accordance with some embodiments.
Figure 9B:
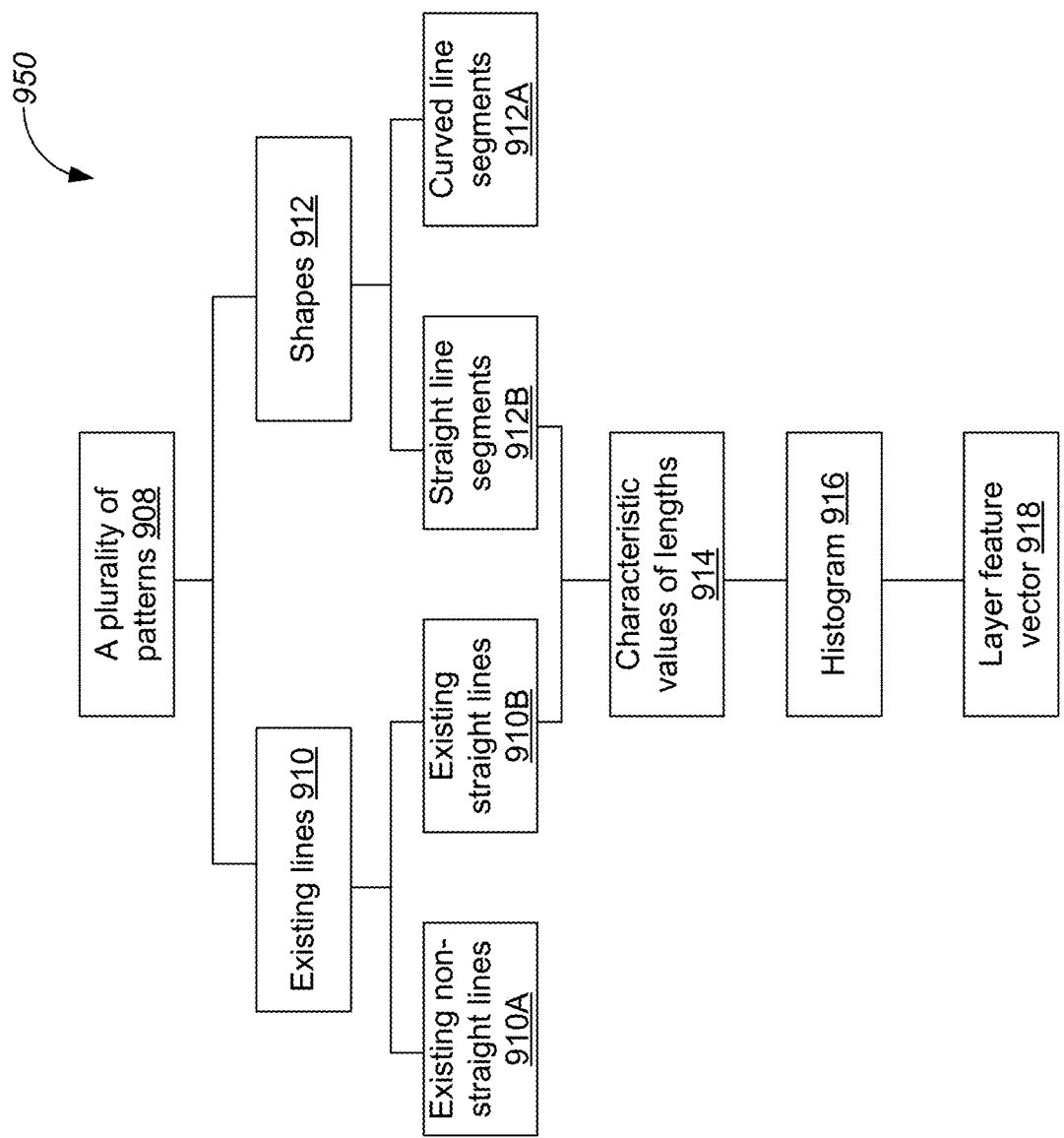
FIG. 9B is a flowchart of a process of classifying layers and patterns in a layer of a CAD file in accordance with some embodiments.

FIG. 9A is part of an exemplary floor plan 900 of a warehouse illustrating a distribution of line lengths for three layers (e.g., wall 902, door 904, and pillar 906) in accordance with some embodiments. FIG. 9B is a flowchart of a process 950 of classifying layers and patterns in a layer of a CAD file in accordance with some embodiments. In the CAD file, the floor plan of the warehouse includes a plurality of patterns 908 made of lines and/or shapes in a plurality of layers. For example, a first layer includes a set of existing lines 910 and a set of shapes 912. The existing lines 910 include straight lines 910B and non-straight lines 910A (e.g., arc lines). The shapes in the first layer are broken down into a plurality of line segments having a first subset of curved line segments 912A and a second subset of straight line segments 912B. Optionally, the first subset of curved line segments 912A is removed, and the second subset of straight line segments 912B is reserved. For instance, a rectangle is broken down to four straight line segments and reserved, and other arc lines, circles and ellipses are disregarded. The set of straight lines 910B existing in the first layer and the second subset of straight line segments 912B in the shapes of the first layer are statistically analyzed to determine a plurality of characteristic values 914, e.g., a minimum length, a maximum length, an average length, and a standard deviation of lengths of these straight line segments. The plurality of characteristic values 914 form a histogram 916 of the first layer, and is used to build a layer feature vector 918 for the first layer. The first layer is associated with a first plurality of physical structures or guard objects based on the layer feature vector 918.

In some embodiments, the characteristic values 914 for the plurality of layers (including the first layer) are combined to form an overall layer feature vector. That said, a respective layer feature vector 918 is extracted for each of the plurality of layers in the CAD file based on statistics of line segments in the respective layer, and combined to form the overall layer feature vector. Optionally, the characteristic values of the plurality of layers in the CAD file are reorganized according to a histogram that includes a plurality of logarithm-scaled bins within a fixed length range (e.g., 10 millimeter-10 meter). Each logarithm-scaled bin corresponds to a subset of the fixed length range that is represented in a logarithm scale. The characteristic values are distributed into the plurality of logarithm-scaled bins. The histogram having the logarithm-scaled bins is converted to the overall layer feature vector. Each of the plurality of layers in the CAD file is associated with a respective type of physical structures corresponding to a plurality of physical structures based on the overall layer feature vector.

Figure 10A:
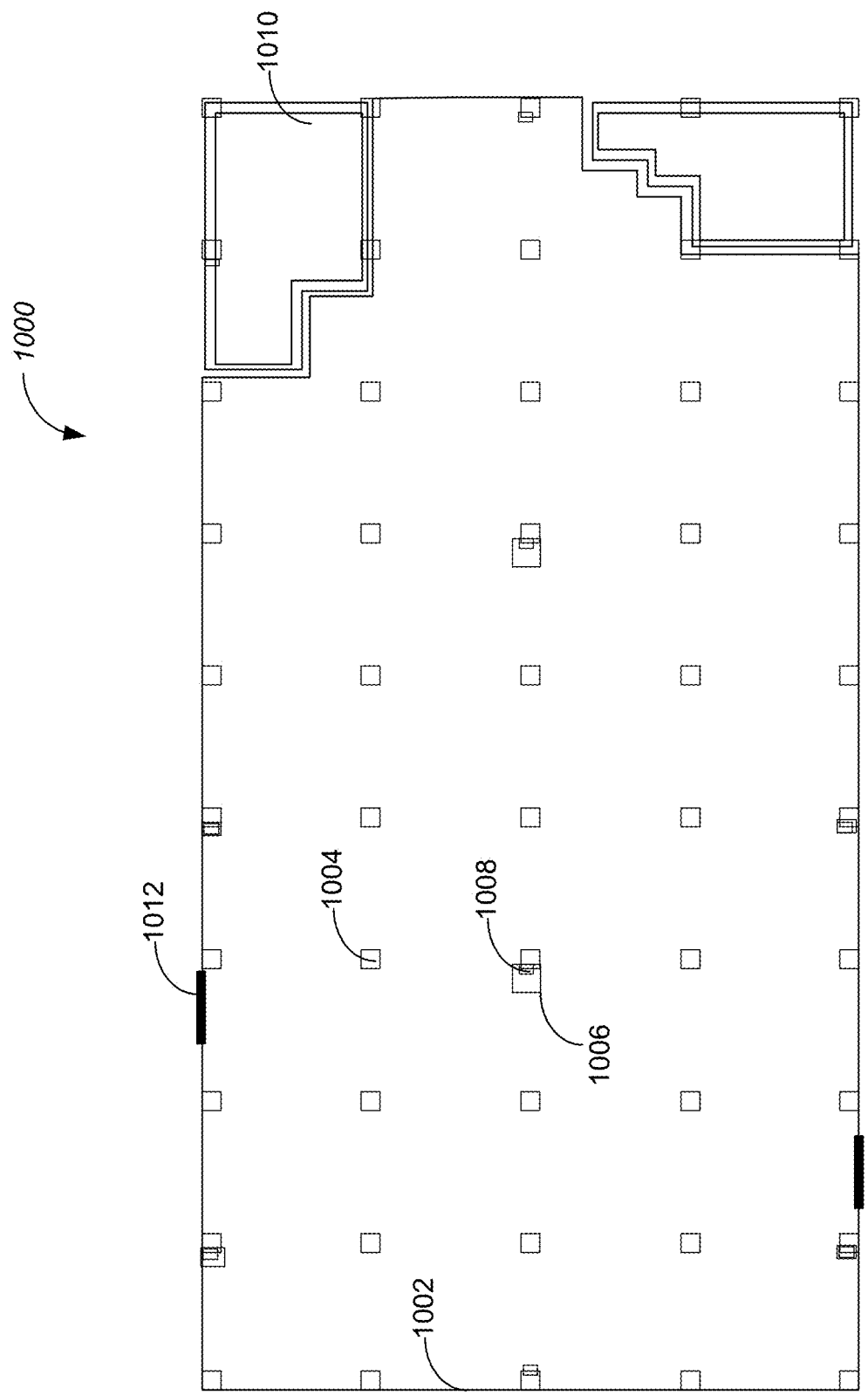
FIG. 10A is an exemplary floor plan of a warehouse having a storage space and a plurality of guard objects identified from a corresponding CAD file in accordance with some embodiments.

FIG. 10A is an exemplary floor plan 1000 of a warehouse having a storage space and a plurality of guard objects identified from a corresponding CAD file in accordance with some embodiments. The plurality of guard objects includes a first subset of guard objects automatically identified by the computer system and a second subset of guard objects annotated by a user input on a GUI of a warehouse space planning application executed on a client device 102. Each of the first set of guard objects is associated with a subset of the patterns on the plurality of layers, and a plurality of classification rules used to identify the first subset of guard objects includes a guide object rule. For each of the first set of guide objects, the subset of the patterns on the plurality of layers complies with the guide object rule defining patterns and layers associated with the respective predefined object type, and the respective guide object is thereby associated with the respective predefined object type based on the subset of the patterns on the plurality of layers. As to one or more guard objects in the second subset, the user input optionally associates an entire layer in the CAD file with a physical structure type or a guard object type, or associates a specific pattern (e.g., line or shape) in one of the plurality of layers with a physical structure type or a guard object type. In some embodiments, the user input adds a guard object in the second subset on one of the plurality of layers in the CAD. In some embodiments, the user input modifies a guard object in the first subset to obtain a guard object in the second subset.

Each guide object of the first and second sets of guard objects corresponds to a respective one of a plurality of predefined object types that is involved in placement, storage or movement of packages in the warehouse. In some embodiments, the plurality of predefined object types includes a wall 1002 defining the one or more storage spaces, a pillar 1004, an obstacle 1006, a user-reachable space 1008, a user-inaccessible space 1010, and one or more exits 1012.

Figure 10B:
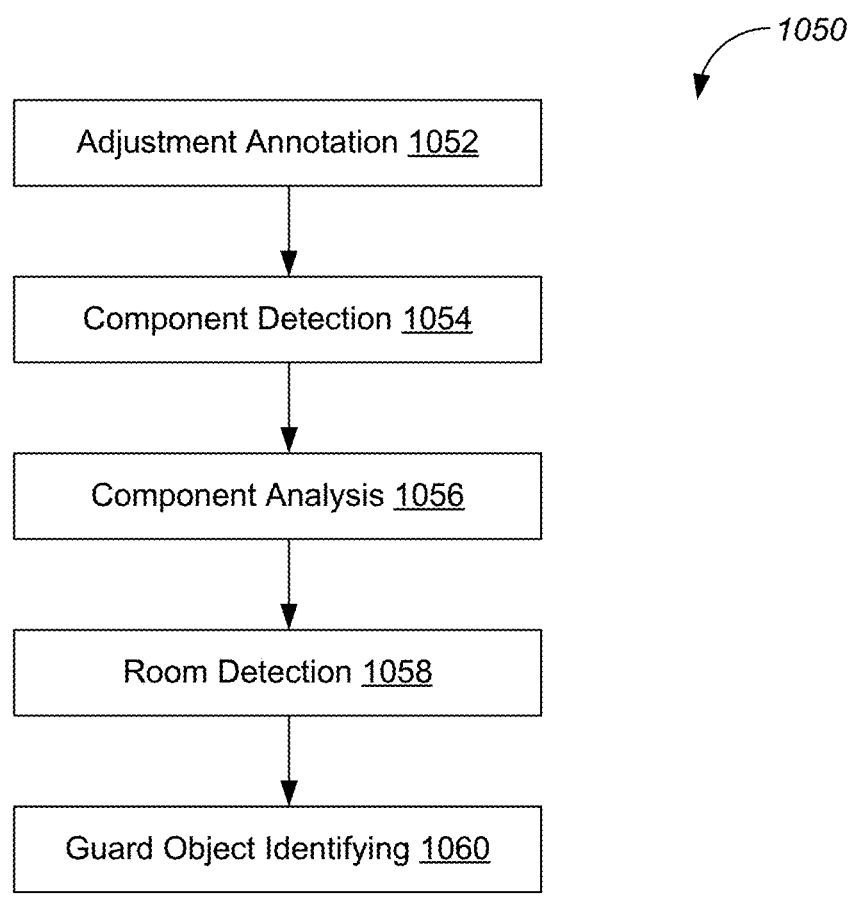
FIG. 10B is a flowchart of a floor plan analysis process in accordance with some embodiments.

FIG. 10B is a flowchart of a floor plan analysis process 1050 (e.g., CAD analysis 404) in accordance with some embodiments. In some embodiments, the CAD file corresponding to the floor plan 1000 has a vector graphic format and is converted to a raster graphic format. An image processing method is applied to process the CAD file in two sequential operations, coarse guard object detection and fine guard object detection, which are applied on the raster graphic format and the vector graphic format, respectively. In accordance with the floor plan analysis process 1050, CAD adjustment annotations are applied (1052) to a subset of the plurality of layers and shapes in the CAD file.

The CAD file includes a plurality of components (e.g., isolated physical structures), and is analyzed to detect and isolate (1054) connected components. In some embodiments, connected components are detected and isolated directly on vector graphics of the layers using a graph search method. Alternatively, in some embodiments, the layers are rendered into a raster image to detect connected components. Each component is analyzed (1056).

In some embodiments, a component corresponds to a physical object other than a room (e.g., a pillar, a fire hydrant). Components detected from a layer is consistent with a layer type of the layer, e.g., doors detected from a door layer are consistent with a door layer type. In an example, a subset of the plurality of layers in the CAD file is rendered to a raster image, and bounding boxes of each connected component is detected on the raster image. Each bounding box is converted to actual measurements by a unit length (e.g., millimeters).

Conversely, in some embodiments, a component corresponds to a room. To detect a room (1058), shapes are extracted from a wall layer and a door layer in the CAD file, and broken down to line segments. Each line segment is elongated at one or both ends of the respective line segment to close any gaps with its adjacent line segments. The line segments are rendered into a raster image in which pixels associated with a background is set to 1 and pixels associated with the line segments are set to 0. The connected regions of pixels of value 1 are detected. The region connected to the border of the raster image corresponds to the background external to the rooms and is discarded. Among the remaining regions, those greater than a threshold room size are determined as a room in the floor plan 1000 of the warehouse. An image closing operation is further applied to the room determined from the region or area to remove elongated portions associated with the line segments in the wall and door layers in the CAD file.

Guard objects are identified (1060) from the rooms and non-room objects. Both rooms and non-room objects can be a polygonal shape or other shapes. Optionally, a size of each room or non-room object is scaled according to its actual size. Each room is converted to a guard object having a guard object type of "Room." Each pillar is converted to a guard object having a guard object type of "Pillar." A plurality of non-room objects is converted to guard object having the same guard object type of "Obstacle."

Figure 11:
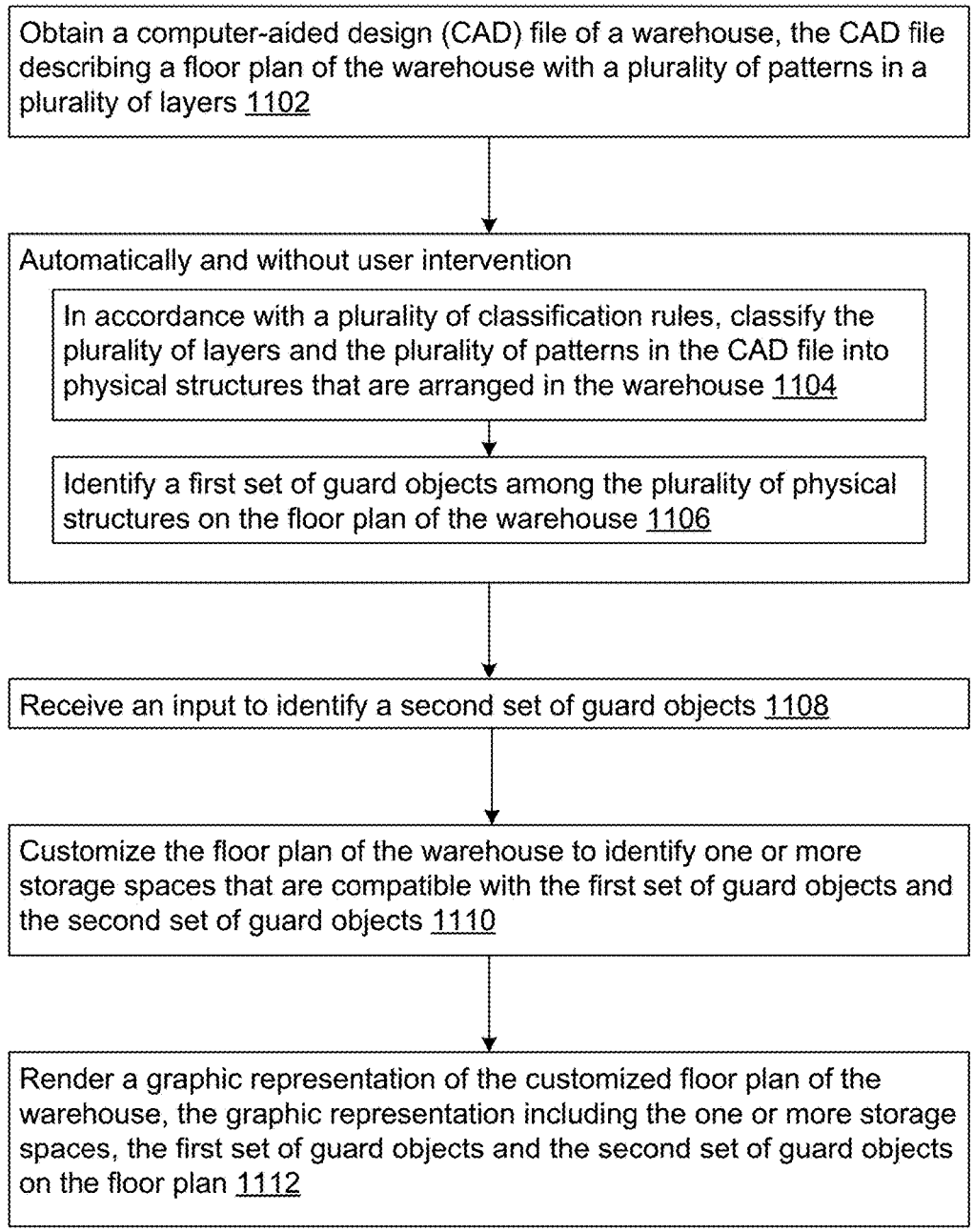
FIG. 11 is a flowchart of a warehouse space planning method implemented at a computer system in accordance with some embodiments.

FIG. 11 is a flowchart of a warehouse space planning method 1100 implemented at a computer system in accordance with some embodiments. Method 1100 is, optionally, governed by instructions that are stored in a non-transitory computer readable storage medium and that are executed by one or more processors of the computer system (e.g., e.g., a client device 102, a server system 104). Each of the operations shown in FIG. 11 may correspond to instructions stored in the computer memory or computer readable storage medium (e.g., memory 1906 of a server system 104 in FIG. 19) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 1100 may be combined and/or the order of some operations may be changed.

In accordance with the warehouse space planning method 1100, the computer system obtains (1102) a computer-aided design (CAD) file of a warehouse, and the CAD file describes a floor plan of the warehouse with a plurality of patterns (e.g., lines and shapes) in a plurality of layers (e.g., 502-520 in FIG. 5B). For example, the plurality of layers includes a separation wall layer 516A, a structure column layer 512, a door layer 506, and a fire hydrant layer 518.

In accordance with a plurality of classification rules, the plurality of layers and the plurality of patterns in the CAD file are, automatically and without user intervention, classified (1104) into a plurality of physical structures that are to be arranged in the warehouse. A first set of guard objects is automatically identified (1106) among the plurality of physical structures on the floor plan of the warehouse. The computer system receives (1108) an input to identify a second set of guard objects, and the input optionally associates one of the plurality of layers and the plurality of patterns with one of the second set of guard objects. Alternatively, in some embodiments, the input is received to modify one of the first set of guide objects to one of the second set of guide objects. More details concerning user annotations are described above with reference to FIGS. 5A-5B. Each guide object of the first and second sets of guard objects corresponds to a respective one of a plurality of predefined object types that is involved in placement, storage or movement of packages in the warehouse. Optionally, the plurality of predefined object types includes a wall defining the one or more storage spaces, a pillar, an obstacle, a user-reachable space ("accessible"), a user-inaccessible space ("inaccessible"), and one or more exits.

In some embodiments, each of the first set of guard objects is associated with a subset of the patterns on the plurality of layers, and the plurality of classification rules includes a guide object rule. For each of the first set of guide objects, if it is determined that the subset of the patterns on the plurality of layers complies with the guide object rule defining patterns and layers associated with the respective predefined object type, the respective guide object is automatically associated with the respective predefined object type based on the subset of the patterns on the plurality of layers.

In some embodiments, for each of the plurality of layers in the CAD file, the computer system renders the respective layer into a respective layout image, and processes the respective layout image using a predefined convolutional neural network to associate the respective layer to a respective type of physical structures or guard objects (e.g., none, walls, pillars, doors, and fire hydrants). As such, the first set of guide objects is automatically obtained by identifying a respective set of patterns on each layer associated with the respective type of physical structure as a respective subset of the first set of guide objects.

Alternatively, in some embodiments, the computer system extracts a respective layer feature vector having a predefined dimension for each layer in the CAD file, and associates the respective layer with a respective type of physical structure based on the respective layer feature vector in accordance with a predetermined machine learning (ML) method. Further, in some embodiments, the plurality of patterns in the plurality of layers of the CAD file is broken to a plurality of line segments, and a subset of line segments that is curved is removed. The computer system determines a plurality of characteristic values of the plurality of line segments, and generates a histogram of the plurality of characteristic values of the plurality of line segments. The respective layer feature vector is created based on the histogram.

In an example, the respective layer feature includes a first text-based feature vector and a second pattern-based feature vector that are concatenated to each other. The first text-based feature vector for each layer is obtained based on a first number (N) of groups. Each group includes a respective set of predefined substantially synonymous patterns, and the first text-based feature vector has the first number (N) of elements. Each element is uniquely associated with a respective one of the first number (N) of groups. For each text feature element in the first text-based feature vector, the computer system determines whether at least one substantially synonymous pattern in the group corresponding to the respective element is found in the respective layer. In accordance with a determination that at least one synonymous pattern in the group corresponding to the respective element is found in the respective layer, a first value (e.g., "1") is assigned to the respective text feature element. Alternatively, in accordance with a determination that no synonymous pattern in the group corresponding to the respective row is found in the respective layer, a second value (e.g., "0") is assigned to the respective text feature element. The second value is distinct form the first value. The second pattern-based feature vector is determined for each layer by counting each of the plurality of patterns that corresponds to one of a plurality of predefined pattern types including at least straight lines, arc lines, rectangles, ellipses, and polygons. For each of the plurality of predefined pattern types, a respective time of occurrence is counted in the respective layer of the floor plan of the warehouse to generate a histogram based on a plurality of times of occurrence that corresponds to the plurality of predefined pattern types. This histogram is converted to the second pattern-based feature vector of the respective layer.

More details concerning using AI techniques to classify layers and patterns in the CAD file are described above with reference to FIGS. 7A-7B, 8A-8E and 9A-9B.

The floor plan of the warehouse is customized (1110) to identify one or more storage spaces that are compatible with the first set of guard objects and the second set of guard objects. For example, a wall layer and a door layer are identified from the plurality of layers. Lines defining each of the storage spaces (e.g., storage room) are identified according to patterns in the wall and door layers. More details concerning analysis of the CAD file are described above with reference to FIGS. 10A and 10B.

A graphic representation is rendered (1112) for the customized floor plan of the warehouse. The graphic representation includes the one or more storage spaces, the first set of guard objects and the second set of guard objects on the floor plan. In some embodiments, an iterative process is applied to update the rendered graphic representation. In response to rendering the graphic representation, the computer system receives a user annotation 204 on the CAD file and in accordance with the user annotation, updating classification of the plurality of layers and the plurality of patterns in the CAD file according to the plurality of classification rules. A third set of guard objects is identified on the floor plan of the warehouse. Customization of the floor plan of the warehouse is updated to render an updated graphic representation including one or more updated storage spaces and the third set of guard objects on the floor plan. Further, in some embodiments, the third set of guide objects is identified by adding a subset of the third set of guide objects, modifying the first set of guard objects, and/or modifying the second set of guard objects. In some embodiments, classification of the plurality of layers and the plurality of patterns in the CAD file is updated by associating one of the plurality of layers and the plurality of patterns with one of a plurality of predefined object types that are involved in placement, storage or movement of packages in the warehouse.

Figures 12A, 12B:
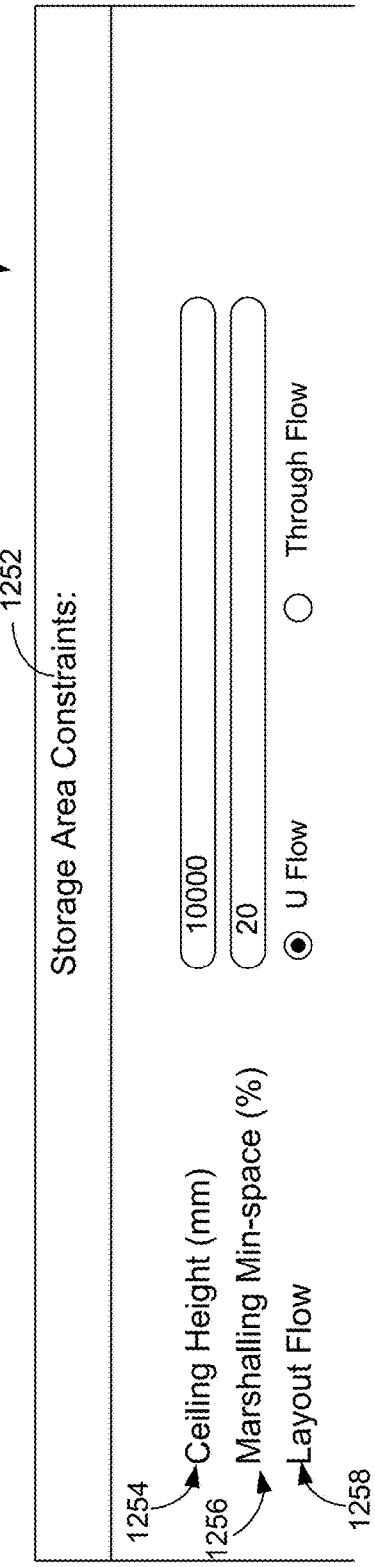
FIG. 12A is an exemplary user interface for setting up inventory information associated with a plurality of product packages to be stored in a storage space of a warehouse in accordance with some embodiments.
FIG. 12B is an exemplary user interface for setting up one or more storage area constraints associated with the storage space of the warehouse in accordance with some embodiments.

FIG. 12A is an exemplary user interface 1200 for setting up inventory information 208 associated with a plurality of product packages to be stored in a storage space of a warehouse in accordance with some embodiments. FIG. 12B is an exemplary user interface 1250 for setting up one or more storage area constraints 1252 associated with the storage space of the warehouse in accordance with some embodiments. In some embodiments, the storage space is a single storage room in the warehouse. In some embodiments, the storage space includes more than one storage room. The inventory information 208 of the plurality of product packages entered on the user interface 1200 is used to determine a plurality storage types (e.g., racking, stacking and shelving). For each of the plurality of storage types, a respective storage area is identified within the storage space for a subset of the product packages that can be stored with the respective storage type in accordance with a plurality of static rules including the storage area constraints 1252 entered on the user interface 1250.

The inventory information 208 includes one or more of: a quantity 1202, a package size 1204, a package type 1206, a weight 1208 (e.g., in pound or kilogram), a storage type 1210, a pick face 1212, a number of layers 1214, and room assignment 1216 of each of the product packages to be stored in the warehouse. For each line of the inventory information 208, the package size 1204 optionally includes a length, a width and a height of a corresponding product package, and the package type 1206 is selected from a pallet and a carton. The storage type 1210 is selected from racking, shelving, shelving with mezzanines, stacking. Racking includes, but is not limited to, single-depth and double depth pallet racking, push back racking, drive-in racking, cantilever racking, pallet flow racking, and the like. More details on these three storage types are described below with reference to FIG. 13.

Further, in some embodiments, the storage type 1210 can be further selected from frozen food and fresh food that are stored differently in the warehouse. In some embodiments, the product package associated with a line of inventory information 208A on the user interface 1200 is stored on a pallet according to the package type 1206, and the pallet is a single-faced pallet. In some embodiments, the product package associated with a line of inventory information 208B on the user interface 1200 is stored in a carton box according to the package type 1206, and the number of layers 1214 is limited to 3 or less. The pick face 1212, which corresponds to the space on a racking system onto which a pallet can be loaded, defines a number of storage layers (e.g., 3 picks) in each rack. In some embodiments, the room assignment 1216 is set to "Auto" such that the corresponding product package is stored in one of the storage spaces that is selected randomly and automatically by the client device 102. Alternatively, in some embodiments, the room assignment 1216 is set to an identity of one of the storage spaces in the warehouse, and the corresponding product package cannot be assigned randomly or automatically, but is assigned to the one of the storage spaces identified in a field of the room assignment 1216. In some embodiments not shown in FIG. 12A, the inventory information 208 includes an access frequency of each product package to be stored in the warehouse. The access frequency of each product package indicates a turnover rate of the respective product package within the warehouse.

In some embodiments, each line of the inventory information 208 corresponding to a respective product package includes a deletion affordance 1218. In response to a user action on the deletion affordance 1218, the client device 102 removes the entire line corresponding to the deletion affordance 1218 from the user interface 1200. In some embodiments, each line of the inventory information 208 corresponding to a respective product package includes one or more sorting affordances 1220, e.g., a first sorting affordance 1220A and a second sorting affordance 1220B that are complementary to each other. In response to a user action to the first or second sorting affordance 1220A or 1220B, the line corresponding to the affordance 1220A or 1220B is moved down or up the list of inventory information 208 on the user interface 1200, respectively. The top line of inventory information 208A on the user interface 1200 has only the first sorting affordance 1220A, and the bottom line of inventory information 208C on the user interface 1200 has only the second sorting affordance 1220B.

The user interface 1200 further includes an adding affordance 1222. In response to a user action on the adding affordance 122, a new line of inventory information 208 is added to the user interface 1200 in association with a new product package to be stored in the warehouse. In some embodiments, each field 1202-1220 of the inventory information 208 displayed on the user interface 1200 has a default value, and a value associated with the respective field can be modified by a user input or annotation 204. Alternatively, in some embodiments, a subset of the fields 1202-1220 is populated from an inventory document. For example, the quantity 1202, size 1204, and weight 1208 are automatically populated, and the other fields are loaded with corresponding default values or manually filled in by the user 120 of the client device 102. In another example, all fields 1202-1220 for the line of inventory information 208A are automatically populated form the inventory document, and values in all fields 1202-1220 for the line of inventory information 208B are filled in by the user 120 of the client device 102. Alternatively, in some embodiments, all fields 1202-1220 for the inventory information 208 on the user interface 1200 are automatically populated form the inventory document.

In some embodiments, historic inventory information is obtained for the product packages that were stocked in the warehouse during a previous duration of time. The inventory information of the plurality of product packages is estimated based on the historic inventory information. After the estimated inventory information is used to identify storage areas for different storage types in the warehouse, the storage space of the warehouse is reorganized based on the respective storage area of each storage type. Conversely, in some embodiments, the inventory information is estimated and predicted for the plurality of product packages that will be stored in the storage space of the warehouse.

Referring to FIG. 12B, the storage area constraints 1252 identifies a ceiling height 1254 as 10000 millimeters (i.e., 10 meters), a marshalling space requirement 1256 as 20% or more, and a layout flow 1258 as "U Flow." In accordance with the storage area constraints 1252, a receiving area and a shipping area of the warehouse are arranged on the same side of the warehouse to enable a U-shape routing path for each product package stored therein, and a marshalling space should be at least 20% of a total area of the storage space of the warehouse to provide sufficient movement space in view of the layout flow.

Further, in some embodiments, the floor plan of the warehouse is analyzed to identify a plurality of static rules for placing the plurality of product packages in the storage space of the warehouse. Each of the plurality of product packages corresponds to a respective subset of static rules defining how the respective product package can be stored using at least one of the plurality of storage types. For example, in accordance with a first static rule, carton boxes can only be placed on a shelf, and can never be placed on a pallet or stacked on top of each other. Conversely, in an example, in accordance with a second static rule, carton boxes are not allowed to be placed on a shelf or rack, and must be stacked on top of each other up to a number of layers (e.g., 5 or less layers).

Figure 13A:
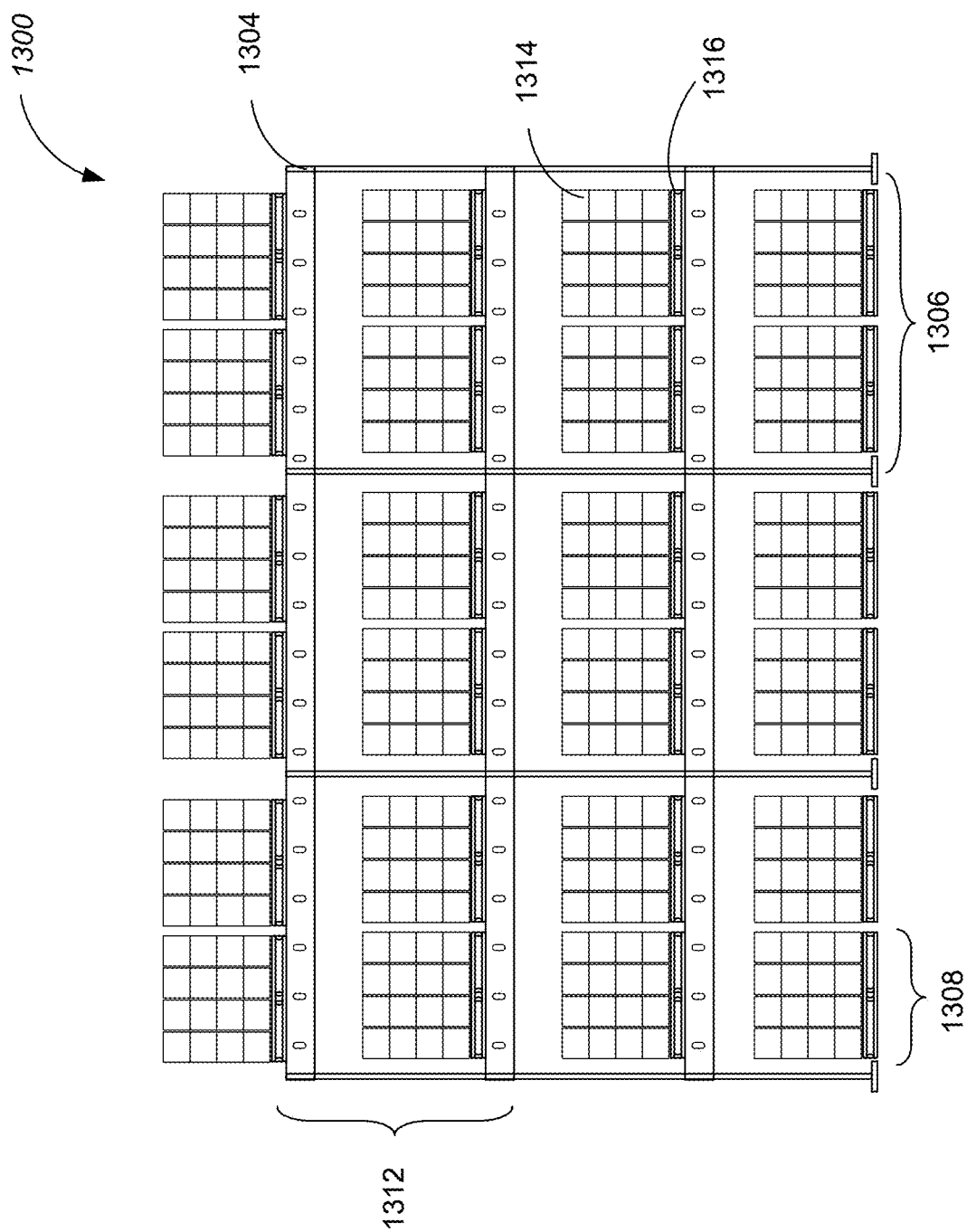
FIG. 13A is a front view of an exemplary storage type of racking in accordance with some embodiments.
Figure 13B:
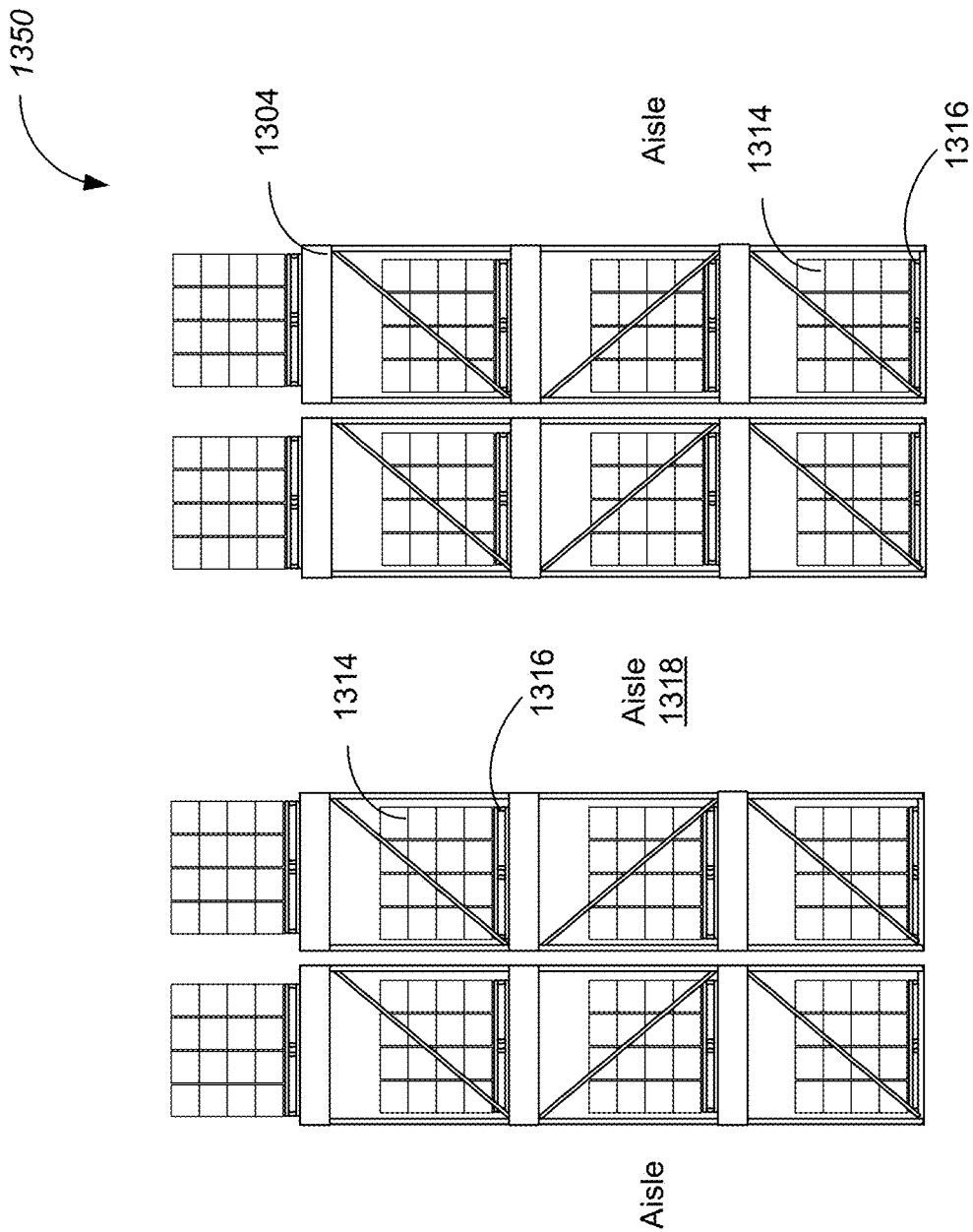
FIG. 13B is a side view of an exemplary storage type of racking in accordance with some embodiments.
Figure 13C:
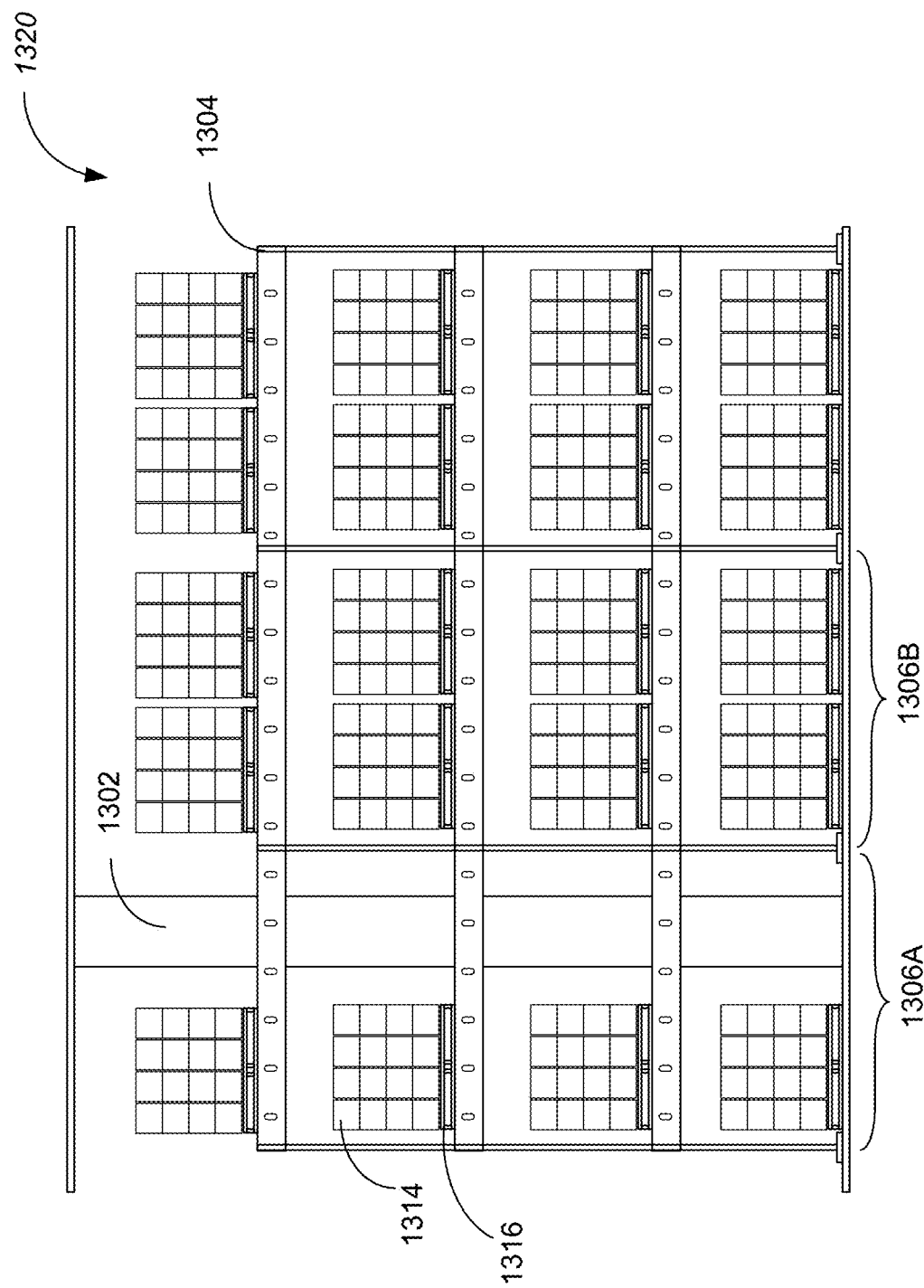
FIGS. 13C, 13D and 13E are three scenarios of integrating a column structure of a warehouse with a pallet rack structure in accordance with some embodiments.
Figure 13D:
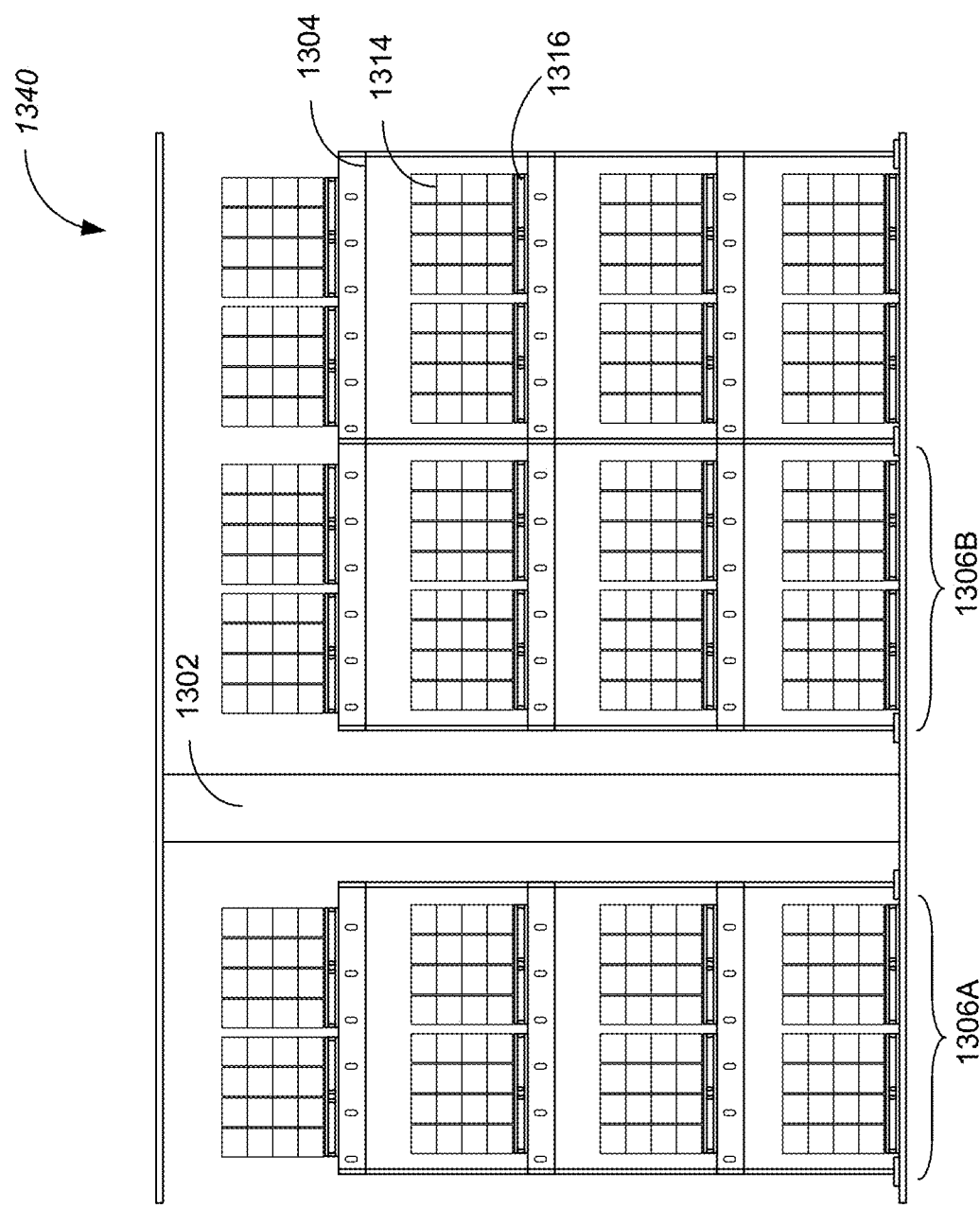
Figure 13E:
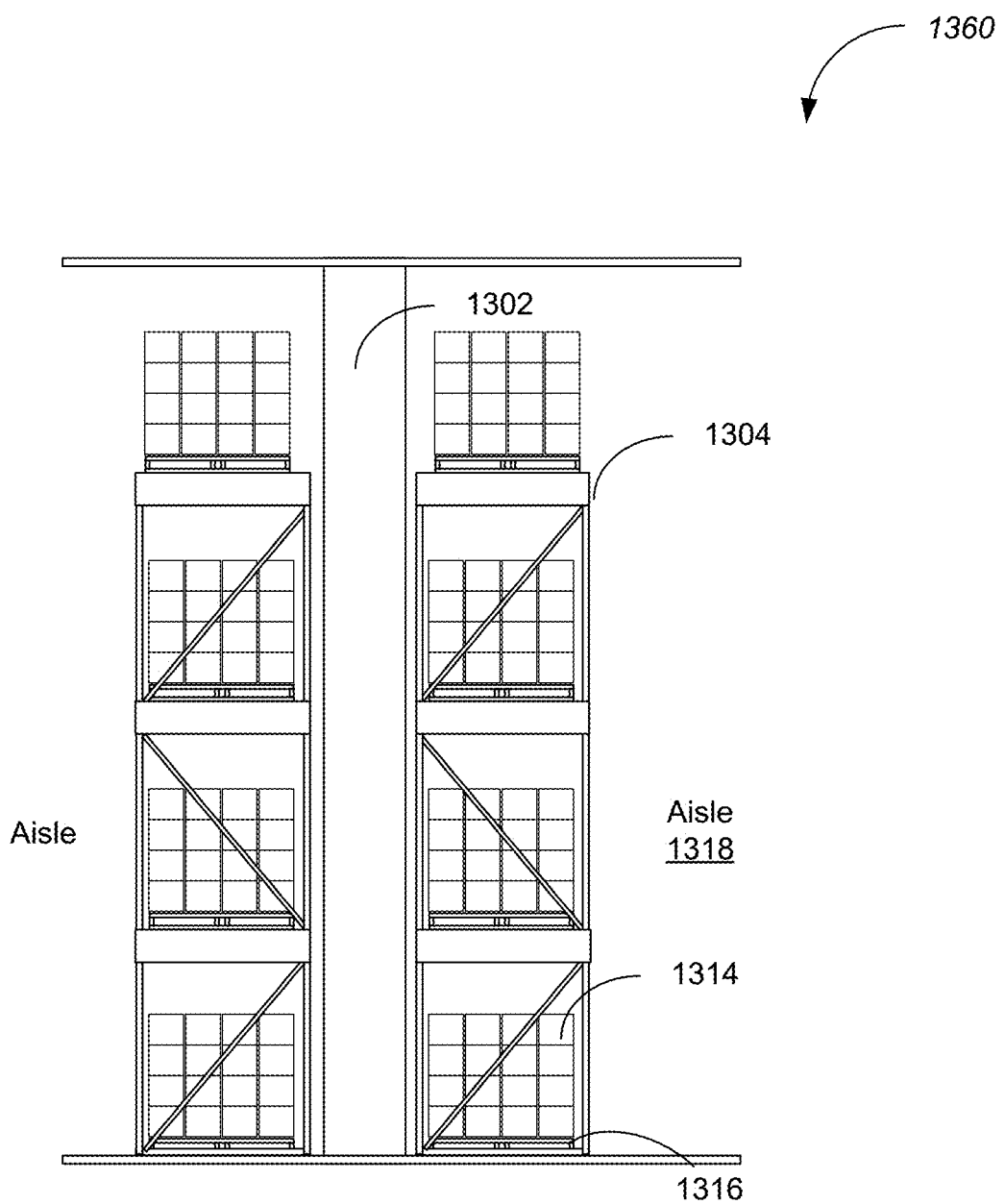

FIGS. 13A and 13B are a front view 1300 and a side view 1350 of an exemplary storage type of racking in accordance with some embodiments, respectively. FIGS. 13C, 13D and 13E are three scenarios 1320, 1340 and 1360 to integrate a column structure 1302 (e.g., a pillar) of a warehouse with a pallet rack structure 1304 in accordance with some embodiments. In accordance with the storage type of racking, the pallet rack structure 1304 has three bays 1306 in each row, and each bay 1306 has two bins 1308 that further has four bin layers 1312. Each bin layer 1312 is configured to hold four layers of carton boxes 1314 packed on a pallet 1316. Referring to FIG. 13B, a pair of pallet rack structures 1304 are placed back to back, and separated from another pallet rack structure 1304 or another pair of pallet rack structures 1304 by an aisle 1318.

In some embodiments (FIG. 13C), the column structure 1302 is surrounded by the pallet rack structure 1304, i.e., placed between a front crossbeam and a rear crossbeam of the pallet rack structure 1304. The column structure 1302 occupies a space of the pallet rack structure 1304, such that the pallet rack structure 1304 cannot be entirely occupied by pallets 1316 carrying product packages. For example, a first bay 1306A of the pallet rack structure 1304 surrounding the column structure 1302 holds four pallets 1316, while a second bay 1306B that is identical to the first bay but does not surround the column structure 1302 holds eight pallets 1316. That said, in some embodiments, the floor plan of the warehouse includes a plurality of column structures (e.g., the column structure 1302) each of which is identified as an obstacle in the plurality of guard objects. Each of the plurality of column structures is placed within a respective storage region, and an area of the respective column structure is deducted from the storage area of the respective storage region.

Alternatively, in some embodiments (FIG. 13D), two bays 1306A and 1306B of the same pallet rack structure 1304 are separated, and the column structure 1302 is placed between the two separated bays 1306A and 1306B without compromising any rack space for storing the pallets 1316. Alternatively, in some embodiments (FIG. 13E), two rows of pallet rack structures 1304 are placed back to back and separated by a back-to-back spacing (also called a flue spacing) on a side view of the scenario 1360. The column structure 1302 is placed within the back spacing. As such, in some embodiments as shown in FIG. 13C-13E, the column structure 1302 is not disposed in any aisle 1318 separating two adjacent rows of racks.

Figure 14A:
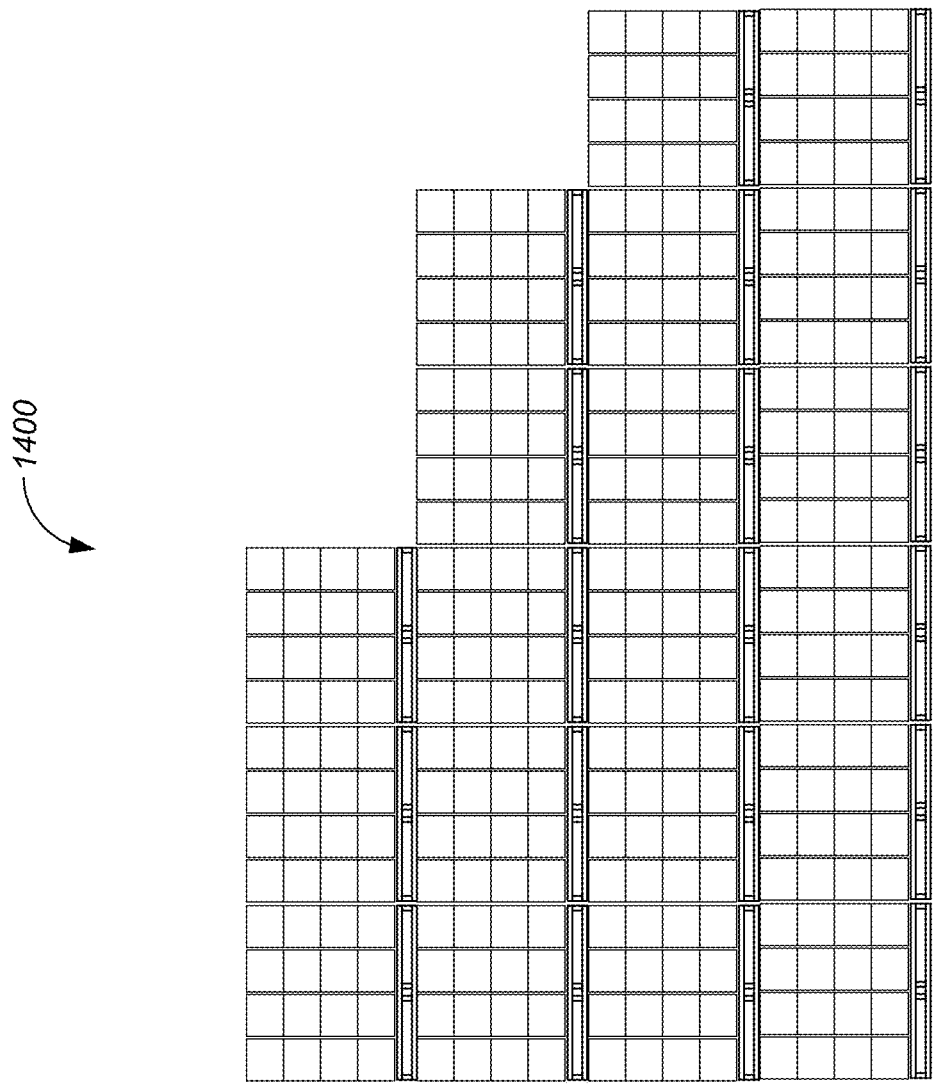
FIGS. 14A and 14B are exemplary storage types of stacking and shelving in accordance with some embodiments, respectively.
Figure 14B:
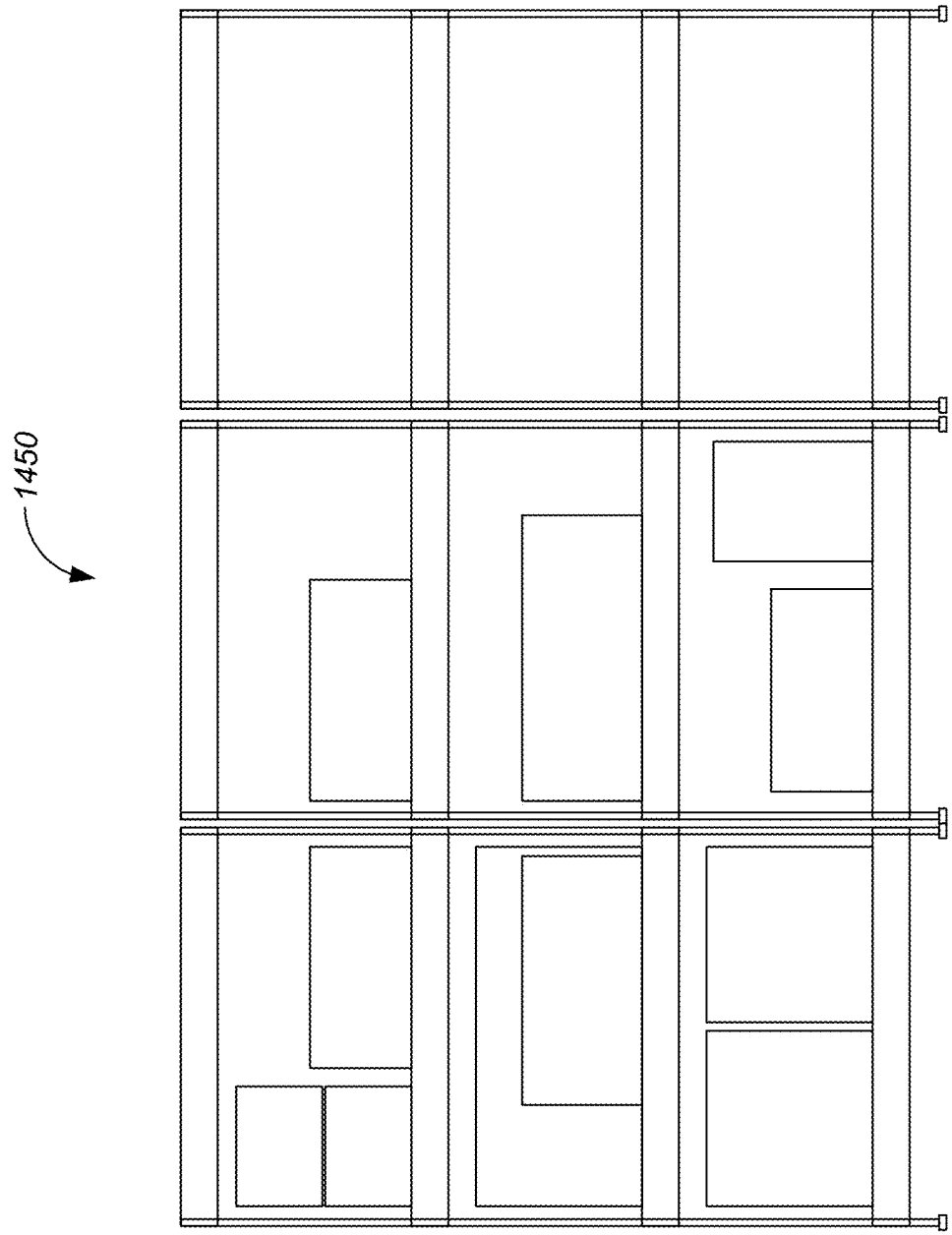

FIGS. 14A and 14B are exemplary storage types of stacking 1400 and shelving 1450 in accordance with some embodiments, respectively. In some embodiments, the computer system uses an object-oriented space planning method that relies on a plurality of storage types. Each storage type is associated with a respective application programming interface (API). The computer system works with different APIs of these storage types to identify a respective storage area and a respective storage region in the storage space of the warehouse for a subset of the plurality of product packages that can be stored with the respective storage type. Additional storage types (e.g., fresh food, frozen food) may be implemented as a plug-in to the warehouse space planning application and system implemented at the client device 102 and server system 104.

In some embodiments, to identify a respective storage area for each storage type, a total quantity is determined for a subset of the plurality of product packages that need to be stored with the respective storage type in accordance with the plurality of static rules. The respective storage area is then determined based on the total quantity for the subset of product packages.

In some embodiments, a total storage area is determined to combine the respective storage areas of the plurality of storage types. For each storage type, a respective storage area is identified to satisfy a resource cost criterion including a storage area threshold, and the total storage area is below the storage area threshold in accordance with the resource cost criterion. Optionally, the storage area threshold is defined to leave space for one or more of a loading zone, a staging area and an office area. In some situations, the resource cost criterion further requires that the total storage area is minimized below the storage area threshold. To meet this resource cost criterion, a respective storage area of a storage type may need to be reduced by stacking its corresponding subset of product packages. Under some circumstances, the available storage area is fixed in the storage space of the warehouse, and greater than the total storage area determined for the product packages to be stored in the warehouse by an excessive warehouse area. The excessive warehouse area is divided into a plurality of excessive storage areas each of which is assigned to a respective storage type to increase the respective storage area associated with the respective storage type. In an example, the excessive storage areas are assigned to the plurality storage types based on an access frequency of each product package stored in the warehouse.

Figure 15:
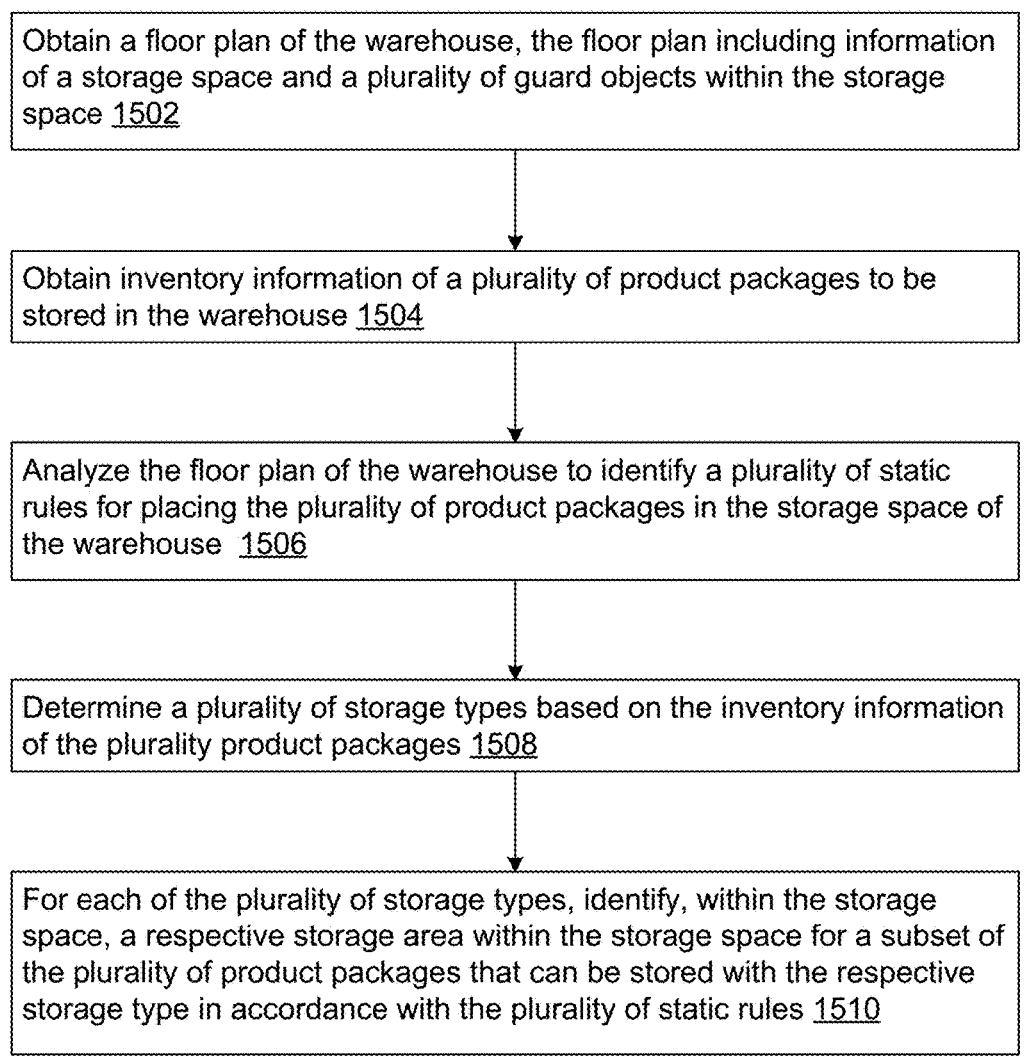
FIG. 15 is a flowchart of a warehouse space planning method implemented at a computer system to determine storage areas associated with storage types in accordance with some embodiments.

FIG. 15 is a flowchart of a warehouse space planning method 1500 implemented at a computer system to determine storage areas associated with storage types in accordance with some embodiments. Method 1500 is, optionally, governed by instructions that are stored in a non-transitory computer readable storage medium and that are executed by one or more processors of the computer system (e.g., e.g., a client device 102, a server system 104). Each of the operations shown in FIG. 11 may correspond to instructions stored in the computer memory or computer readable storage medium (e.g., memory 1906 of a server system 104 in FIG. 19) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 1500 may be combined and/or the order of some operations may be changed.

In accordance with the warehouse space planning method 1500, the computer system obtains (1502) a floor plan of the warehouse including information of a storage space and a plurality of guard objects within the storage space. Each guard object corresponds to one of a plurality of predefined object types that is involved in placement, storage or movement of packages in the warehouse, and in some embodiments, the plurality of predefined object types includes one or more of: a wall defining the one or more storage spaces, a pillar, an obstacle, a user-reachable space, a user-inaccessible space, and one or more exits. In some embodiments, a CAD file of the warehouse describes the floor plan of the warehouse with a plurality of patterns in a plurality of layers. A first subset of the plurality of guard objects is automatically extracted from the CAD file of the warehouse. The storage space is identified from the CAD file of the warehouse based on the plurality of patterns in the plurality of layers. Further, in some embodiments, an input is received to identify a second subset of the plurality of guard objects.

The computer system also obtains (1504) inventory information of a plurality of product packages to be stored in the warehouse. In some embodiments, the inventory information includes one or more of: a package type, a quantity, a package size, an expected weight, a maximal weight, an access frequency, and a storage type of each of the product packages.

The floor plan of the warehouse is analyzed (1506) to identify a plurality of static rules for placing the plurality of product packages in the storage space of the warehouse. In some embodiments, the storage space includes a first storage space, and the warehouse includes a second storage space distinct from the first storage space. The plurality of product packages to be stored in the warehouse is assigned to the first storage space, e.g., on a user interface 1200 in FIG. 12A.

After obtaining the inventory information, the computer system determines (1508) a plurality of storage types based on the inventory information of the plurality product packages. In some embodiments, the plurality of storage types includes one or more of: racking, shelving, shelving with mezzanines, stacking, frozen food, and fresh food. Racking includes, but is not limited to, single-depth and double depth pallet racking, push back racking, drive-in racking, cantilever racking, pallet flow racking, and the like. For each of the plurality of storage types, a respective storage area is identified (1510), within the storage space, for a subset of the plurality of product packages that can be stored with the respective storage type in accordance with the plurality of static rules. In some embodiments, a total quantity is determined for the subset of the plurality of product packages that need to be stored with the respective storage type in accordance with the plurality of static rules. The respective storage area is thereby determined based on the total quantity for the subset of product packages. In some embodiments, for each storage type, the respective storage area has a rectangular shape having a fixed length and a respective width, and the respective width is determined based on the respective storage area. The respective storage areas of the plurality of storage types are physically arranged along a first axis parallel to the respective width of each storage area. Further, in some embodiments, a staging area is reserved in the storage space of the warehouse. The staging area extends along the first axis and is adjacent to a respective end of a storage area of one of the storage types.

Figure 16:
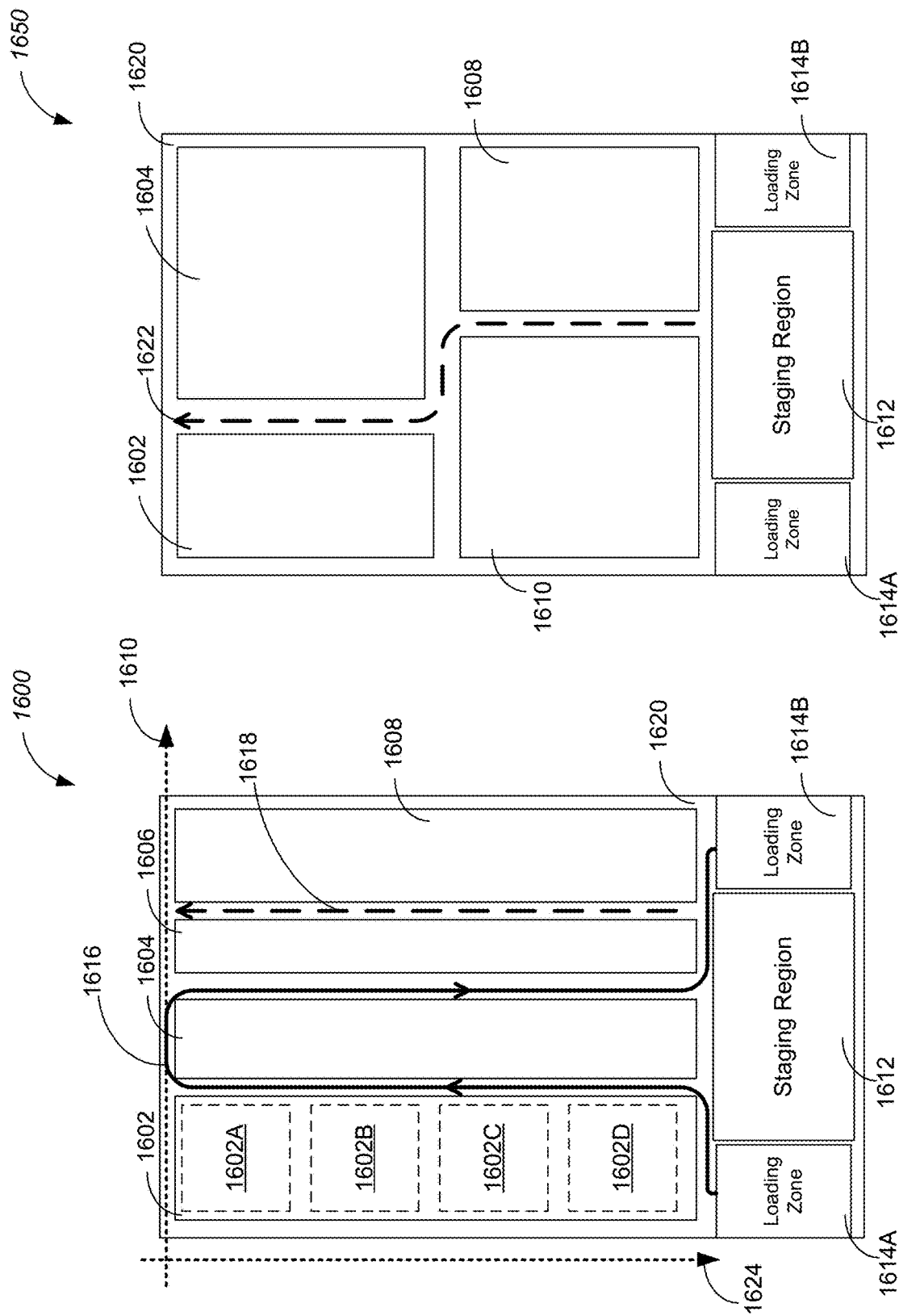
FIGS. 16A and 16B are two exemplary predefined storage templates in accordance with some embodiments.

FIGS. 16A and 16B illustrate two exemplary predefined storage templates 1600 and 1650 in accordance with some embodiments. As described above, the computer system identifies storage areas needed for a plurality of storage types associated with a plurality of product packages to be stored in a storage space 1620 of a warehouse. Based on the storage areas identified for the storage types, the storage space 1620 is divided into a plurality of storage regions 1602-1608 for the plurality of product packages. Each storage region is uniquely associated with a respective one of the plurality storage types. Each storage region optionally includes multiple sections assigned to store different types of product packages with the respective storage type. In some embodiments, the storage space 1620 of the warehouse is divided into the plurality of storage regions based on one or more predefined storage templates (e.g., a first storage template 1600 and a second storage template 1650).

Every two adjacent storage regions are separated by an aisle having a width that is greater than an aisle width threshold. A storage region, if disposed next to a wall, is optionally disposed immediately adjacent to the wall or separated from the wall by an aisle. In some embodiments, the storage regions are so configured that pillars are prohibited from standing in the middle of any aisle. In some embodiments, if a pillar is disposed in the middle of an aisle, the aisle is required to leave a distance that is greater than a threshold distance from at least one of its two adjacent storage regions.

In accordance with the first storage template 1600, each of the plurality of storage regions 1602-1608 has a rectangular shape having a respective width and a respective length, and the respective length is adjustable based on the respective storage area determined for the storage type corresponding to the respective region. The storage regions 1602-1608 are arranged along a first axis 1610. In an example, the storage regions 1602-1608 correspond to storage types of "racking," "shelving," "stacking," and "frozen food," respectively. Optionally, the storage region 1608 includes a walk-in freezer room built in accordance with the storage type of "frozen food." In some embodiments, two of the storage regions 1602-1608 are associated with the same storage type. For example, both of the storage regions 1602 and 1608 are assigned to the storage type of "racking."

In the above example, the storage region 1602 corresponds to a storage type of "racking," and the storage region 1602 includes a plurality of bays 1602A, 1602B, 1602C and 1602D along the respective length (i.e., along a second axis 1624 that is perpendicular to the first axis 1610). Sizes of the bays 1602A-1602D are optionally identical or different. Each bay is configured to hold a respective number of bins according to a size of the respective product packages held therein. In some embodiments, the number of bins in each bay is proportional to a space efficiency of using the respective bay. In some embodiments, a minimal bay size can hold a number of bins (e.g., 1, 2, 3 or 4 bins), and the number of bins held by each bay is given as a rack parameter. In some embodiments, the number of bins per bay is set to a greatest allowable value for each bay in the storage region 1602 if possible. Referring to FIG. 13C, if a pillar 1302 is located within a bay 1306, the number of bins 1308 in the bay 1306 is reduced to make room for the pillar 1302. In some embodiments, each bin 1308 corresponds to a product package unit, e.g., a pallet, configured to be placed in the bays 1602A-1602D.

In some embodiments, a dynamic programming method is applied to optimize arrangement of the plurality of storage regions and the plurality of bays of each storage region in the storage space 1620 along both the first axis 1610 and the second axis 1624. The plurality of storage regions is arranged along the first axis 1610 and fit into the storage space 1620 while avoiding a plurality of guard objects (e.g., pillars and obstacles) in the storage space 1620. In each storage region, a respective number of bays is fit into the storage space 1620 while avoiding the plurality of guard objects (e.g., pillars and obstacles), and the respective number is greater than a bay number threshold or maximized. A layout of the storage space is optionally optimized when a total number of bays combining the respective numbers of bays in each storage region is greater than a total bay number threshold or maximized. Further, in some embodiments, an iterative layout optimization method is applied. The number of bays is presumed at an initial value for each storage region along the second axis 1624, and arrangement of the storage regions is optimized to a first region scheme along the first axis 1610 (e.g., when the total number of bays exceeds the total bay number threshold or maximized). The storage regions are then fixed to the first region scheme along the first axis 1610, allowing the number of bays in each storage region to be adjusted to be greater than a bay number threshold or maximized and result in a respective first bay scheme. Further, in some embodiments, the first region scheme of the storage regions is further optimized to a second region scheme if the first bay schemes are fixed, which occurs when the total number of bays exceeds the total bay number threshold or maximized in some embodiments. In some embodiments, the respective first bay schemes are further optimized to second bay schemes if the first region scheme is fixed, i.e., the number of bays in each storage region to be greater than the bay number threshold or maximized.

A staging region 1612 may be reserved near one end of the storage space 1620. The staging region 1612 extends along the first axis 1610 and is adjacent to a respective end of each region in a subset of storage regions. In some embodiments, two loading zones 1614 (e.g., a receiving zone 1614A and a shipping zone 1614B) are arranged at the same end of the storage space 1620 and at two opposite sides of the staging region 1612. These two loading zones 1614 are configured to enable a layout flow 1258 of "U Flow" along a respective U-shape access path for each of the regions 1602-1608, e.g., an access path 1616 for the region 1604. Alternatively, in some embodiments not shown in FIG. 16A, the receiving zone 1614A and shipping zone 1614B are arranged on two opposite ends of the storage space 1620, and each of the zones 1614A and 1614B is adjacent to a staging region located on the same end of the storage space 1620. These two loading zones 1614 are configured to enable a layout flow 1258 of "Through Flow" along a respective I-shape access path for each of the regions 1602-1608, e.g., an access path 1618 for the region 1606 or 1608.

In accordance with the second storage template 1650, the plurality of storage regions 1602-1608 is arranged in a two-dimensional (2D) array in the storage space 1620. Each storage region has a rectangular shape having a respective length and a respective width that are determined based on the respective storage area determined for the storage type corresponding to the respective region. In some embodiments (not shown), the storage regions 1602-1608 are aligned to create straight aisles that pass through the array of storage regions 1602-1608. Conversely, in some embodiments shown in FIG. 16B, the storage regions 1602-1608 are not aligned in at least one dimension of the array of storage regions 1602-1608, and the at least one dimension is passed through via a zigzagging aisle 1622. Optionally, each of the storage regions 1602-1608 corresponds to a respective storage type that is distinct from any other storage type of other regions in the storage space 1620. Optionally, two or more of the storage regions 1602-1608 are physically separated from each other, and however, are associated with the same storage type.

One or two loading zones 1614 may be used with a staging region 1612 in the storage space 1620. In some embodiments, two loading zones 1614 (e.g., a receiving zone 1614A and a shipping zone 1614B) are arranged at the same end of the storage space 1620. These two loading zones 1614 are configured to enable a layout flow 1258 of "U Flow" along a respective U-shape access path for each of the regions 1602-1608. Alternatively, in some embodiments, the receiving zone 1614A and shipping zone 1614B are arranged on two opposite ends of the storage space 1620, and each of the zones 1614A and 1614B is adjacent to a staging region located on the same end of the storage space 1620. These two loading zones 1614 are configured to enable a layout flow 1258 of "Through Flow" along a respective I-shape access path for each of the regions 1602-1608.

In some embodiments, the storage space 1620 is divided into the plurality of storage regions based on a plurality of predefined templates. The first storage template 1600 is selected to provide final storage regions 1602-1608 in FIG. 16A based on resources needed to place, store, and move the plurality of product packages. Specifically, the computer system obtains resource information of labor, tools and space used to store the plurality of product packages in the warehouse. For each storage template 1600 or 1650, a respective resource cost is determined for storing the plurality product packages in the respective plurality of storage regions 1602-1608 of the storage space 1620 based on the resource information. It is determined that a first resource cost associated with the first storage template 1600 is smaller than the respective resource cost associated with any remaining template of the storage templates other than the first storage template (e.g., a second resource cost associated with the second storage template 1650). Further, in some embodiments, information of both the first storage template 1600 and the second storage template 1650 is provided to a client device 102. Optionally, the information provided to the client device includes the first and second resource costs, and candidate designs of the storage regions corresponding to the first and second storage templates 1600 and 1640 are presented (e.g., ranked) on the client device with the first and second resource costs. Optionally, the information provided to the client includes the storage templates 1600 and 1650 without information of the resource costs. The first storage template 1600 is selected in response to a user selection entered on the client device 102.

In some embodiments, each storage template corresponds to a respective storage template application programming interface (API) or a plug-in of a warehouse space planning application implemented by a computer system. The computer system runs through a plurality of predefined storage templates to divide the storage space 1620 into the plurality of storage regions. A first subset of the storage templates fails, and a second subset of the storage templates succeeds. Candidate designs of the storage regions corresponding to the second subset of the storage templates may be presented on a graphical user interface of the warehouse space planning application, allowing a user to select one of the candidate designs. In some embodiments, a candidate design of the storage regions is obtained by applying a corresponding storage template heuristically to divide the storage space 1620 into the plurality of storage regions.

Figure 17:
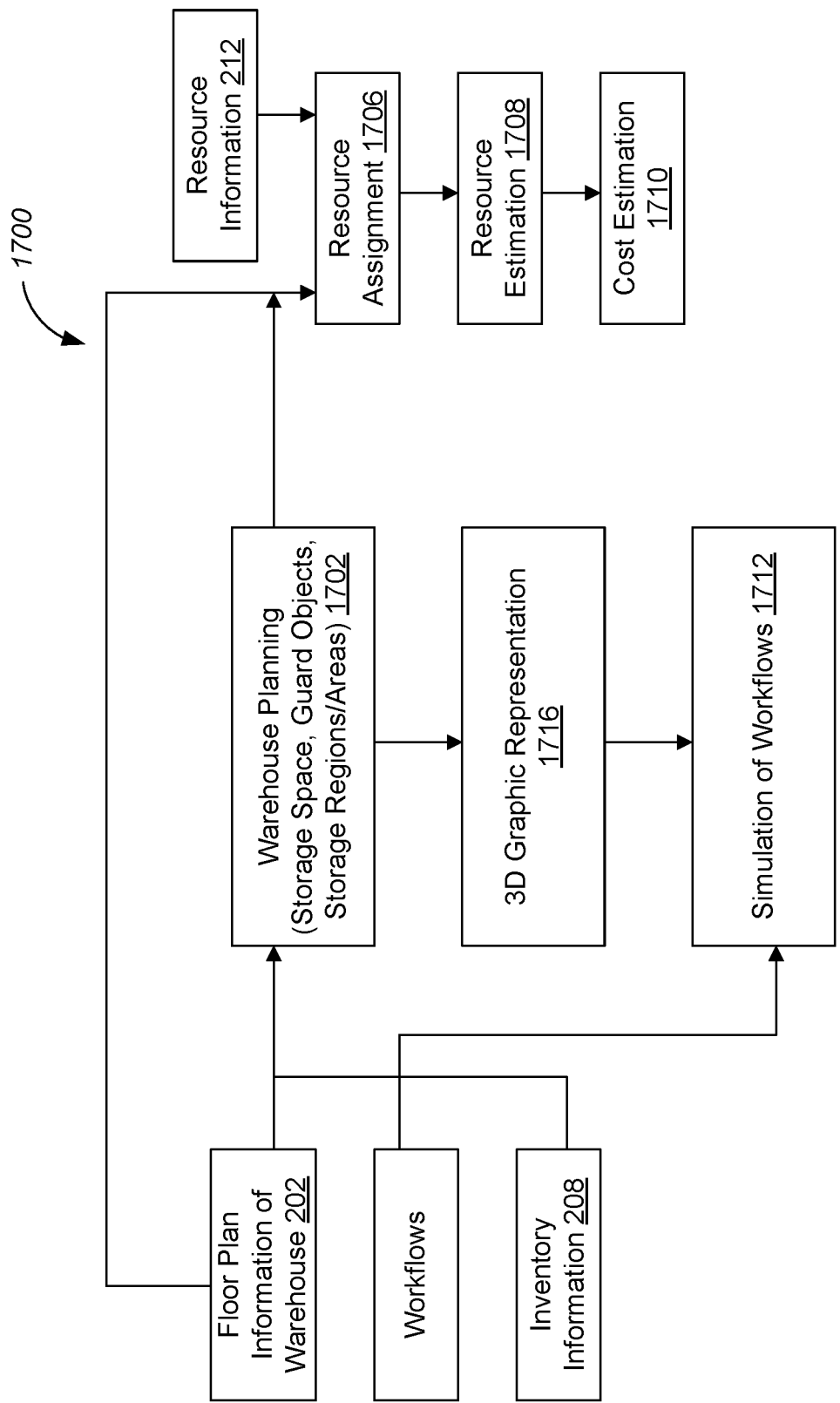
FIG. 17 is a flowchart of a cost-based warehouse space planning process 1700 in accordance with some embodiments.

FIG. 17 is a flowchart of a cost-based warehouse space planning process 1700 in accordance with some embodiments. As described above, a computer system obtains floor plan information 202 of a warehouse (e.g., a CAD file) and inventory information 208 of a plurality of product packages to be stored in the warehouse. In a warehouse planning stage 1702, a storage space (e.g., a storage room) and one or more guard objects are identified in the warehouse based on the floor plan information 202. Storage areas are determined for a plurality of storage types of the plurality of product packages, such that the storage space of the warehouse can be divided into a plurality of storage regions for the plurality of storage types according to the storage areas. In some embodiments, the storage space is divided into the plurality of storage regions to optimize an overall cost of storing the product packages in the storage space. The overall cost is determined based on resource information 212 of labor, tools and space used to store the plurality of product packages in the warehouse. Examples of the resource information 212 include, but are not limited to, information of a warehouse worker (e.g., hourly and overtime wages, benefits), information of different types of shelves and utility carts used in the warehouse (e.g., purchasing and maintenance costs, size, capability), and cost information of the warehouse (e.g., construction, maintenance or rental costs) in a geographical area where the warehouse is located. As such, resources (e.g., a number of workers, types of utility carts) needed to store the product packages in the warehouse is assigned (1706) and estimated (1708), and the overall cost is determined (1710) based on the needed resource and the resource information 212. In some embodiments, a loss function is determined for storing a plurality of product packages in the storage space divided according to a storage template, and the lost function is suppressed under a predetermined cost threshold value or is minimized.

In some embodiments, the overall cost for storing the product packages in the warehouse satisfies a resource cost criterion. An exemplary resource criterion requires that the overall cost is not greater than a predetermined cost threshold value. In some embodiments, the overall cost may be estimated as a weighted sum of a subset of: numbers of storage regions for the plurality of storage types, capital costs of storage equipment (e.g., racks, shelves and utility carts), maintenance costs of storage equipment, and average access distances for the plurality of storage types. Further, in some embodiments, the overall cost is a weighted sum of numbers of storage regions for the plurality of storage types. For example, the storage type of "racking" is normally associated with a cost of rack structures and utility carts, and has a greater weight than the storage type of "stacking" in determining the overall cost based on the numbers of storage regions. Alternatively, in some embodiments, the overall cost is a weighted sum of average access distances for the plurality of storage types. For example, the storage type of "racking" may correspond to a greater weight than the storage type of "stacking" in determining the overall cost based on the average access distances.

In an example, the overall cost is determined on a package level. For each of the plurality of product packages, a respective storage location is identified to store the respective product package, and a respective access distance is determined from a loading zone to the respective storage location. The overall cost is determined by averaging the respective access distance of each product package (optionally with a weight associated with storage type of the respective product package), and the resource cost criterion requires that the overall cost is lower than an average access distance threshold. Under some circumstances, the overall cost is greater than the average access distance threshold, the storage locations of a subset of the product packages are automatically or manually adjusted to reduce the overall cost, e.g., until the overall cost is lower than the average access distance threshold in compliance with the resource cost criterion.

Further, in some embodiments, the overall cost is a weighted average of the respective access distance with a weight determined based on a respective access frequency of each of the plurality of product packages. The plurality of product packages includes a first subset of product packages having a first access frequency and a second subset of product packages having a second access frequency. The first access frequency is greater than the second access frequency. The first storage region is assigned to store the first subset of product packages, and a second storage region is assigned to store the second subset of product packages. As a result of calculating the overall cost using the weighted average of the respective access distance, the first storage region is closer to a loading zone than the second storage region, which incurs a lower transportation cost.

In some embodiments, the warehouse space planning process 1700 includes simulating (1712) a workflow 1714 in the warehouse. In some embodiments, the computer system stores one or more workflow templates and identifies a specific workflow 1714 for the plurality of product package stored in the warehouse. As a result of simulating the workflow 1714, it is determined whether the plurality of storage regions divided from the storage space of the warehouse functions properly in a dynamic situation, e.g., whether each and every product package is accessible with or without existing tools, whether each product package can be stocked and retrieved within a respective access time limit, and whether a traffic dead node exists in the warehouse.

In some embodiments, a graphic representation of the floor plan of the warehouse is rendered (1716) on a display of the client device 102, independently of whether the warehouse space planning process 1700 is implemented locally at the client device 102 or remotely at the server system 104. In some situations, the graphic representation is three-dimensional. The graphic representation includes, but is not limited to, one or more storage spaces of the warehouse, guard objects identified on the floor plan of the warehouse, information of storage areas associated with different storage types, storage regions having the storage areas determined for the different storage types, storage templates, and options of the storage regions generated based on the storage templates. In some embodiments, the graphic representation displays a dynamic process which simulates how the product packages are stored and moved within the warehouse according to an associated workflow.

Figure 18:
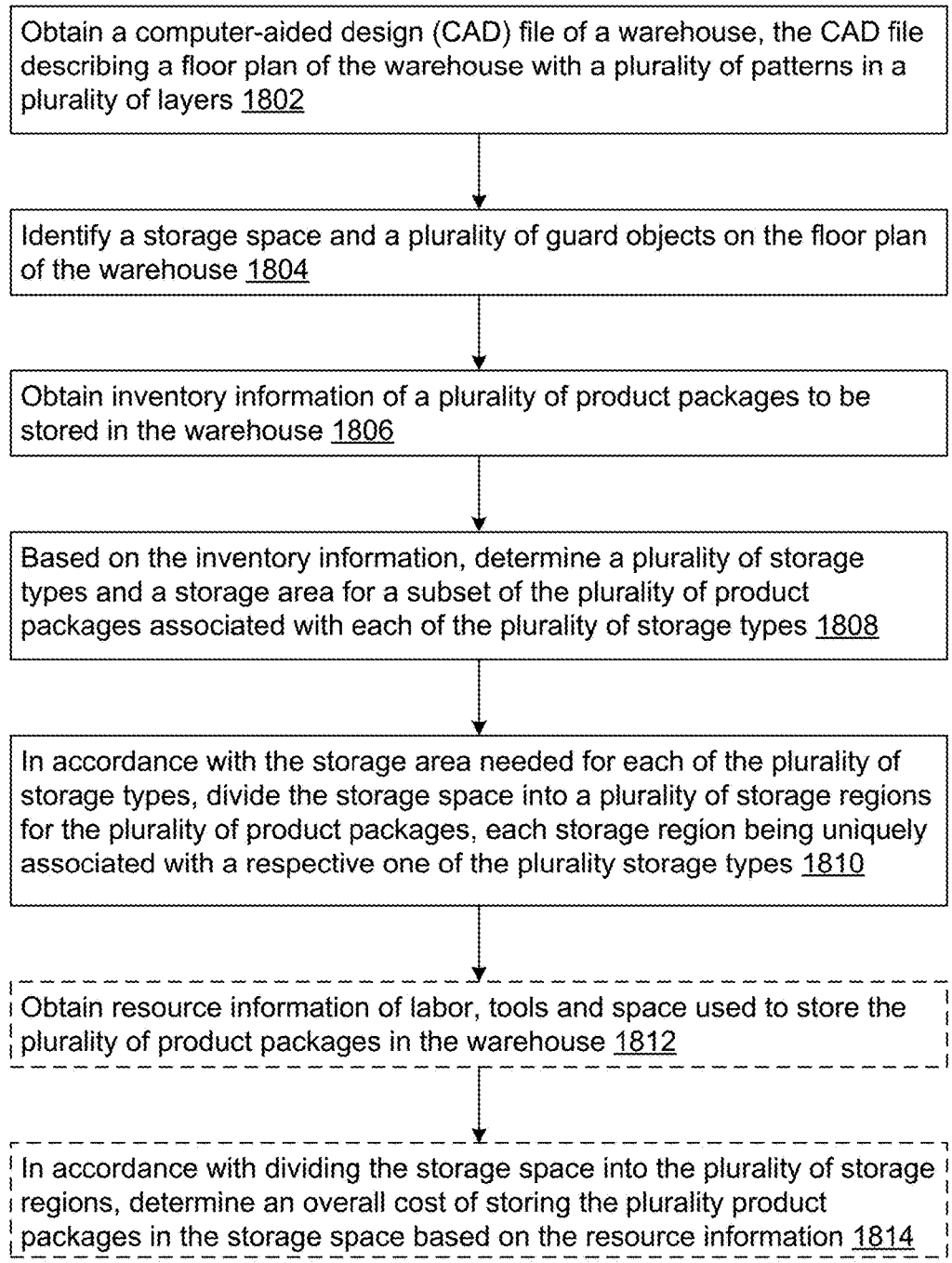
FIG. 18 is a flowchart of another warehouse space planning method implemented based on inventory information of product packages to be stored in a warehouse in accordance with some embodiments.

FIG. 18 is a flowchart of another warehouse space planning method 1800 implemented based on inventory information of product packages to be stored in a warehouse in accordance with some embodiments. Method 1800 is, optionally, governed by instructions that are stored in a non-transitory computer readable storage medium and that are executed by one or more processors of the computer system (e.g., e.g., a client device 102, a server system 104). Each of the operations shown in FIG. 18 may correspond to instructions stored in the computer memory or computer readable storage medium (e.g., memory 1906 of a server system 104 in FIG. 19) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 1800 may be combined and/or the order of some operations may be changed.

In accordance with the warehouse space planning method 1800, the computer system obtains (1802) a CAD file of the warehouse. The CAD file describes a floor plan of the warehouse with a plurality of patterns in a plurality of layers. Optionally, the plurality of layers includes a wall layer, a pillar layer, a door layer, and a fire hydrant layer. The computer system identifies (1804) a storage space and a plurality of guard objects on the floor plan of the warehouse. In some embodiments, a wall layer is identified from the plurality of layers, and lines defining the storage space are identified according to patterns in the wall layer.

In some embodiments, the plurality of layers and the plurality of patterns in the CAD file are automatically classified into a plurality of physical structures that are arranged in the warehouse. A first set of guard objects is identified among the plurality of physical structures on the floor plan of the warehouse, and the storage space is identified to be compatible with the first set of guard objects. Further, in some embodiments, an input is received to identify a second set of guard objects, and the storage space is identified to be compatible with the input. Each of the plurality of guard objects corresponds to a respective one of a plurality of predefined object types that is involved in placement, storage or movement of packages in the warehouse.

In some embodiments, each layer is rendered into a raster image and the image is processed using a predefined convolutional neural network to associate the one of the plurality of layers with one of a plurality of predefined layer types or a subset of the plurality of physical structures. Alternatively, in some embodiments, a layer feature vector is extracted and has a predefined dimension. A subset of the plurality of physical structures is identified from one of the plurality of layers based on the layer feature vector using a predetermined ML method.

The computer system obtains (1806) inventory information of a plurality of product packages to be stored in the warehouse. In some embodiments, the inventory information includes one or more of: a package type, a quantity, a package size, an expected weight, a maximal weight, an access frequency, and a storage type of each of the product packages. Based on the inventory information, a plurality of storage types and a storage area are determined (1808) for a subset of the plurality of product packages associated with each of the plurality of storage types. For example, the plurality of storage types includes one or more of: racking, shelving, shelving with mezzanines, stacking, frozen food, and fresh food. Racking includes, but is not limited to, single-depth and double depth pallet racking, push back racking, drive-in racking, cantilever racking, pallet flow racking, and the like. In some embodiments, the floor plan of the warehouse includes a plurality of column structures, and each column structure is identified as an obstacle in the plurality of guard objects. For each of the plurality of column structures, the respective column structure is placed within a respective storage region, and an area of the respective column structure is deducted from the storage area of the respective storage region.

In accordance with the storage area needed for each of the plurality of storage types, the storage space of the warehouse is divided (1810) into a plurality of storage regions for the plurality of product packages. Each storage region is uniquely associated with a respective one of the plurality storage types. In some embodiments, the computer system obtains (1812) resource information of labor, tools and space used to store the plurality of product packages in the warehouse, and determines (1814) an overall cost of storing the plurality product packages in the storage space based on the resource information in accordance with dividing the storage space into the plurality of storage regions. The overall cost satisfies a resource cost criterion. Further, in some embodiments, the cost criterion requires that the overall cost is not greater than a cost threshold value. Alternatively, in some embodiments, the overall cost is a weighted sum of: numbers of storage regions for the plurality of storage types, capital costs of storage equipment, maintenance costs of storage equipment, or average access distances for the plurality of storage types. In an example, the overall cost is based on at least one of a weighted sum of the numbers of storage regions for the plurality of storage types and a weighted sum of the average access distances for the plurality of storage types. In another example, for each of the plurality of product packages, a respective storage location to store the respective product package is identified, and a respective access distance is determined from a loading zone to the respective storage location. The overall cost is determined by averaging the respective access distance of each product package, and the resource cost criterion requires that the overall cost is lower than an average access distance threshold. The overall cost is optionally a weighted average of the respective access distance with a weight of a respective access frequency of each of the plurality of product packages. More details on determining the overall cost of storing the product packages in the storage space are discussed above with reference to FIG. 17.

In some embodiments, the plurality of storage regions is a plurality of final storage regions. For dividing the storage space into the plurality of final storage regions, a plurality of predefined storage templates (e.g., 1600 and 1650 in FIG. 16) is identified, e.g., extracted from a warehouse information database 112 of a server system in FIG. 1. In accordance with each storage template, the storage space of the warehouse is divided to a respective plurality of storage regions. The final storage regions are selected from the respective plurality of storage regions corresponding to each storage template and corresponds to a first storage template. Further, in some embodiments, the plurality of product packages are stored in the final storage regions with a first resource cost in accordance with the first storage template. The computer system obtains resource information of labor, tools and space used to store the plurality of product packages in the warehouse. For each storage template, a respective resource cost of storing the plurality product packages in the respective plurality of storage regions of the storage space is determined based on the resource information. The final storage regions are selected in accordance with a determination that the first resource cost is smaller than the respective resource cost associated with any remaining template of the storage templates other than the first storage template. Alternatively, in some embodiments, a subset of the plurality of predefined storage templates is identified, and includes the first storage template. Information of the subset of predefined storage templates is provided to a client device, and a user selection of the first storage template is received at the computer system. In an example, an overall cost associated with each storage template in the subset is provided to the client device, and candidate designs of the storage regions corresponding to the subset of predefined storage templates are ranked based on the respective overall costs. The candidate designs of the storage regions are presented to a user of the client device according to a ranking associated with the respective overall costs associated with the subset of storage templates. The first storage template optionally has or does not have the lowest overall cost in the subset.

It should be understood that the particular order in which the operations in each of FIGS. 3, 4, 11, 15, 17 and 18 have been described are merely exemplary and are not intended to indicate that the described order is the only order in which the operations could be performed. One of ordinary skill in the art would recognize various ways to plan a storage space in a warehouse as described herein. Additionally, it should be noted that details described with respect to one of processes 300, 400, 1100, 1500, 1700 and 1800 are also applicable in an analogous manner to any other ones of the methods 300, 400, 1100, 1500, 1700 and 1800. For brevity, the analogous details are not repeated.

Figure 19:
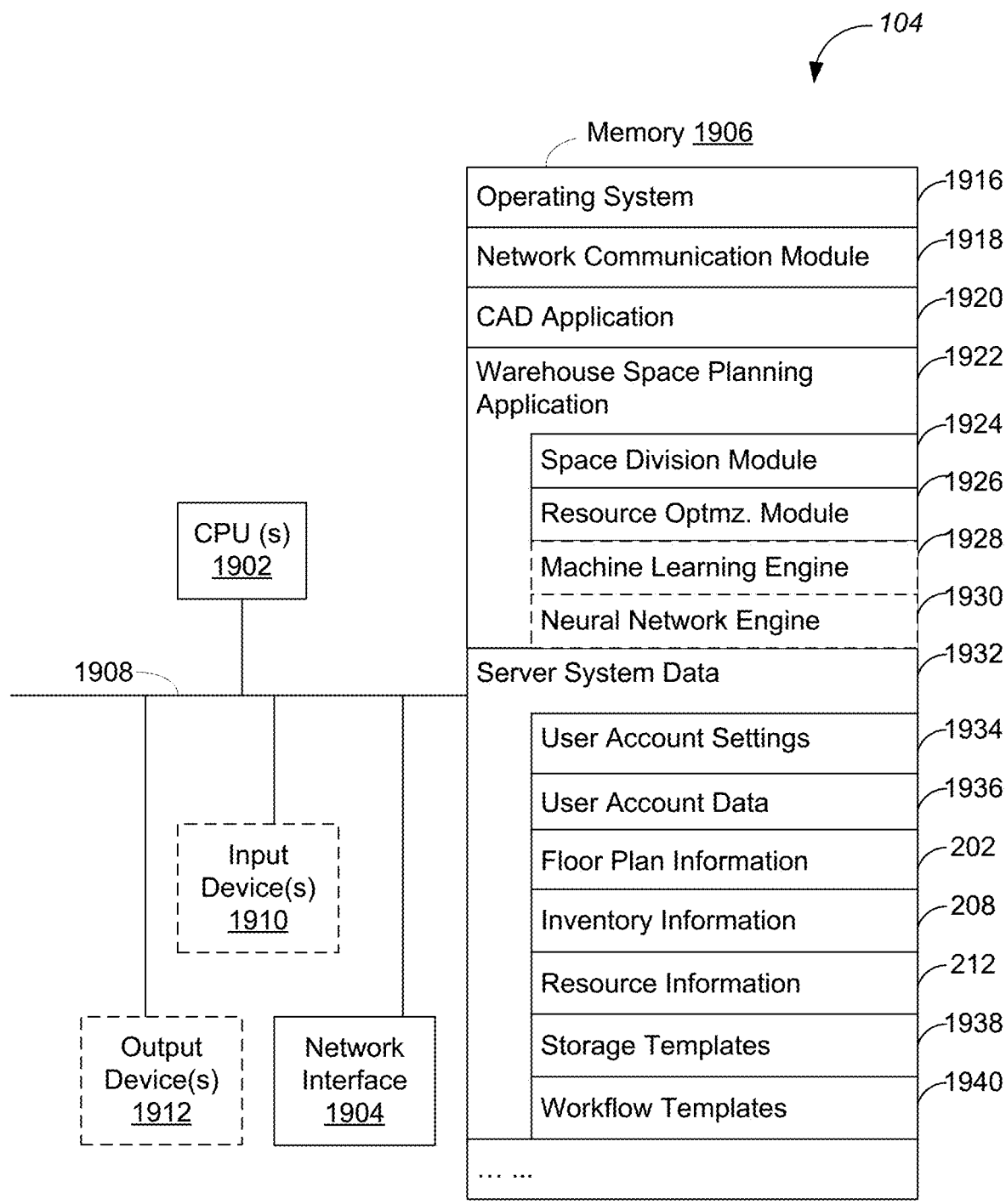
FIG. 19 is an exemplary server system that implements a warehouse space planning method in accordance with some embodiments.

FIG. 19 is an example server system 104 that implements a warehouse space planning method in accordance with some embodiments. The server system 104, typically, includes one or more processing units (CPUs) 1902, one or more network interfaces 1904, memory 1906, and one or more communication buses 1908 for interconnecting these components (sometimes called a chipset). The server system 104 could include one or more input devices 1910 that facilitate user input, such as a keyboard, a mouse, a voice-command input unit or microphone, a touch screen display, a touch-sensitive input pad, a gesture capturing camera, or other input buttons or controls. Furthermore, the server system 104 could use a microphone and voice recognition or a camera and gesture recognition to supplement or replace the keyboard. In some embodiments, the server system 104 includes one or more cameras, scanners, or photo sensor units for capturing images, for example, of graphic series codes printed on the electronic devices. The server system 104 could also include one or more output devices 1912 that enable presentation of user interfaces and display content, including one or more speakers and/or one or more visual displays.

Memory 1906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1906, optionally, includes one or more storage devices remotely located from one or more processing units 1902. Memory 1906, or alternatively the non-volatile memory within memory 1906, includes a non-transitory computer readable storage medium. In some embodiments, memory 1906, or the non-transitory computer readable storage medium of memory 1906, stores the following programs, modules, and data structures, or a subset or superset thereof:

- Operating system 1916 including procedures for handling various basic system services and for performing hardware dependent tasks;
- Network communication module 1918 for connecting the server system 104 to other devices (e.g., a client device 102, a warehouse information source 108) via one or more network interfaces 1904 (wired or wireless) and one or more networks 106, such as the Internet, other wide area networks, local area networks, metropolitan area networks, and so on;
- Architecture CAD Application 1920 for providing aid in creation, modification, analysis, or optimization of an architectural design of a warehouse;
- Server-side warehouse space planning application 1922 for one or more of identifying one or storage spaces, physical structures and guard objects according to floor plan information of the warehouse, rendering graphic representations of a floor plan of the warehouse, determining storage types associated with product packages to be stored in the warehouse, estimating storage areas for different storage types of the product packages, dividing a storage space into storage regions for storing product packages of different storage types, estimating costs associated with the storage regions divided differently, and interacting with a client device 102 to receive user inputs concerning space planning of the warehouse; and
- Server system data 1932 storing at least data associated with warehouse space planning, including:
  - User account settings 1934 for storing account settings of one or more user accounts and settings of devices and applications that are associated with each of the user accounts and managed by the server system 104, where the user account settings 1934 further include account settings of a plurality of user accounts of the warehouse space planning application 1922;
  - User account data 1936 for storing at least data that are generated by a plurality of client devices 102 associated with each of the user accounts of the warehouse space planning application 1922 managed by the server system 104, e.g., information of a storage space and guard objects in a warehouse, and information of storage types, storage areas and storage regions associated with product packages to be stored in the warehouse;
  - Floor plan information 202 of one or more warehouses whose storage spaces are planned with the warehouse space planning application 1922, e.g., a CAD file describing a floor plan of the warehouse with a plurality of patterns in a plurality of layers;
  - Inventory information 208 of a plurality of product packages to be stored in each warehouse, including one or more of: a package type, a quantity, a package size, an expected weight, a maximal weight, an access frequency, and a storage type of each of the product packages;
  - Resource information 212 of labor, tools and space, including one or more of: wages of warehouse labor, number of employees needed to manage a unit storage space, types of tools needed to manage different storage types, prices of tools, and space requirements related to different storage types;
  - Storage templates 1938 for dividing a storage space of a warehouse to a plurality of storage regions based on storage spaces determined for the storage regions; and
  - Workflow templates 1940 for organizing a workflow in a storage space of a warehouse.

In some embodiments, the server-side warehouse space planning application 1922 includes a space division module 1924 for dividing a storage space determined from floor plan information 202 of a warehouse to storage regions for storing a plurality of product packages and a resource optimization module 1926 for optimizing a layout of the storage regions in the warehouse based on resource information 212 of labor, tools and space. In some embodiments, the warehouse space planning application 1922 further includes at least one of a machine learning engine 1928 and a neural network module 1930, each of which is configured to automatically classify the floor plan information 202 (e.g., layers and patterns in a CAD file) into physical structures from which guard objects are determined.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 1906, optionally, stores a subset of the modules and data structures identified above. Furthermore, memory 1906, optionally, stores additional modules and data structures not described above.

Figure 20:
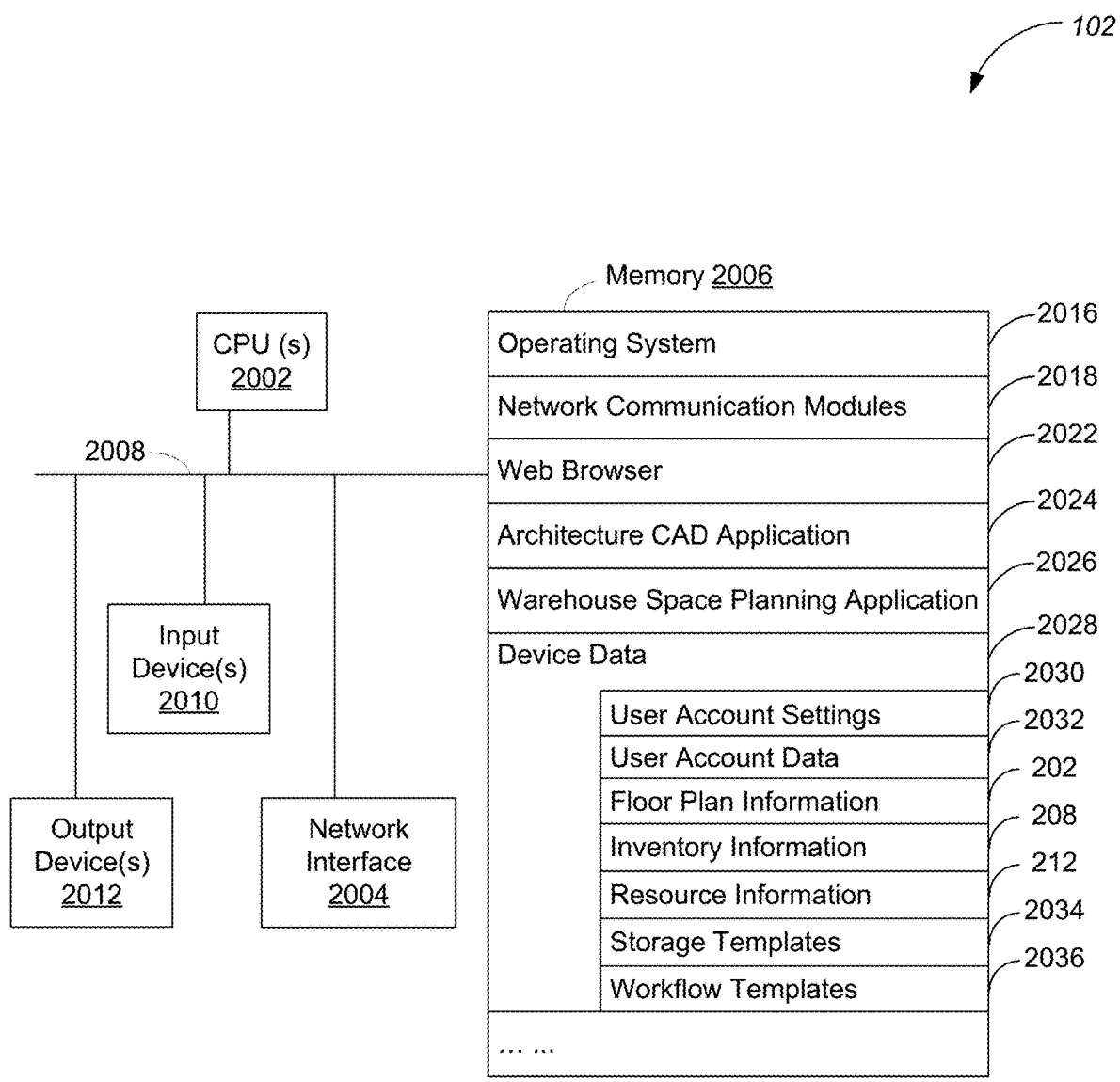
FIG. 20 is an exemplary client device configured to execute a warehouse planning application that enables display of a graphic user interface to facilitate warehouse space planning in accordance with some embodiments.

FIG. 20 is an exemplary client device 102 configured to execute a warehouse planning application that enables display of a graphic user interface to facilitate warehouse space planning in accordance with some embodiments. The client device 102, typically, includes one or more processing units (CPUs) 2002, one or more network interfaces 2004, memory 2006, and one or more communication buses 2008 for interconnecting these components (sometimes called a chipset). Memory 2006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 2006, optionally, includes one or more storage devices remotely located from one or more processing units 2002. Memory 2006, or alternatively the non-volatile memory within memory 2006, includes a non-transitory computer readable storage medium. The client device 102 could include one or more input devices 2010 that facilitate user input, such as input buttons or controls. Furthermore, the client device 102 could use a microphone and voice recognition or a camera and gesture recognition to supplement or replace the buttons. The client device 102 could also include one or more output devices 2012 that enable presentation of user interfaces and display content, including a speaker and/or a visual display.

In some embodiments, memory 2006, or the non-transitory computer readable storage medium of memory 2006, stores the following programs, modules, and data structures, or a subset or superset thereof:

- Operating system 2016 including procedures for handling various basic system services and for performing hardware dependent tasks;
- Network communication module 2018 for connecting the client device 102 to other computers or systems (e.g., a server system 104, a warehouse information source 108) via one or more network interfaces 2004 (wired or wireless) and one or more networks 106, such as the Internet, other wide area networks, local area networks, metropolitan area networks, cable television systems, satellite television systems, IPTV systems, and so on;
- Web browser 2022 for accessing information on the Internet and presenting a graphic user interface on which user inputs are received and information of a warehouse is displayed to a user during the course of planning a storage space of the warehouse;
- Architecture CAD Application 2024 for providing aid in creation, modification, analysis, or optimization of an architectural design of a warehouse;
- Client-side warehouse space planning application 2026 for rendering a graphic user interface on which user inputs are received and information of the warehouse is displayed to a user, where in some embodiments, the warehouse space planning application 2026 communicates with the server system to plan the storage space of the warehouse remotely, while in some embodiments, the warehouse space planning application 2026 at least partially plans the storage space of the warehouse locally by implementing, at the client device 102, operations including one or more of: identifying one or storage spaces, physical structures and guard objects according to floor plan information of the warehouse, rendering graphic representation of a floor plan of the warehouse, determining storage types associated with product packages to be stored in the warehouse, estimating storage areas for different storage types of the product packages, dividing a storage space into storage regions for storing product packages of different storage types, and estimating costs associated with the storage regions divided differently; and
- Device data 2028 storing at least data associated with warehouse space planning, including:
  - User account settings 2030 for storing account settings of one or more user accounts associated with the client device 102 and for storing settings of devices and applications that are associated with the user accounts, where the user account settings 1934 further include account settings of a user account of the warehouse space planning application 1922 or 2026;
  - User account data 2032 for storing at least data that are generated by the client device 102 associated with the user accounts of the warehouse space planning application 1922 or 2026, e.g., information of a storage space and guard objects in a warehouse, and information of storage types, storage areas and storage regions associated with product packages to be stored in the warehouse;
  - Floor plan information 202 of one or more warehouses whose storage spaces are planned with the warehouse space planning application 1922 and/or 2026, e.g., a CAD file describing a floor plan of the warehouse with a plurality of patterns in a plurality of layers;
  - Inventory information 208 of a plurality of product packages to be stored in each warehouse, including one or more of: a package type, a quantity, a package size, an expected weight, a maximal weight, an access frequency, and a storage type of each of the product packages;
  - Resource information 212 of labor, tools and space, including one or more of: wages of warehouse labor, number of employees needed to manage a unit storage space, types of tools needed to manage different storage types, prices of tools, and space requirements related to different storage types;
  - Storage templates 2034 for dividing a storage space of a warehouse to a plurality of storage regions based on storage spaces determined for the storage regions; and
  - Workflow templates 2036 for organizing a workflow in a storage space of a warehouse. In some embodiments, Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 2006, optionally, stores a subset of the modules and data structures identified above. Furthermore, memory 2006, optionally, stores additional modules and data structures not described above.

In summary, this warehouse space planning application implemented at a computer system (e.g., a server system 104, a client device 102) covers at least one or more of the following functions: automatic warehouse layout design, storage cost quotation, user annotation of a CAD file, product data analysis, product-based project management, three-dimensional modelling of a warehouse space, workflow simulation, and warehouse database management. For example, the warehouse space planning application automatically plans a storage space of a warehouse based on a quantity and storage types of product packages to be stored therein and floor plan information of the warehouse. If the floor plan information is not readily available, the warehouse space planning application can predict plausible floor plans and storage areas needed to store different storage types of the quantity of product packages. Thus, the warehouse space planning application is configured to calculate shelf space, organize a storage space (e.g., a storage room), plan entering and exiting activities of the product packages, create storage regions in a storage space, and design movement routes and workflows of the product packages in the warehouse.

Further, in some situations, the warehouse space planning application sets up various models of utilizing available resources, estimating costs, and generating a price quotation. In accordance with a resource model, a quantity, product type, requirements of an operating process, and corresponding production efficiency of the operating process are used to determine how many workers are needed to operate the warehouse, how long the workers have to work, what equipment/tools and how many equipment/tools are needed, and how much is needed to purchase, rent or maintain storage spaces of the warehouse. In accordance with a cost model, labor costs, equipment costs, and building costs can be estimated for operating the warehouse for an extended period of time and at different geographical locations. In accordance with a quotation model, these labor, equipment and space costs are adjusted to generate a quotation for storing product packages in the warehouse in response to a quotation request made by a potential customer.

In some embodiments, formats of warehouse design CAD files vary based on architecture CAD software applications used to design the warehouse. The CAD files are marked and annotated to provide warehouse specifications during the course of planning the storage space of the warehouse. In an automatic layout design of the warehouse, CAD requirements may be manually marked offline by a user. For example, the user may manually selects frames of pillars, offices and other structures. The warehouse space planning application also provides online labeling tools. After the user uploads original CAD files, one or more layers related to physical structures (e.g., walls, pillars, doors) are automatically identified from the uploaded CAD files, and those layers that are not identifiable can be manually labeled by users. The annotated CAD files can be used to plan storage spaces in the warehouse.

In some embodiments, product data is also analyzed in the context of warehouse space planning, and a user may decide a layout of the warehouse by analyzing a history of storage, inventory, and delivery. This is implemented via three modules:

Packaging analysis module for converting SKU specifications (size information provided by the SKU master) into storage needs (storage by pallet or box);

Storage analysis module for determining a storage form (storage by pallet or storage by box) and storage amount based on a number of SKUs; and Outbound analysis module for determining a shelf layout based on SKU outbound speed and determining a design of replenishment and the size of a picking area based on shipping orders;

In some embodiments, a project is managed in the context of warehouse space planning. When a user designs a solution for a customer, the user goes through different stages of analysis. For example, the warehouse space planning application can implement both at least product data analysis and CAD annotation, allowing the user to perform functions at different stages of the same project.

In some embodiments, a 3D representation can be rendered for a storage space in a warehouse during the course of planning the storage space. The 3D representation is optionally reviewed in a web browser or warehouse space planning application. The 3D representation reflects height information of a storage shelf or rack and a height of the warehouse, and therefore, is more comprehensive than a 2D representation.

In some embodiments, costs and efficiency of running the warehouse can be predicted via the warehouse space planning application. In an example related to a forward input, an actual storage and outbound data are obtained for a given date from a warehouse that is active in operation. The warehouse space planning application obtains floor plan information and resource information, and compares the information to a current plan and resource allocation determined from the actual storage and outbound data to check an associated cost and efficiency associated with the floor plan and resource information. In another example related to reverse input, an allowed warehouse capacity is determined based on a shelf type, personnel, equipment, and product types of the warehouse in operation, and therefore, is reviewed and enhanced by adjusting the product types or personnel.

Further, in some embodiments, the warehouse information database 112 of the server system 104 is updated to integrate historic warehouse data stored in the warehouse information database 112 and external warehouse data provided by the warehouse information source 118. In some embodiments, the warehouse space planning application is configured to automatically recommend a warehouse address based on independent assessment of geographic locations and storage needs. Specifically, the application is configured to combine an electronic map and intelligent warehouse sourcing. The electronic map optionally contains address, specifications and price information. CAD information of a floor plan of a warehouse can be reviewed based on each geographic location.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 2006, optionally, stores a subset of the modules and data structures identified above. Furthermore, memory 2006, optionally, stores additional modules and data structures not described above.

It will also be understood that, although the terms first, second, etc. are, in some instances, used herein to describe various elements, these elements should not be limited by these terms. These terms are only used to distinguish one element from another. For example, a first type of audio feature can be termed a second type of audio feature, and, similarly, a second type of audio feature can be termed a first type of audio feature, without departing from the scope of the various described embodiments. The first type of audio feature and the second type of audio feature are both types of audio features, but they are not the same type of audio feature.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of planning warehouse space, comprising:
   at a computer system having one or more processors and memory storing instructions for execution by the one or more processors:
      obtaining a computer-aided design (CAD) file of a warehouse, the CAD file describing a floor plan of the warehouse with a plurality of patterns in a plurality of layers, wherein the plurality of layers includes a wall layer, a pillar layer, a door layer, and a fire hydrant layer;
      automatically and without user intervention:
         in accordance with a plurality of classification rules, classifying the plurality of layers and the plurality of patterns in the CAD file into a plurality of physical structures that are arranged in the warehouse; and
         identifying a first set of guard objects among the plurality of physical structures on the floor plan of the warehouse;
      receiving an input to identify a second set of guard objects;
      customizing the floor plan of the warehouse to identify one or more storage spaces that are compatible with the first set of guard objects and the second set of guard objects; and
      rendering a graphic representation of the customized floor plan of the warehouse, the graphic representation including the one or more storage spaces, the first set of guard objects and the second set of guard objects on the floor plan.

2. The method of claim 1, wherein each guard object of the first and second sets of guard objects corresponds to a respective one of a plurality of predefined object types that is involved in placement, storage or movement of packages in the warehouse.

3. The method of claim 2, wherein each of the first set of guard objects is associated with a subset of the patterns on the plurality of layers, and the plurality of classification rules includes a guide object rule, further comprising, for each of the first set of guide objects:
   determining that the subset of the patterns on the plurality of layers complies with the guide object rule defining patterns and layers associated with the respective predefined object type; and
   automatically associating the respective guide object with the respective predefined object type based on the subset of the patterns on the plurality of layers.

4. The method of claim 2, wherein the plurality of predefined object types includes a wall defining the one or more storage spaces, a pillar, an obstacle, a user-reachable space, a user-inaccessible space, and one or more exits.

5. The method of claim 1, further comprising:
   in response to rendering the graphic representation, receiving a user annotation on the CAD file;
   in accordance with the user annotation, updating classification of the plurality of layers and the plurality of patterns in the CAD file according to the plurality of classification rules;
   identifying a third set of guard objects on the floor plan of the warehouse; and
   updating customization of the floor plan of the warehouse to render an updated graphic representation including one or more updated storage spaces and the third set of guard objects on the floor plan.

6. The method of claim 5, wherein identifying the third set of guide objects further comprises at least one of: adding a subset of the third set of guide objects, modifying the first set of guard objects, and modifying the second set of guard objects.

7. The method of claim 5, wherein updating classification of the plurality of layers and the plurality of patterns in the CAD file comprises:
   associating one of the plurality of layers and the plurality of patterns with one of a plurality of predefined object types that are involved in placement, storage or movement of packages in the warehouse.

8. The method of claim 1, wherein receiving the input to identify the second set of guard objects further comprises:
   associating one of the plurality of layers and the plurality of patterns with one of the second set of guard objects, the one of the second set of guard objects having a predefined object type that is involved in placement, storage or movement of packages in the warehouse.

9. The method of claim 1, wherein the input is received to modify one of the first set of guide objects to one of the second set of guide objects.

10. The method of claim 1, wherein classifying the plurality of layers and the plurality of patterns in the CAD file further comprises, for each of the plurality of layers:
    rendering the respective layer into a respective layout image; and
    processing the respective layout image using a predefined convolutional neural network to associate the respective layer with a respective type of physical structure.

11. A non-transitory computer-readable medium, having instructions stored thereon, which when executed by one or more processors cause the processors to implement operations comprising:
- obtaining a computer-aided design (CAD) file of a warehouse, the CAD file describing a floor plan of the warehouse with a plurality of patterns in a plurality of layers;
- automatically and without user intervention:
  - in accordance with a plurality of classification rules, classifying the plurality of layers and the plurality of patterns in the CAD file into a plurality of physical structures that are arranged in the warehouse, including for each of the plurality of layers: rendering the respective layer into a respective layout image, and processing the respective layout image using a predefined convolutional neural network to associate the respective layer with a respective type of physical structure; and
  - identifying a first set of guard objects among the plurality of physical structures on the floor plan of the warehouse;
- receiving an input to identify a second set of guard objects;
- customizing the floor plan of the warehouse to identify one or more storage spaces that are compatible with the first set of guard objects and the second set of guard objects; and
- rendering a graphic representation of the customized floor plan of the warehouse, the graphic representation including the one or more storage spaces, the first set of guard objects and the second set of guard objects on the floor plan.

12. The non-transitory computer-readable medium of claim 11, wherein identifying the first set of guard objects further comprises for each of the plurality of layers:
- identifying a respective set of patterns on the respective layer associated with the respective type of physical structure as a respective subset of the first set of guide objects.

13. The non-transitory computer-readable medium of claim 11, wherein customizing the floor plan of the warehouse to identify the one or more storage spaces further comprises:
- identifying a wall layer and a door layer from the plurality of layers; and
- identifying lines defining each of the storage spaces according to patterns in the wall and door layers.

14. The non-transitory computer-readable medium of claim 11, wherein classifying the plurality of layers and the plurality of patterns in the CAD file further comprises, for each of the plurality of layers:
- extracting a respective layer feature vector having a predefined dimension; and
- in accordance with a predetermined machine learning (ML) method, associating the respective layer with a respective type of physical structure based on the respective layer feature vector.

15. A computer system, comprising:
- one or more processors; and
- memory having instructions stored thereon, which when executed by the one or more processors cause the processors to implement operations comprising:
  - obtaining a computer-aided design (CAD) file of a warehouse, the CAD file describing a floor plan of the warehouse with a plurality of patterns in a plurality of layers;
  - automatically and without user intervention:
    - in accordance with a plurality of classification rules, classifying the plurality of layers and the plurality of patterns in the CAD file into a plurality of physical structures that are arranged in the warehouse, including for each of the plurality of layers: extracting a respective layer feature vector having a predefined dimension, and in accordance with a predetermined machine learning (ML) method, associating the respective layer with a respective type of physical structure based on the respective layer feature vector; and
    - identifying a first set of guard objects among the plurality of physical structures on the floor plan of the warehouse;
  - receiving an input to identify a second set of guard objects;
  - customizing the floor plan of the warehouse to identify one or more storage spaces that are compatible with the first set of guard objects and the second set of guard objects; and
  - rendering a graphic representation of the customized floor plan of the warehouse, the graphic representation including the one or more storage spaces, the first set of guard objects and the second set of guard objects on the floor plan.

16. The computer system of claim 15, wherein the plurality of layers includes a wall layer, a pillar layer, a door layer, and a fire hydrant layer.

17. The computer system of claim 15, wherein extracting the respective layer feature vector further comprises:
- identifying a first text-based feature vector;
- identifying a second pattern-based feature vector; and
- concatenating the first text-based feature vector and the second pattern-based feature vector in the respective layer feature vector.

18. The computer system of claim 17, wherein identifying the first text-based feature vector for each layer further comprises:
- identifying a first number (N) of groups, each group including a respective set of predefined substantially synonymous patterns, the first text-based feature vector having the first number (N) of elements each uniquely associated with a respective one of the first number (N) of groups;
- for each text feature element in the first text-based feature vector:
  - determining whether at least one substantial synonymous pattern in the group corresponding to the respective text feature element is found in the respective layer;
  - in accordance with a determination that at least one substantial synonymous pattern in the group corresponding to the respective text feature element is found in the respective layer, assigning a first value to the respective text feature element; and
  - in accordance with a determination that no substantial synonymous pattern in the group corresponding to the respective row is found in the respective layer, assigning a second value to the respective text feature element, the second value being distinct from the first value.

19. The computer system of claim 17, wherein each of the plurality of patterns corresponds to one of a plurality of predefined pattern types including at least straight lines, arc lines, rectangles, ellipses, and polygons, identifying the second pattern-based feature vector for each layer further comprises:
- for each of the plurality of predefined pattern types, counting a respective number of times of occurrence in the respective layer of the floor plan of the warehouse; and
- generating a histogram based on a plurality of numbers of times of occurrence that corresponds to the plurality of predefined pattern types; and
- converting the histogram to the second pattern-based feature vector of the respective layer.

20. The computer system of claim 15, wherein extracting the respective layer feature vector for each layer further comprises:
- breaking the plurality of patterns into a plurality of line segments;
- removing a subset of line segments that are curved;
- determining a plurality of characteristic values of the plurality of line segments;
- generating a histogram of the plurality of characteristic values of the plurality of line segments; and
- creating the respective layer feature vector based on the histogram.

* * * * *